(12) United States Patent
Fujita et al.

(10) Patent No.: US 6,842,123 B1
(45) Date of Patent: Jan. 11, 2005

(54) ELECTROMECHANICAL SWITCHING DEVICE AND EMERGENCY SHUT-OFF AND COMMUNICATION SYSTEM UTILIZING SAME

(75) Inventors: Toshihiro Fujita, Osaka (JP); Akito Okamoto, Osaka (JP); Hideyuki Kitayama, Osaka (JP); Hiroyuki Ohta, Osaka (JP); Atsushi Matsumoto, Osaka (JP); Masaaki Fujii, Osaka (JP); Masatake Yamano, Osaka (JP); Eitoku Tabuse, Osaka (JP); Norio Asa, Osaka (JP)

(73) Assignee: Idec Izumi Corporation, Osaka (JP)

( * ) Notice: Subject to any disclaimer, the term of this patent is extended or adjusted under 35 U.S.C. 154(b) by 0 days.

(21) Appl. No.: 09/869,494

(22) PCT Filed: Nov. 8, 2000

(86) PCT No.: PCT/JP00/07860
§ 371 (c)(1),
(2), (4) Date: Jun. 28, 2001

(87) PCT Pub. No.: WO01/35429
PCT Pub. Date: May 17, 2001

(30) Foreign Application Priority Data

| Nov. 10, 1999 | (JP) | ............................................. 11-320387 |
| May 17, 2000 | (JP) | ....................................... 2000-145090 |
| Oct. 27, 2000 | (JP) | ....................................... 2000-328772 |

(51) Int. Cl.[7] .............................................. G08B 29/00
(52) U.S. Cl. ....................... 340/999; 340/506; 340/507; 340/517; 340/521; 340/522; 340/531; 340/533; 340/679; 340/680; 340/3.1
(58) Field of Search ................................ 340/506, 507, 340/3.1, 517, 521, 522, 531, 533, 679, 680

(56) References Cited

U.S. PATENT DOCUMENTS

| 3,873,957 A | 3/1975 | Wuerscher et al. |
| 3,882,337 A | 5/1975 | Pfeffer et al. |
| 3,949,219 A | 4/1976 | Crouse |
| 4,061,988 A | 12/1977 | Lewandowski |
| 4,315,123 A | 2/1982 | Fujita et al. |
| 4,489,303 A | 12/1984 | Martin |
| 4,748,306 A | 5/1988 | Schlegel |
| 5,272,383 A | 12/1993 | Umemura et al. |
| 5,321,311 A | 6/1994 | Umemura et al. |
| 5,400,246 A * | 3/1995 | Wilson et al. ...... 340/825.36 X |
| 5,679,936 A | 10/1997 | Schaeffer et al. |
| 5,844,493 A | 12/1998 | Pohl et al. |
| 5,882,231 A | 3/1999 | Takano et al. |
| 6,067,483 A * | 5/2000 | Fesmire et al. ............. 700/296 |
| 6,444,932 B1 | 9/2002 | Resmalm |

FOREIGN PATENT DOCUMENTS

| CA | 2015181 | 10/1990 |
| CA | 2212589 | 4/1998 |

(List continued on next page.)

Primary Examiner—Daryl Pope
(74) Attorney, Agent, or Firm—Jordan and Hamburg LLP

(57) ABSTRACT

A switch assembly (1) comprises a push-button section (52) and a push-button body (53) as an operation transmitting member, an LED box (54) and a contact-making contact (56) as a direct functioning member, and a communication-function incorporating contact (communications contact) (55) as an information input/output functioning member, as permitting these components to be connected with each other. Therefore, the switch assembly can respond to an operation given to the push-button body (52) by causing the contact-making contact (56) to provide an output for switching between a conductive state and a non-conductive state and by causing the communications contact (55) to output an information signal to a network.

104 Claims, 62 Drawing Sheets

FOREIGN PATENT DOCUMENTS

| | | |
|---|---|---|
| DE | 3014639 | 10/1980 |
| DE | 8318613 | 2/1984 |
| DE | 3516450 | 10/1986 |
| DE | 3523732 | 11/1986 |
| DE | 3611579 | 12/1987 |
| DE | 9420351 | 3/1995 |
| DE | 29519025 | 1/1996 |
| DE | 4430382 | 2/1996 |
| EP | 0394057 | 10/1990 |
| FR | 2579694 | 10/1986 |
| FR | 2582360 | 11/1986 |
| GB | 1412510 | 11/1975 |
| GB | 1421056 | 1/1976 |
| GB | 2318922 | 5/1998 |
| JP | 44-19398 | 8/1969 |
| JP | 51-7475 | 2/1976 |
| JP | 51-41877 | 4/1976 |
| JP | 55-139720 | 10/1980 |
| JP | 56-22015 | 3/1981 |
| JP | 57-3131 | 1/1982 |
| JP | 59-39838 | 3/1984 |
| JP | 62-37222 | 9/1987 |
| JP | 63-28813 | 8/1988 |
| JP | 1-231224 | 9/1989 |
| JP | 2-49024 | 4/1990 |
| JP | 2-134621 | 11/1990 |
| JP | 2-281512 | 11/1990 |
| JP | 2301924 | 12/1990 |
| JP | 4-75218 | 3/1992 |
| JP | 6-36641 | 2/1994 |
| JP | 7-29448 | 1/1995 |
| JP | 7-31958 | 4/1995 |
| JP | 7-153344 | 6/1995 |
| JP | 7-41892 | 7/1995 |
| JP | 7-82780 | 9/1995 |
| JP | 2505396 | 5/1996 |
| JP | 11-52813 | 2/1999 |
| WO | 96/07192 | 3/1996 |
| WO | 00/60621 | 10/2000 |

* cited by examiner (a)

(b)

(c)

US 6,842,123 B1

ELECTROMECHANICAL SWITCHING DEVICE AND EMERGENCY SHUT-OFF AND COMMUNICATION SYSTEM UTILIZING SAME

TECHNICAL FIELD

The present invention relates to an electrical component comprising a combination of plural functioning members, as well as to an emergency stop system and a communications apparatus including the same.

BACKGROUND ART

There has been known a switch assembly, such as shown in FIG. 63 for example, as an electrical component for use in a bus-system network and the like which communicates a communication signal composed of a voltage signal by way of two bus lines. A switch assembly 1 comprises a pressing section 2, an operating shaft 3, an adaptor 4 and a communication-function incorporating contact 5.

The pressing section 2 accepts an operation given by an operator. The operator can change the state of the contact 5 by depressing the pressing section 2 in a direction of an arrow Y1. At this time, the operating shaft 3 shifts its position in association with the movement of the pressing section 2.

On the other hand, the communication-function incorporating contact 5 includes a switch section 7 serving as a switch for switching contacts. The switch section 7 is operated in conjunction with the operating shaft 3. Specifically, when the operator depresses the pressing section 2 in the direction of the arrow Y1, the operating shaft 3 is slidably moved in an direction of an arrow Y2 to depress the switch section 7 of the contact 5 in a direction of an arrow Y3 thereby changing the sate of the switch assembly 1. This causes the communication-function incorporating contact 5 to output a communication signal.

The adaptor 4 includes one contact mounting portion 9. This contact mounting portion 9 is capable of mounting a single contact.

FIG. 64 is a connection diagram in which the switch assembly 1 is connected to a network with a bus line BL by way of the communication-function incorporating contact 5 thereof. The communication-function incorporating contact 5 is connected to a CPU 15 via the bus line BL. The CPU 15 is adapted to receive an information communication signal issued by the communication-function incorporating contact 5.

The communication-function incorporating contact 5 outputs an ON or OFF signal depending upon the operation given by the operator. The CPU 15 receives this signal to control the operations of a motor M1 via another CPU 17.

The switch assembly 1 of such a configuration has the following drawbacks. Specifically, the switch assembly 1 with the communication-function incorporating contact 5 may be connected to the bus-system network so that an integral management may be provided for controlling the state of the switch assembly the same way as the other devices connected to the bus-system network are controlled.

However, the aforesaid switch assembly 1 is incapable of transmitting the operation of the operator directly to a target device. More specifically, the communication-function incorporating contact 5 is arranged as follows. When the operator manipulates a push button 11, the communication-function incorporating contact 5 transmits an information piece corresponding to the operation of the push button to the CPU 15 which is connected therewith. The CPU 15, in turn, issues a command to the device and the like.

If, at this time, the CPU 15 is disabled due to some abnormality, the operation given by the operator will never be transmitted to the target device. This leads to a disadvantage particularly when the power supply to the apparatus must be shut off in an urgent condition such as emergency stop.

On the other hand, it may be contemplated that a switch assembly incorporating no communication function is used instead of the switch assembly 1 with the communication-function incorporating contact 5 shown in FIG. 63. In a case where a plurality of switch assemblies of this type are disposed on an electric switchboard, wirings on a back side of the electric switchboard are as shown in FIG. 65. There is a problem that a large volume of complicated wirings is required for the connection of the individual switch assemblies.

In the general bus-system network, two bus lines (+V line and 0V line) are used, as the aforesaid bus line BL (see FIG. 64), for communicating the communication signal composed of voltage signal. The switch assembly 1 with the communication-function incorporating contact 5 is connected to such a bus-system network as shown in FIG. 66, for example.

As seen in FIG. 66, the circuitry of the switch assembly 1 is made up of the communication-function incorporating contact 5 (hereinafter referred to as "communications contact") and a switch section 21. The communications contact 5 comprises an integrated communication circuit incorporating an input interface 22 (hereafter the interface is abbreviated as "I/F"), having a positive supply terminal Vin thereof connected to a positive +V bus line B1 as well as a zero-volt terminal Z and a ground terminal GND thereof connected to a reference 0V bus line B2. On the other hand, transmission terminals INP, INM of the communications contact 5 are connected to the both bus lines B1, B2. The communications contact 5 communicates the communication signal of voltage signal superimposed on the bus lines B1, B2.

By the way, the switch section 21 is connected to an input terminal Din of the input I/F 22. Manipulating the switch section 21 switches the level of the input terminal Din of the input I/F 22, thereby changing the operation mode of the communications contact 5. The switch section 21 conventionally employs a switch 21a of a contact-making configuration. A large capacitor 21b is connected in parallel with the switch 21a for preventing chattering at On/Off switching operations.

The switch 21a and the capacitor 21b constitute the switch section 21. It is noted that a reference character 23 denotes a pull-up resistor for the input terminal Din of the input I/F 22.

Unfortunately, if the switch section 21 comprises the switch 21a of the contact-making configuration, a high current need be conducted in order to ensure stable operations of the switch. This results in an increased amount of heat generation, which leads to a fear of degrading the quality or reliability of the component. Particularly where the switch sections 21 are collectively disposed, it is difficult to spare an adequate space for heat release and an even greater amount of heat generation results. Furthermore, the high current value constitutes a drawback of increase in the power consumption. In addition, the provision of the capacitor 21b for preventing the chattering results in an increased size of the switch section 21.

As shown in FIG. 66, it is a conventional practice to connect a surge-absorbing Zener diode 25 between the transmission terminals INP, INM for removal of surge noises invading the transmission terminals INP, INM of the communications contact 5 via the bus lines B1, B2.

In such a bus-system network, all the communications contacts 5 are connected in parallel with the transmission lines. Accordingly, the transmission path inclusive of the communications contacts 5 must have a small capacity in order to provide high-speed communications of communication signals of voltage signals between the plural communications contacts 5. Furthermore, it is preferred to limit the capacity between the transmission terminals INP, INM of the communications contact 5 to the minimum possible level in order to permit the greatest possible number of communications apparatuses to be connected to the network.

Unfortunately, a single Zener diode 25 is limited in the ability to accomplish the reduction of the capacity between the transmission terminals INP, INM. Thus, it has been impossible for a single Zener diode 25 to accomplish a sufficient reduction of the capacity of the transmission path inclusive of the communications contacts 5.

On the other hand, each of the communications contacts 5 must have a high impedance for holding a high impedance of the overall transmission path thereby ensuring that waveforms of the voltage signals as the communication signals are correctly communicated among the plural communications contacts 5 in the bus-system network. A coil is used as means for increasing the impedance of the communications contact 5. Particularly, an open magnetic circuit coil, which is less costly than a closed magnetic circuit coil, has conventionally been employed from the standpoint of cost-effectiveness.

The open magnetic circuit coil consists of a hollow bobbin and windings wound thereover. As shown in FIGS. 67, and 68, for example, an open magnetic circuit coil 27 is often disposed substantially at a center of an assembly body 28 or 29 of the switch assembly 1 incorporating the communications contact 5. In this case, the coil 27 is disposed in a manner that an axis of the coil 27 is in parallel with a direction orthogonal to a longitudinal direction of the assembly body 28 or 29.

However, the assembly body 28 or 29 with the coil 27 disposed substantially at the center thereof encounters the following problem. In a case where plural switch assemblies 1 individually incorporating the communications contacts 5 therein are arranged in juxtaposition, magnetic fluxes from adjoining coils 27 interfere with each other so as to cancel depending upon the orientations of the coils 27 as shown in FIGS. 67 and 68 (arrows in FIGS. 68 and 69 indicate the directions of the magnetic fluxes). As a result, the coils are decreased in inductance.

Therefore, the individual switch assemblies 1 must be juxtaposed as the communications contacts 5 spaced from one another to a degree that the magnetic fluxes from the adjoining coils 27 are kept out of interference. Otherwise, as shown in FIG. 70, the individual switch assemblies 1 incorporating the communications contacts 5 must be arranged in a manner that the adjoining coils 27 are positioned to direct the magnetic fluxes therefrom in orthogonal relation (as indicated by the arrows in FIG. 70) thereby keeping the magnetic fluxes therefrom out of interference. In either case, an increased installation space results.

It is a first object of the present invention to provide an electrical component, such as a switch assembly, which permits an integral management through network and contributes to space saving, and which permits the operation or the like given by the operator to directly affect the target device thereby ensuring the operation of the target device.

It is a second object of the present invention to provide an emergency stop system featuring more safe and reliable operations.

It is a third object of the present invention to accomplish an extended service life and reduced power consumption of switch means for use in a communications apparatus employing the above electrical component.

It is a fourth object of the present invention to reduce the capacity of the overall transmission path in the network by decreasing the capacity of the communications apparatus.

It is a fifth object of the present invention to achieve an increased impedance of the communications apparatus without increasing the size thereof.

DISCLOSURE OF THE INVENTION

According to the present invention for achieving the above-mentioned first object, the electrical component comprises a combination of a plurality of functioning members of different functions which each perform a predetermined input and/or output operation, wherein the functioning members are each driven by one or more driving members. In this case, the functioning members may preferably include at least a direct functioning member providing an output for switching between a conductive state and a non-conductive state, and an information input/output functioning member for inputting and/or outputting an information signal.

Such a configuration provides a compact combination of plural functioning members of different functions such as the direct functioning member and the information input/output functioning member, thus contributing to the reduction of installation space. Furthermore, the configuration permits a single driving unit to positively drive the plural functioning members of different functions such as the direct functioning member and the information input/output functioning member.

The electrical component according to the present invention is characterized in that the driving member includes an operation transmitting member receiving an operation given by an operator and transmitting the received operation, and that the functioning members are each connected to the operation transmitting member for receiving the operation transmitted from the operation transmitting member.

Such a configuration permits the operation transmitting member to transmit the operation of the operator to the respective functioning members and to switch each of the functioning members to a predetermined output state based on a content of the operation.

The electrical component according to the present invention is characterized in that the functioning members include at least a direct functioning member providing an output for switching between a conductive state and a non-conductive state according to the operation transmitted from the operation transmitting member, and an information input/output functioning member for inputting and/or outputting an information signal corresponding to the operation transmitted from the operation transmitting member.

According to such a configuration, the operation transmitting member causes the direct functioning member to provide an output for switching to the conductive state or to the non-conductive state depending upon the content of the operation as well as switches the information input/output functioning member to an information signal receiving state and/or an information signal outputting state.

The electrical component according to the present invention is characterized in that the functioning members include at least a direct functioning member providing an output for switching between a conductive state and a non-conductive state according to the operation transmitted from the operation transmitting member, and an information input/output functioning member for inputting and/or outputting an information signal corresponding to a received input.

According to such a configuration, the operation transmitting member causes the direct functioning member to provide an output for switching to the conductive state or to the non-conductive state depending upon the content of the operation as well as switches the information input/output functioning member to an information signal receiving state and/or an information signal outputting state.

The electrical component according to the present invention is characterized in that the operation transmitting member includes an operation receiving member for receiving the operation given by the operator, and an adaptor member including an operation-receiving-member dedicated connection portion for connection with the operation receiving member, and a functioning-member dedicated connection portion having a standardized configuration for connecting the functioning member. Such a configuration permits the operation receiving member and the functioning member to be interconnected via the adaptor member.

The electrical component according to the present invention is characterized in that the operation transmitting member includes an operation member directly receiving the operation given by the operator, and an operation connection member including a functioning-member dedicated connection portion having a standardized configuration for connecting the functioning member, and that the operation member and the operation connection member are combined by means of an operation-adaptor member. Such a configuration facilitates the connection of the operation member and the operation connection member, the connection structures of which are not compatible with each other.

The electrical component according to the present invention is characterized in that the driving member includes an operation transmitting member receiving an operation given by an operator and transmitting the received operation, that the operation transmitting member incorporates therein at least either one of a direct functioning member, as the functioning member, providing an output for switching between a conductive state and a non-conductive state according to the operation transmitted from the operation transmitting member, and an information input/output functioning member, as the functioning member, for inputting and/or outputting an information signal corresponding to the operation transmitted from the operation transmitting member, that at least either one of the information input/output functioning member and the direct functioning member is designed to be connectable, and that either the direct functioning member or the information input/output functioning member that is incorporated in the operation transmitting member, and either the information input/output functioning member or the direct functioning member that is connected with the operation transmitting member are both designed to function in response to the operation.

Such a configuration dispenses with a procedure for connecting the direct functioning member or the information input/output functioning member.

The electrical component according to the present invention is characterized in that the operation transmitting member includes an operation receiving member for receiving an operation given by an operator, and an adaptor member including an operation-receiving-member dedicated connection portion for connection with the operation receiving member, and a functioning-member dedicated connection portion having a standardized configuration for connecting the functioning member, and that either the direct functioning member or the information input/output functioning member that is incorporated in the operation transmitting member is incorporated in the adaptor member.

Such a configuration permits a concurrent use of the adaptor member and the direct functioning member or the information input/output functioning member.

The electrical component according to the present invention is characterized in that the direct functioning member or the information input/output functioning member includes a lighting component. Such a configuration permits a concurrent use of the direct functioning member or the information input/output functioning member and the lighting component.

The electrical component according to the present invention is characterized in that the operation transmitting member or the adaptor member includes a lighting component. Such a configuration permits a concurrent use of the operation transmitting member or the adaptor member and the lighting component.

The electrical component according to the present invention is characterized in that the operation transmitting member is designed to be connectable with the functioning member including a lighting component performing a lighting operation under control of a control unit. Such a configuration permits the use of the functioning member including the lighting component performing the lighting operation under control of the control unit.

The electrical component according to the present invention is characterized in that the operation transmitting member is designed to be connectable with the functioning member including a lighting component performing a lighting operation under control of a control unit, and that the functioning member with the lighting component and the information input/output functioning member are designed to be in direct electrical connection with each other. Such a configuration permits the information input/output functioning member and the functioning member with the lighting component to directly communicate an electrical signal with each other.

The electrical component according to the present invention is characterized in that the lighting component is of a power saving, high luminance type. Such a configuration accomplishes a reduced power consumption of the lighting component performing the lighting operation while enhancing the luminance of the lighting component.

The electrical component according to the present invention is characterized in that the operation transmitting member is connectable with an intermediary member for providing the functioning member with an operation output corresponding to the operation given to the operation transmitting member. Such a configuration permits the operation given to the operation transmitting member to be outputted to the functioning member via the intermediary member.

The electrical component according to the present invention is characterized in that the adaptor member is designed to permit the connection of an intermediary member with the functioning-member dedicated connection portion, the intermediary member providing the functioning member with an operation output corresponding to the operation given to the operation transmitting member. Such a configuration permits the use of the intermediary member regardless of the use of the adaptor member.

The electrical component according to the present invention is characterized in that the operation transmitting member includes a plurality of connection portions permitting the direct functioning member and the information input/output functioning member to be concurrently connected therewith. Such a configuration permits the direct functioning member connected via the connection portion to provide an output for switching between a conductive state and a non-conductive state while placing the information input/output functioning member in a state to receive the information signal and/or a state to output the information signal.

The electrical component according to the present invention is characterized in that the direct functioning member to be connected with the operation transmitting member includes an operation-transmitting-member dedicated connection portion for connection with the operation transmitting member, and that the information input/output functioning member includes an operation-transmitting-member dedicated connection portion which is compatible with the operation-transmitting-member dedicated connection portion of the direct functioning member.

Such a configuration permits the operation-transmitting member to be connected with the information input/output functioning member, in place of the direct functioning member to be connected therewith.

The electrical component according to the present invention is characterized in that the information input/output functioning member to be connected with the operation transmitting member includes an operation-transmitting-member dedicated connection portion for connection with the operation transmitting member, and that the direct functioning member includes an operation-transmitting-member dedicated connection portion which is compatible with the operation-transmitting-member dedicated connection portion of the information input/output functioning member.

Such a configuration permits the operation transmitting member to be connected with the direct functioning member, in place of the information input/output functioning member to be connected therewith.

The electrical component according to the present invention is characterized in that the functioning member is designed to receive an operation outputted from the intermediary member. Such a configuration permits the functioning member to receive the operation via the intermediary member.

The electrical component according to the present invention is characterized in that the intermediary member changes an operating direction of the operation received from the operation transmitting member and then outputs the resultant operation to the functioning member. Such a configuration permits the operation outputted from the operation transmitting member to be changed in the operating direction before outputted to the functioning member.

The electrical component according to the present invention is characterized in that the intermediary member provides the functioning member with the operation received from the operation transmitting member as maintaining an operating direction thereof as it is. Such a configuration permits the operation outputted from the operation transmitting member to be outputted to the functioning member without being changed in operating direction.

The electrical component according to the present invention is characterized in that the operation transmitting member and each functioning member are formed in one piece. Such a configuration provides a more compact electrical component.

The electrical component according to the present invention is characterized in that the operation transmitting member includes an operation receiving member for receiving the operation given by the operator; an adaptor member having an operation-receiving-member dedicated connection portion for connection with the operation receiving member and a functioning-member dedicated connection portion for connecting the functioning member; and a functioning member having an adaptor-member dedicated connection portion to be connected with the functioning-member dedicated connection portion of the adaptor member.

Such a configuration permits the operation receiving member and the functioning member to be interconnected via the adaptor member.

The electrical component according to the present invention is characterized in that the adaptor member has a plurality of functioning-member dedicated connection portions, thus designed to permit a part of or the all of the functioning-member dedicated connection portions to be concurrently connected with a plurality of functioning members. Such a configuration permits one or more functioning members to be connected with the functioning-member dedicated connection portions of the adaptor member.

The electrical component according to the present invention is characterized in that the operation transmitting member includes: an operation receiving member having a plurality of adaptor-member dedicated connection portions and receiving the operation given by the operator; and an adaptor member having a functioning-member dedicated connection portion for connecting the functioning member and designed to be connectable with a part of or the all of the adaptor-member dedicated connection portions at a time.

Such a configuration permits the adaptor member to be concurrently connected with a part of or the all of the plural adaptor-member dedicated connection portions of the operation receiving member.

The electrical component according to the present invention is characterized in that the functioning member includes a functioning-member dedicated connection portion for connecting any one of the other functioning members. Such a configuration permits connection between the functioning members.

The electrical component according to the present invention is characterized in that the adaptor member incorporates therein any one of the functioning members except for the functioning member connected therewith. According to such a configuration, two types of functioning members can be used by utilizing the adaptor member.

The electrical component according to the present invention is characterized in that the adaptor member incorporates therein a lighting component. According to such a configuration, the use of the adaptor member permits the lighting component to be used concurrently.

The electrical component according to the present invention is characterized in that the lighting component is of a power saving, high luminance type. Such a configuration accomplishes a reduced power consumption of the lighting component performing the lighting operation while enhancing the luminance of the lighting component.

The electrical component according to the present invention is characterized in that the adaptor member changes an operation stroke and/or an operation position received by the operation receiving member and then provides the resultant operation to the functioning member. Such a configuration permits the stroke or the operation position of the operation receiving member to be changed.

The electrical component according to the present invention is characterized in that the operation-receiving-member dedicated connection portion of the adaptor member includes a base member fixed to the operation receiving member, and a fixing member for fixing a main body of the adaptor member to the base member. Such a configuration permits the operation receiving member and the fixing member to be fixed to each other by mean of the base member and the adaptor member.

The electrical component according to the present invention is characterized in that the adaptor member includes an intermediary-member dedicated connection portion for connecting the intermediary member for providing the functioning member with an operation output corresponding to the operation given to the adaptor member, and that the intermediary-member dedicated connection portion has a standardized configuration with respect to the operation-receiving-member dedicated connection portion and the functioning-member dedicated connection portion.

Such a configuration permits the intermediary member to be connected with a member connectable with the functioning member such as the operation transmitting member, adaptor member and the like, obviating the need for differentiating the intermediate member from the functioning member.

The electrical component according to the present invention is characterized in that the operation transmitting member includes: an operation member directly receiving the operation given by the operator; an operation-adaptor member having an operation-member dedicated connection portion for connection with the operation member, and an operation-connection-member dedicated connection portion; and an operation connection member having an operation-adaptor-member dedicated connection portion for connecting the operation-adaptor member and a functioning-member dedicated connection portion having a standardized configuration for connecting the functioning member, and being connected with the operation-connection-member dedicated connection portion.

Such a configuration permits the operation member and the operation connection member to be interconnected via the operation-adaptor member.

The electrical component according to the present invention is characterized in that the operation-adaptor member changes an operation stroke and/or an operation position received by the operation member and then provides the resultant operation to the functioning member. Such a configuration permits the operation receiving member to be changed in at least either one of the operation stroke and the operation position.

The electrical component according to the present invention is characterized in that the functioning member includes a lighting component having a front-member dedicated connection portion for connection with a front member for indication and performing a lighting operation via the front member, and that the front-member dedicated connection portion has a configuration compatible with that of the direct functioning member or the information input/output functioning member.

Such a configuration provides a functioning member including the lighting component with the front-member dedicated connection portion compatible with the direct functioning member and the information input/output functioning member.

The electrical component according to the present invention is characterized in that each of the functioning members is contained in a casing, that the operation transmitting member is mounted to the casing as allowed to transmit the operation given by the operator, and that the operation transmitting member and each functioning member are integrated into a unit block.

Such a configuration contributes to the reduction of wirings in the bus-system network, for example, because the operation transmitting member and each functioning member are integrated into a unit block. This facilitates the installation of the network and also reduces the installation space for the network as a whole.

The electrical component according to the present invention is characterized in that the functioning members include a direct functioning member providing an output for switching between a conductive state and a non-conductive state and an information input/output functioning member for inputting and/or outputting an information signal, that the direct functioning member and the information input/output functioning member are respectively contained in two sub-casings in detachably connected relation, that the operation transmitting member is mounted to either one of the sub-casings as allowed to transmit the operation given by the operator, and that the operation transmitting member and each of the functioning members are unified. In this case, the sub-casings each may take the form of a connector detachably-connected with the other.

According to such a configuration, the two sub-casings contain the direct functioning member and the information input/output functioning member or take the form of a connector, thereby contributing an efficient mounting, maintenance and design of these functioning members.

The electrical component according to the present invention is characterized in that the a communications contact of the information input/output functioning member has a plurality of output ports for providing control to output devices including the lighting component and the like, and that the same output is assigned to two or more of the plural output ports.

Such a configuration contributes to the reduction of the installation space because the efficient use of the output ports permits the elimination of an additional output port employed for the same purpose.

According to the present invention for achieving the above-mentioned second object, the emergency stop system employing the above electrical component comprises an emergency control unit responding to the information signal from the information input/output functioning member by providing control as to whether a control target is brought into an emergency stop or not and is characterized in that the information input/output functioning member is connected to the emergency control unit whereas the direct functioning member is connected to the control target, and that the direct functioning member brings the control target into an emergency stop according to the operation given to the electrical component by the operator whereas the emergency control unit brings the control target into an emergency stop according to the information signal inputted to and/or outputted from the information input/output functioning member.

Such a configuration is adapted to transmit the operation given by the operator to the target device even if a controller of the network is inoperative due to failure. Therefore, the power to the target device can be shut off particularly in the event of an emergency situation such as an emergency stop. Thus, a more reliable emergency stop system is provided.

According to the present invention for achieving the above-mentioned third object, the communications apparatus for use in a bus-system network employing the above electrical component and communicating a communication signal of voltage signal via two bus lines, the apparatus comprises a communications contact having a communication function, and switch means comprising an operation section for inputting the signal to the communications contact, and is characterized in that the operation section has a contactless switching contact configuration.

According to such a configuration wherein the operation section of the switch means has the contactless switching contact configuration, the operation section is increased in longevity as compared with the conventional contact-making configuration. Furthermore, the power consumption is reduced because the need for flowing high current is dispensed with.

The communications apparatus according to the present invention is characterized in that the operation section comprises a photointerruptor including a light emitting device and a photo acceptance unit, and a light-shielding member to block light emitted from the light emitting device to the photo acceptance unit in conjunction with a depressing operation.

According to such a configuration wherein the operation section of the switch means comprises the photointerruptor and the light-shielding member, the operation section does not require the high current flow unlike the conventional contact-making configuration. Hence, the increased longevity and the decreased power consumption of the operation section are accomplished.

The communications apparatus according to the present invention is characterized in that the operation section comprises a Hall element and a magnet having the number of lines of magnetic flux varied in conjunction with the depressing operation, the lines of magnetic flux intersecting the Hall element. In this case, the operation section may comprise a magnetic resistance element and a magnet having the number of lines of magnetic flux varied in conjunction with the depressing operation, the line of magnetic flux intersecting the magnetic resistance element.

According to such a configuration, the use of the Hall element or the magnetic resistance element provides the increased longevity and the decreased power consumption of the operation section as compared with the conventional contact-making configuration.

The communications apparatus according to the present invention wherein the operation section of the switch means comprises the photointerruptor and the light-shielding member, the apparatus further comprises a current control portion which responds to a movement of the light-shielding member by controlling a carrying current into the light emitting device to a set value for a fixed period of time starting the time when the light from the light emitting device enters the photo acceptance unit, and a retaining section which responds to a movement of the light-shielding member by retaining a level of the input signal to the communications contact for a period of time between the time when the light from the light emitting device enters the photo acceptance unit and the time when the light from the light emitting device is blocked.

According to such a configuration, the current control portion controls the carrying current into the light emitting device to the set value for the predetermined period of time starting from the time when the light from the light emitting device enters the photo acceptance unit. Therefore, the carrying current can be decreased to a value smaller than the set value after the lapse of the predetermined period of time, thus resulting in the decreased power consumption.

In addition, the retaining section retains the level of the input signal to the communications contact during the period of time between the time when the light from the light emitting device enters the photo acceptance unit and the time when the light from the light emitting device is blocked by the light-shielding member, thereby ensuring that the switch means is maintained in the operative state.

According to the present invention for achieving the above-mentioned fourth object, the communications apparatus comprises a plurality of surge absorbing elements arranged in series between two transmission terminals of the communications contact which are connected to the two bus lines.

According to such a configuration, if a Zener diode is used as the surge absorbing element, for example, each of the Zener diodes connected in series presents a smaller capacitance at PN junction than where a single Zener diode is used. Hence, the communications apparatus may present a decreased capacitance between the transmission terminals while maintaining a sufficient surge resistance.

According to the present invention for achieving the above-mentioned fifth object, the communications apparatus comprises a coil disposed in a main body thereof and is characterized in that in a case where a plural number of the communications apparatus bodies are collectively arranged, the coils are located at places shifted from a line through a substantial center of adjoining surfaces of the communications apparatus bodies. In this case, it is preferred that the coils in the respective apparatus bodies are substantially aligned on a line when the plural apparatus bodies are collectively arranged as directing the magnetic fluxes from the respective coils therein in the same direction, whereas the coils are disposed in the respective apparatus bodies in shifted relation with an individual adjacent coil thereto when the plural apparatus bodies are collectively arranged as directing the magnetic fluxes from the respective coils therein in the opposite direction to the magnetic flux from an individual adjoining coil thereto.

According to such a configuration, when plural communications apparatuses are collectively arranged, the coils therein are substantially aligned on a line as directing the magnetic fluxes therefrom in the same direction, or the coils are disposed in shifted relation with one another so that the magnetic fluxes from adjoining coils are in the opposite direction. Hence, the magnetic fluxes from the respective coils are prevented from canceling one another so that a decreased impedance of the communications apparatus can be avoided.

Best Modes for Practicing the Invention
(First Embodiment)

Figure 1:
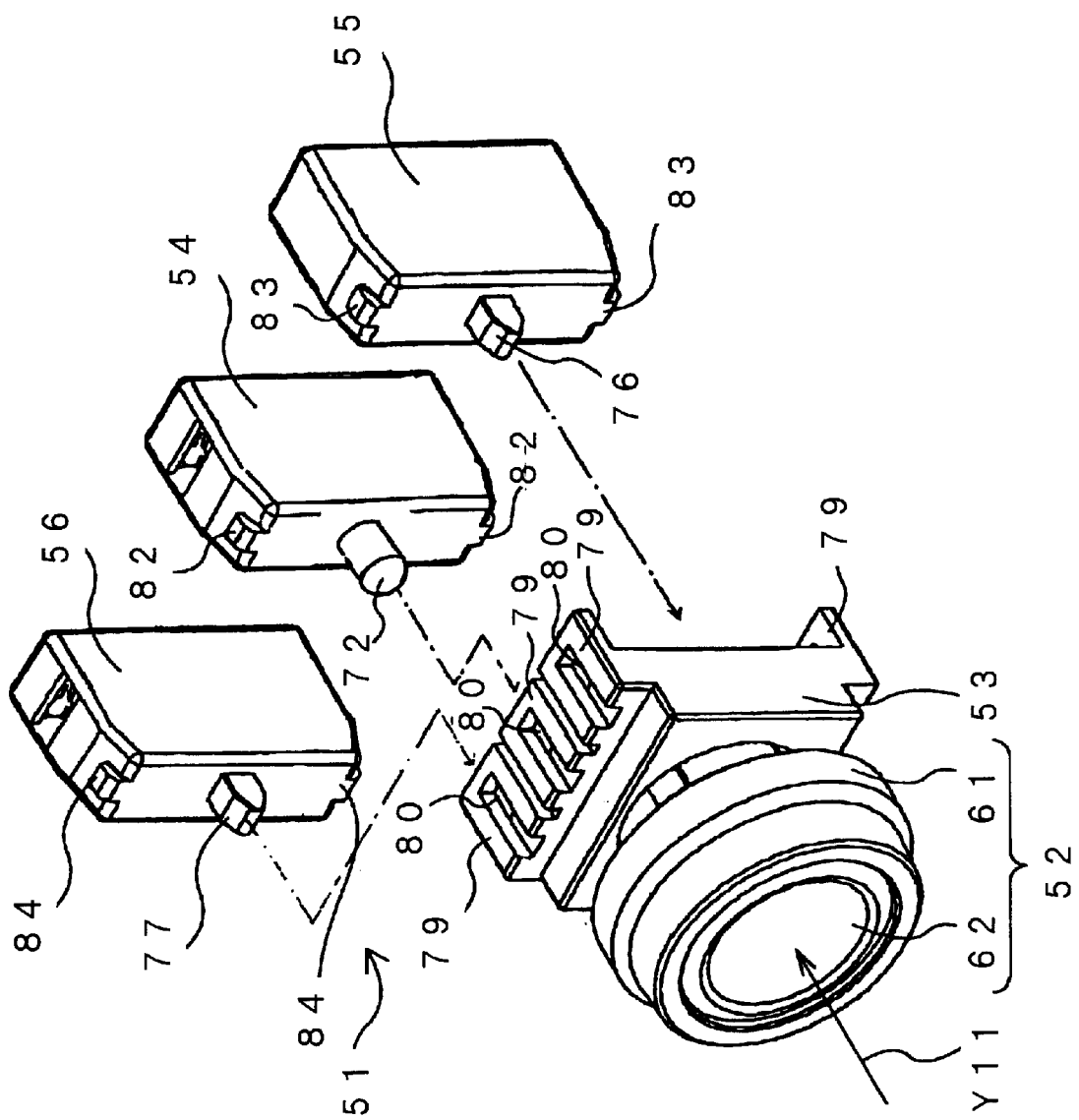
FIG. 1 is a disassembled oblique perspective view of a switch assembly according to a first embodiment hereof as seen from the front side.
Figure 2:
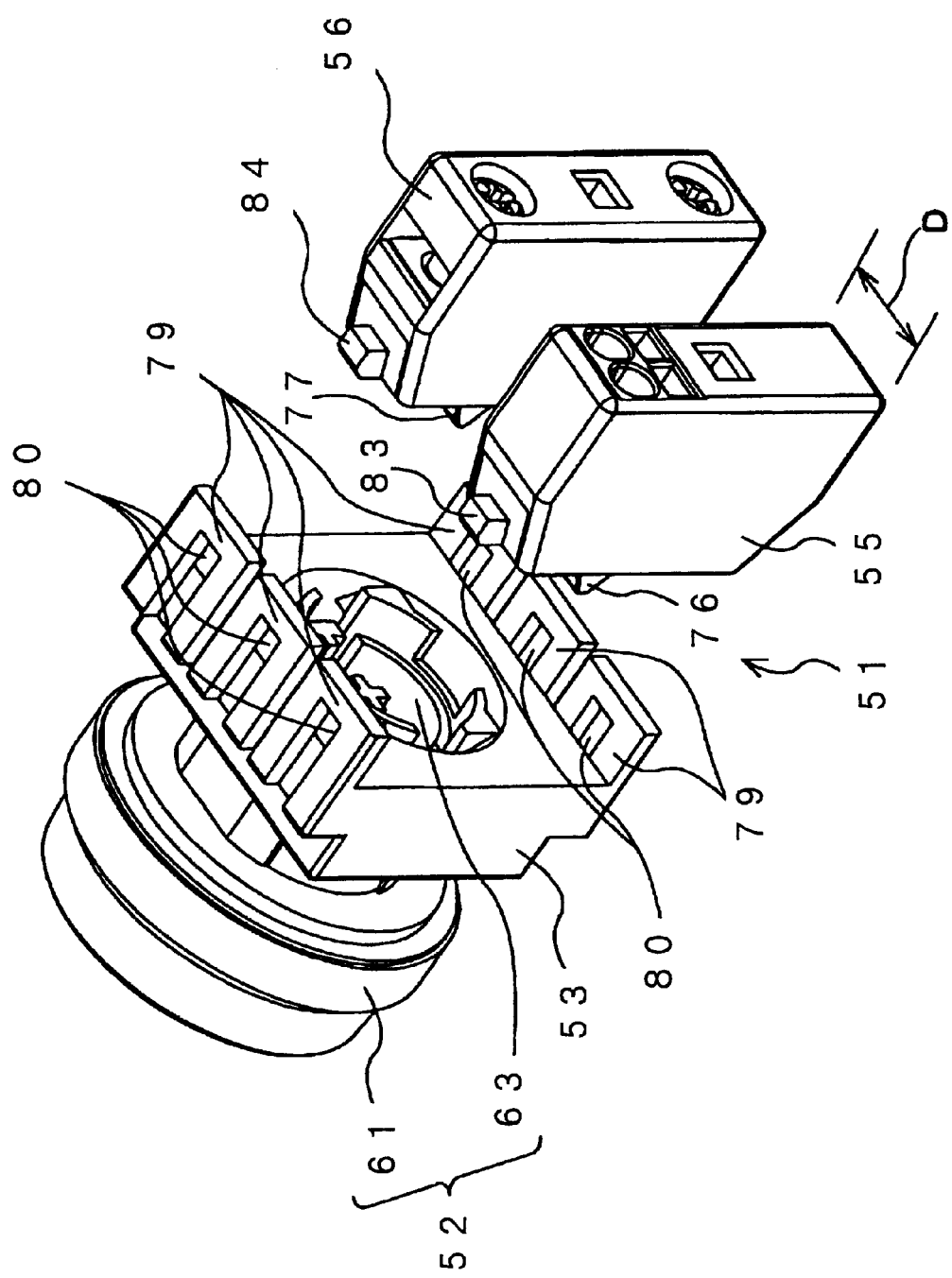
FIG. 2 is a disassembled oblique perspective view of the switch assembly of the first embodiment as seen form the rear side.
Figure 3:
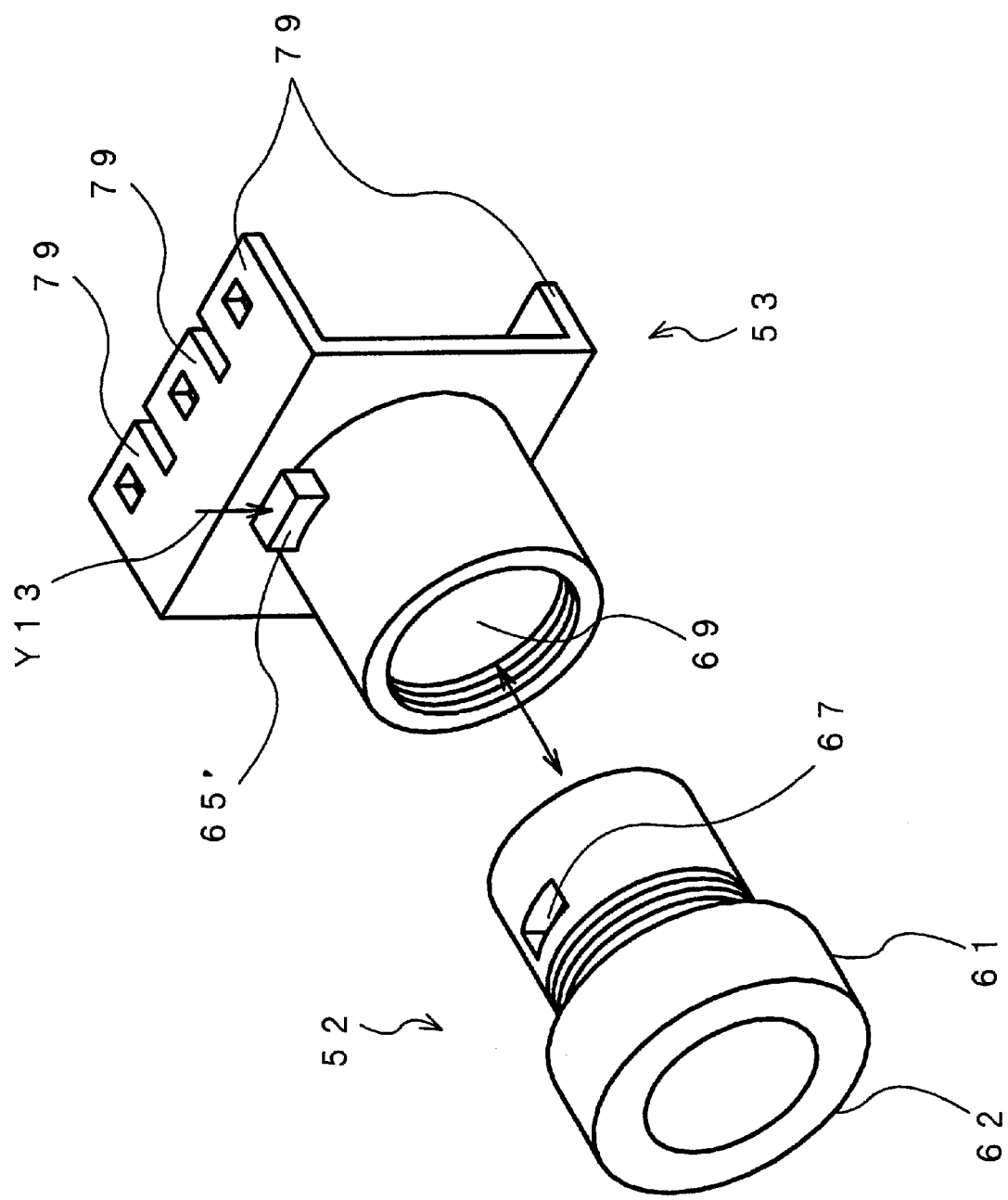
FIG. 3 is a disassembled oblique perspective view of a part of the switch assembly of the first embodiment.
Figure 4:
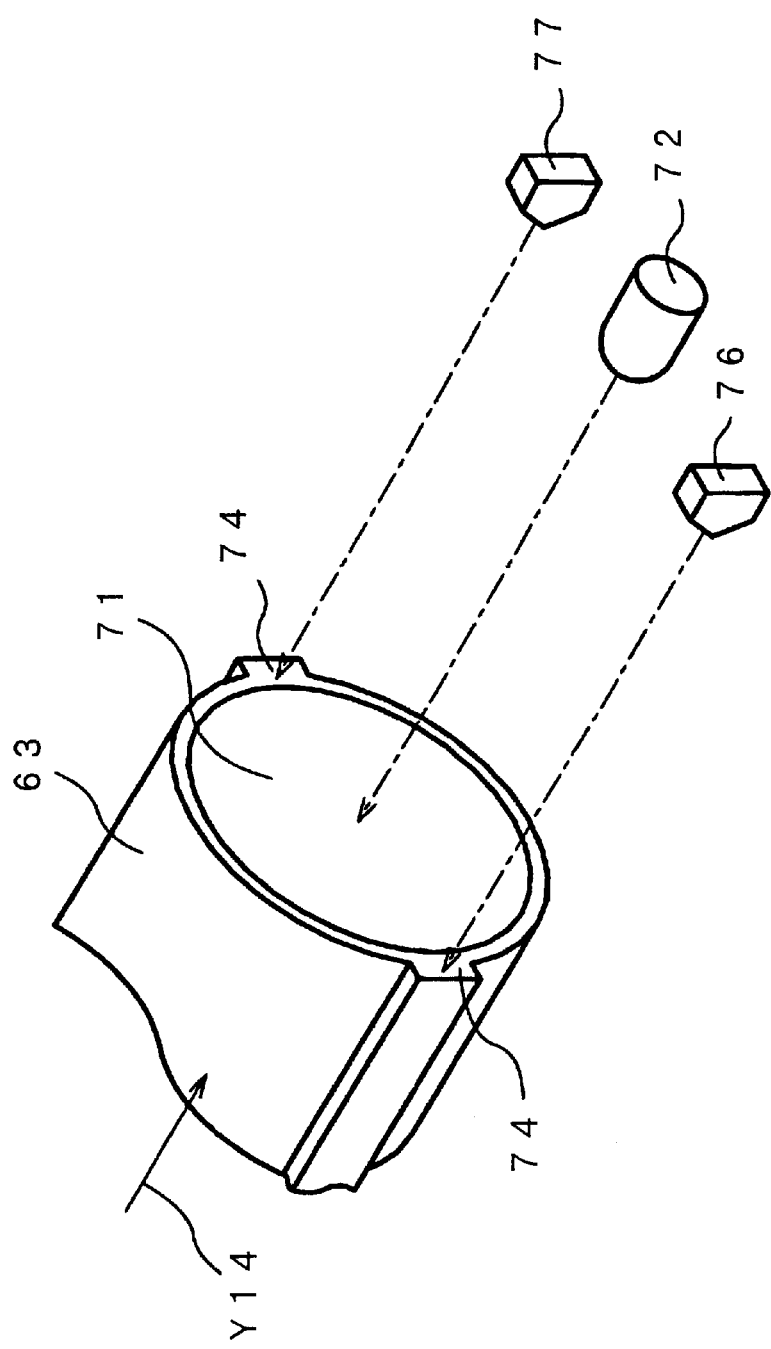
FIG. 4 is a disassembled oblique perspective view of another part of the switch assembly of the first embodiment.
Figure 5:
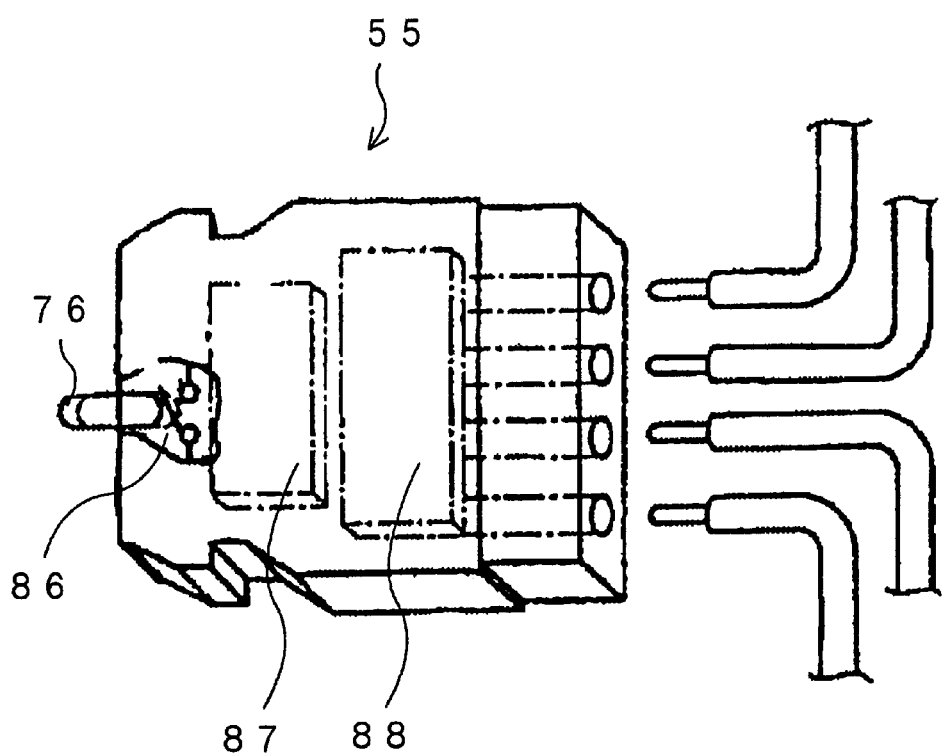
FIG. 5 is a disassembled oblique perspective view of yet another part of the switch assembly of the first embodiment.
Figure 6:
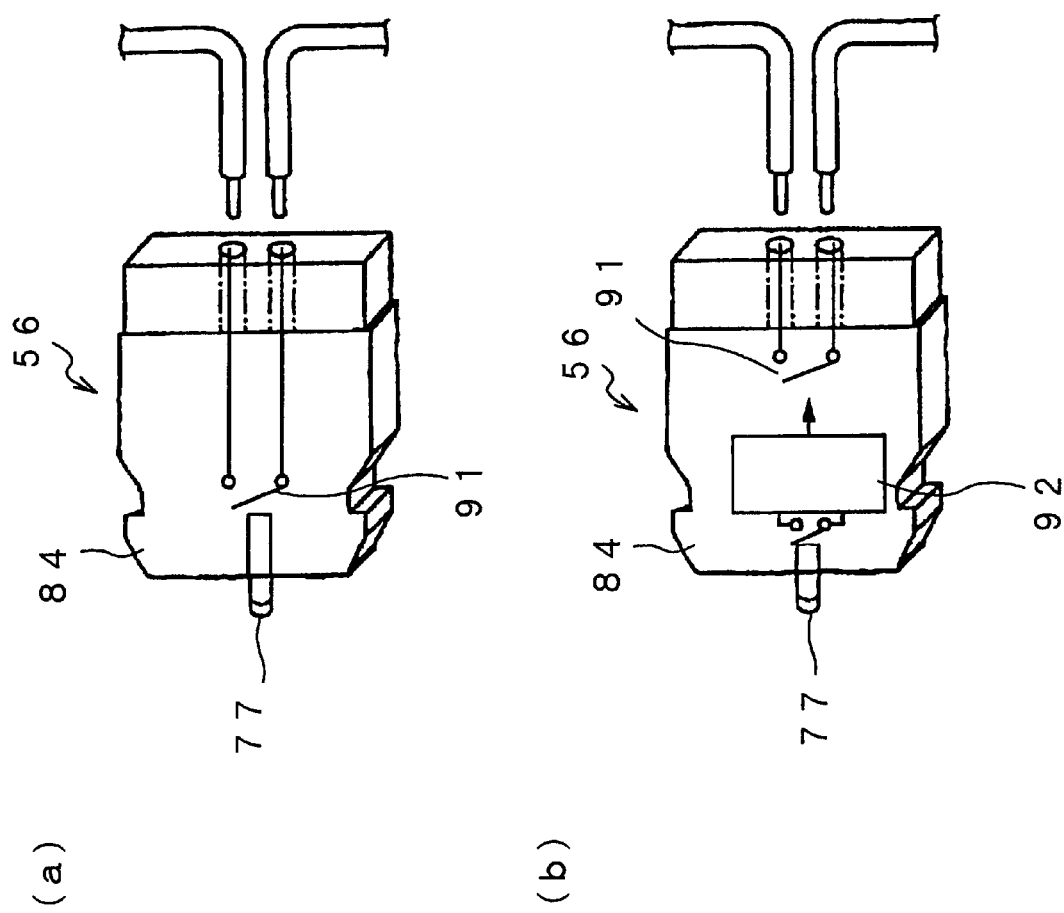
FIG. 6 is a group of explanatory diagrams of an operation of the switch assembly of the first embodiment.
Figure 7:
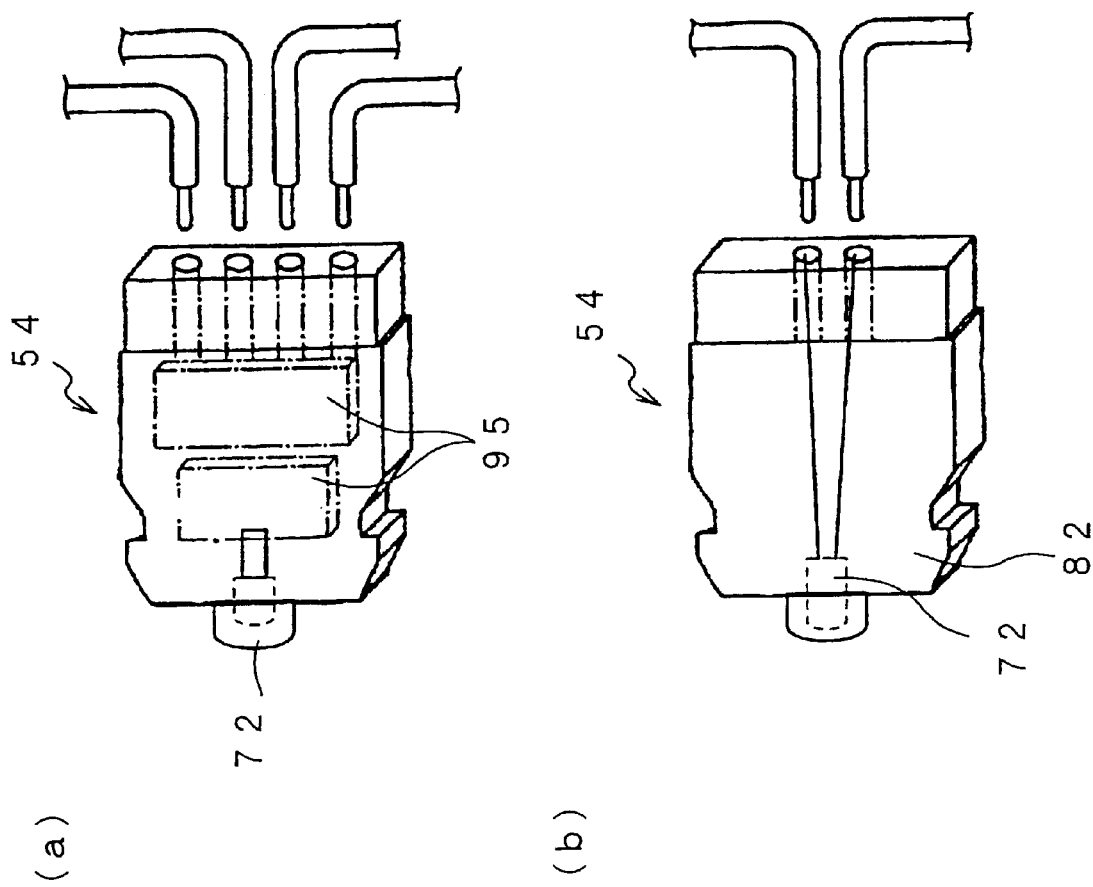
FIG. 7 is a group of explanatory diagrams of an operation of the switch assembly of the first embodiment.
Figure 8:
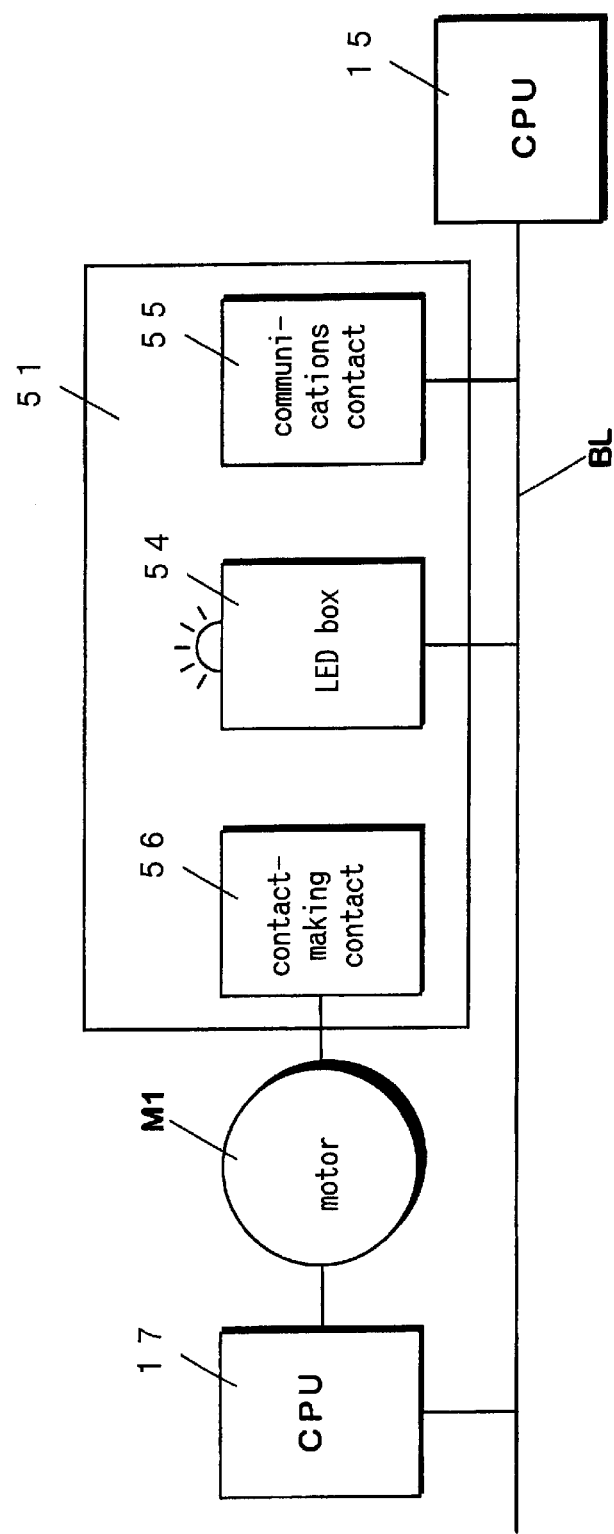
FIG. 8 is a connection block diagram of the switch assembly of the first embodiment in use.
Figure 9:
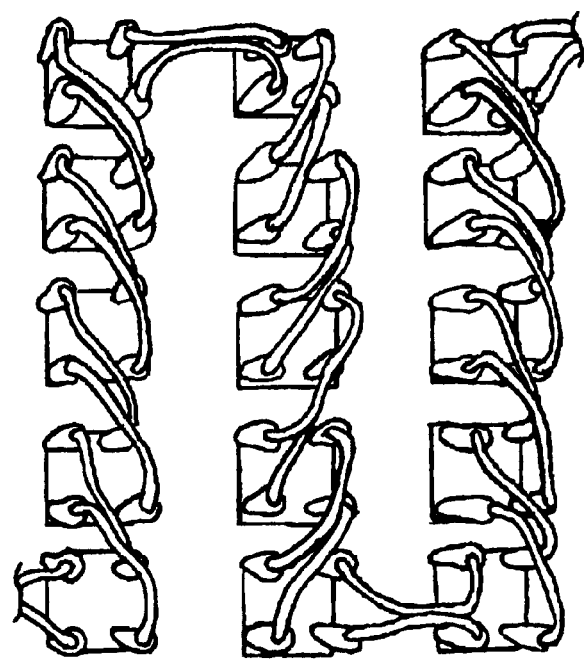
FIG. 9 is an explanatory diagram of the switch assembly of the first embodiment in use.
Figure 10:
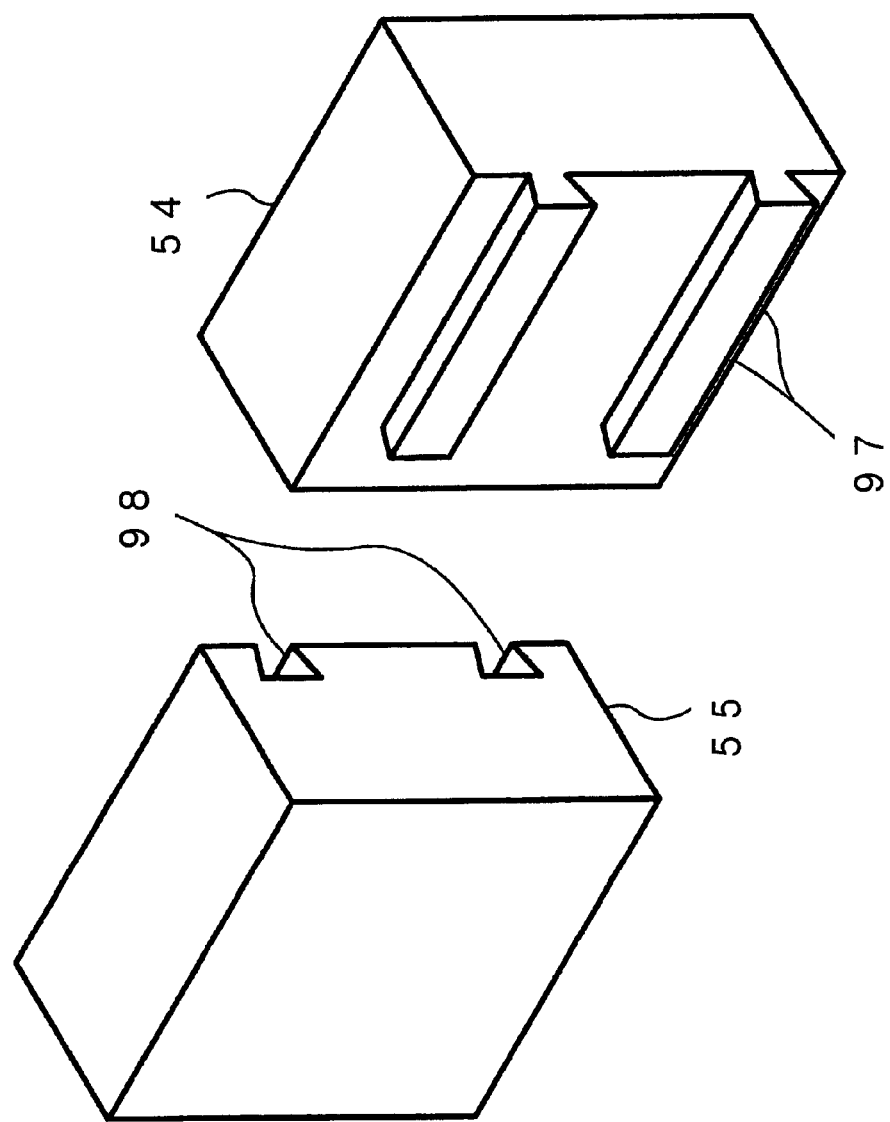
FIG. 10 is an oblique perspective view showing an exemplary modification of the switch assembly of the first embodiment.

A switch assembly according to a first embodiment of the present invention will be described with reference to FIGS. 1 to 11. It is noted that FIG. 1 is a disassembled oblique perspective view of the switch assembly as seen from the front side; FIG. 2 a disassembled oblique perspective view thereof as seen from the rear side; FIG. 3 a disassembled oblique perspective view of a part thereof; FIG. 4 a disassembled oblique perspective view of another part thereof; FIG. 5 an oblique perspective view of yet another part thereof; FIGS. 6 and 7 explanatory diagrams of an operation thereof; FIG. 8 a connection block diagram of the switch assembly in use; FIG. 9 an explanatory diagram of the switch assembly in use; FIG. 10 an oblique perspective view of an exemplary modification thereof; and FIG. 11 a connection block diagram showing a circuit configuration of the assembly of FIG. 10.

As shown in FIGS. 1 and 2, a switch assembly 51 comprises a push-button section 52, a push-button body 53, an LED box 54, a communication-function incorporating contact (hereinafter referred to as "communications contact") 55, and a contact-making contact 56. Now, description will be made on a configuration of each of the parts.

<Push-Button Section>

First, the push-button section 52 includes a casing 61, a push button 62 and an operating shaft 63 (see FIG. 2). The push button 62 is designed to move in a direction of an arrow Y11 in conjunction with a pressing force along this direction. In this case, the push button 62 is adapted to receive a force from a spring or the like incorporated therein in an opposite direction to the arrow Y11, thereby returned to its initial position at the demise of the pressing force in the direction of the arrow Y11.

The push-button section 52 and the push-button body 53 are designed to be separable from each other. A mounting structure for the push-button section 52 and the push-button body 53 is constructed as shown in FIG. 3, for example. As seen in FIG. 3, the push-button body 53 is formed with a projection 65 movable in a direction of an arrow Y13 whereas the push-button section 52 is formed with a recess 67 at place for engagement by the projection 65 of the push-button body 53. Thus, the push-button section 52 and the push-button body 53 are detachably combined together by way of the projection 65 and the recess 67.

The push-button section 52 is inserted in an aperture 69 of the push-button body 53 so as to be set at a predetermined position. In this case, the position of the recess 67 of the push-button section 52 is previously aligned with the position of the projection 65 of the push-button body 53. Subsequently, the projection 65 is depressed in the direction of the arrow Y13 thereby fixedly combining the push-button section 52 with the push-button body 53.

It is noted that the present invention is not limited to the illustrated construction and any construction is usable that is adapted to fix the push-button section 52 and the push-button body 53 to each other. For instance, they may be fixed to each other by way of a screw and a nut in threaded engagement relation.

Next, the operating shaft 63 and other components have a relationship as shown in FIG. 4. The operating shaft 63 is formed with a recess 71 at its end, an interior of which is hollowed out. The recess 71 is adapted to receive an LED 72 of the LED box 54 as will be described hereinafter. That is, the recess 71 receives the LED 72 thereby preventing the LED 72 from interfering with the movement of the operating shaft 63.

The operating shaft 63 has a cylindrical shape and is formed with projections 74 at opposite places on an outer periphery of the end thereof. When depressed in a direction of an arrow Y14, the operating shaft 63 brings these projections 74 into abutment against switching projections 76, 77 respectively formed at the communications contact 55 and the contact-making contact 56, so that the switching projections 76, 77 are pressed in. This establishes a state in which a built-in switch of each contact is actuated to change the state of the contact. In this manner, an operation given to the push button 62 by the operator is received and transmitted to the LED box 54, the communications contact 55 and the contact-making contact 56.

<Push-Button Body>

Returning to FIG. 1, the push-button body 53 is formed with three contact dedicated connectors 79 individually having a pair of connection portions at an upper and a lower sides of the push-button body in order to permit connection with the LED box 54, the communications contact 55 and the contact-making contact 56. The contact dedicated connectors 79 are individually formed with apertures 80 which are engaged with projecting connectors 82, 83, 84, thereby fixing the LED box 54, the communications contact 55 and the contact-making contact 56 to the push-button body 53.

It is noted that the present invention is not limited to the illustrated construction and any construction is usable that is capable of fixing the LED box 54, the communications contact 55 and the contact-making contact 56 to the push-button body 53. As shown in FIG. 3 for example, a structure such as for fixing the push-button section 52 to the push-button body 53 by depressing the projection may be employed.

In this manner, the push-button body 53 permits both the communications contact 55 and the contact-making contact 56 to be concurrently connected therewith.

<Communications Contact>

As shown in FIGS. 1 and 2, the communications contact 55 is formed with the switching projection 76 and a pair of projecting connectors 83. The projecting connectors 83 are configured to be compatible with a pair of projecting connectors 82 formed at the LED box 54 and with a pair of projecting connectors 84 formed at the contact-making contact 56.

Now referring to FIG. 5, an internal configuration of the communications contact 55 is described. As seen in FIG. 5, the communications contact-55 serves as the information input/output functioning member for outputting an information signal corresponding to an operation given to the push-button section 52 by the operator and includes therein a switch section 86, an interface section 87 and a communications section 88.

The switch section 86 is connected to the communications section 88 via the interface section 87. The switch section 86 comprises the switching projection 76 and a switch such as of a photoelectric switch, magnetic switch, mechanical switch or the like. The switch section is switched between ON and OFF positions by the switching projection 76 moved in conjunction with the aforesaid movement of the operating shaft 63. The change of the sate of the switch section 86 causes a corresponding signal to be outputted. The signal is converted to a digital signal by the interface section 87, which sends the resultant signal to the communications section 88.

Based on the digital signal thus received, the communications section 88 generates a communication signal conforming to a predetermined communications protocol. The communication signal thus generated is issued to the network via a communications cable. The communications section 88 is capable of receiving an external signal as well as of providing an output of an information signal based on the external signal thus received.

<Contact-Making Contact>

An internal configuration of the contact-making contact 56 is described with reference to FIG. 6(a). The contact-making contact 56 comprises the switching projection 77, the projecting connector 84 and a switch 91. The projecting connector 84 is configured to be compatible with the projecting connector 82 formed at the LED box 54 and with the projecting connector 83 formed at the communications contact 55.

The contact-making contact 56 serves as the direct functioning member for providing an output for switching between a conductive state and a non-conductive state corresponding to the operation given to the push button 62 by the operator. The contact-making contact includes therein the switch 91 capable of switching a connected device and the like between ON and OFF positions. The switch 91 is switched between ON and OFF positions by the switching projection 77 moved in conjunction with the movement of the operating shaft 63.

It is noted that the contact-making contact 56 is not limited to the configuration wherein the operation of the operating shaft 63 is immediately responded by switching the switch 91 to ON or OFF position. As shown in FIG. 6(b), the contact-making contact may have a configuration wherein a timer section 92 is provided within the contact body for switching the switch 91 to ON or OFF position after a lapse of a predetermined period of time subsequent to the operation of the operating shaft 63.

<LED Box>

An internal configuration of the LED box 54 is described with reference to FIG. 7(a). The LED box 54 comprises the LED 72 as a lighting component, and the projecting connector 82. The projecting connector 82 is configured to be compatible with the projecting connector 83 formed at the communications contact 55 and with the projecting connector 84 formed at the contact-making contact 56.

The LED box 54 includes therein a circuit 95 for receiving a control signal from the bus line or the like. It is noted that the LED 72 is inserted and accommodated in the recess 71 of the cylindrical operating shaft 63 (see FIG. 4).

It is noted that the LED box 54 is not limited to that connected to the bus line or the like for receiving the control signal from an external source but may be designed simply to be applied with current from an external source (see FIG. 7(b)).

<Specific Examples of Use of Switch Assembly>

An emergency stop system employing the switch assembly 51 of the aforementioned configuration is described with reference to FIG. 8. As shown in FIG. 8, the LED box 54 and the communications contact 55 are connected to the CPU 15 via the bus line. BL. The contact-making contact 56 is connected to the motor M1 as the driving unit.

The CPU 17 is provided for abnormality monitoring purpose, thus constantly monitoring the state of the communications contact 55. On the other hand, the CPU 15 transmits to the LED box 54 a control signal according to the state of the communications contact 55. For instance, when the communications contact 55 is switched to ON state, the CPU sends a control signal such as to activate the LED 72, thereby causing the LED 72 of the LED box 54 to light up. Thus, the LED box 54 effects the lighting operation of the LED 72 (light-up, light-off, flash and the like) according to the states of the communications contact 55 and the contact-making contact 56.

In addition, the emergency stop system is provided with two paths for deactivating the motor M1, as shown in FIG. 8. One of the paths interconnects the communications contact 55, the CPU 15, the CPU 17 and the motor M1 via the bus line BL. The other path is for directly deactivating the motor M1 via the contact-making contact 56.

In the case of the former path, when the switch assembly 51 is manipulated by the operator, the communications contact 55 outputs an information signal indicative of the operation given to the switch assembly 51 while the CPU 15 detects the signal through the bus line BL to output a control signal directing to deactivate the motor M1. The CPU 17, in turn, responds to the control signal from the CPU 15 by deactivating the motor M1.

In the case of the latter path, when the switch assembly 51 is manipulated by the operator, the contact-making contact 56 is switched to the non-conductive state thereby directly deactivating the motor M1.

Thus, the present invention is particularly advantageous in that the provision of the latter path as well as the former path offers the ability to deal with a shut-off of the communication path, malfunction of the CPU and the like. Furthermore, the switch assembly 51 is arranged such that a single operation given by the operator can effect the deactivation of the motor M1 via the two paths. Therefore, the emergency stop system is further enhanced in safety by applying the switch assembly 51 thereto.

Figure 66:
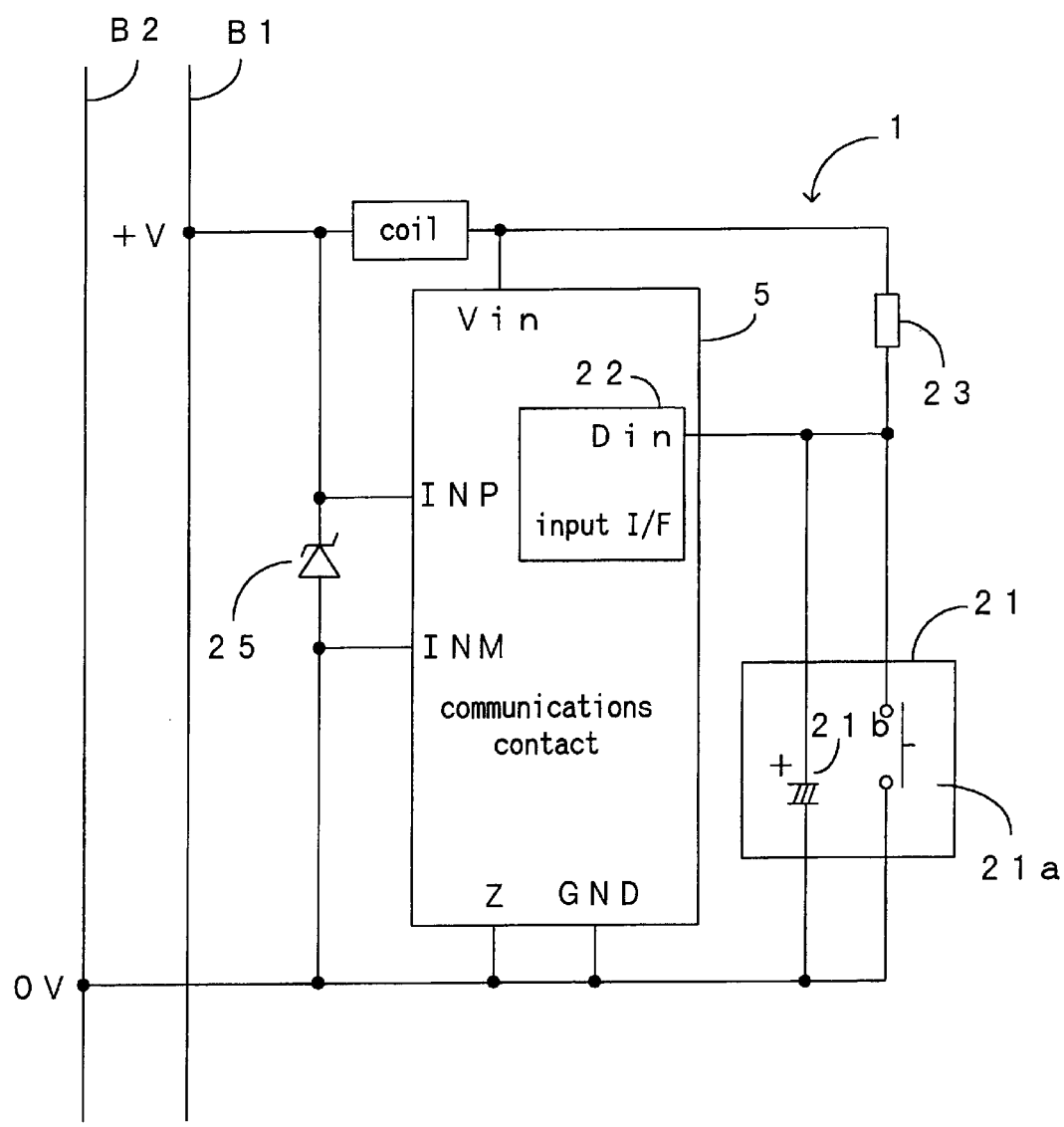
FIG. 66 is connection block diagram of a conventional communications apparatus.
Figure 67:
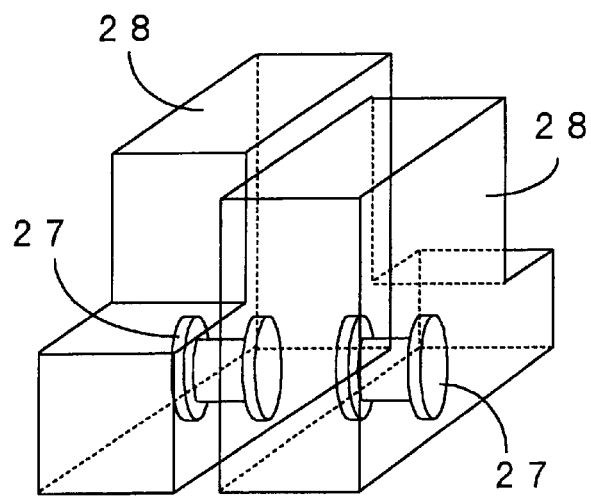
FIG. 67 is an oblique perspective view of the conventional communications apparatus in one use.
Figure 68:
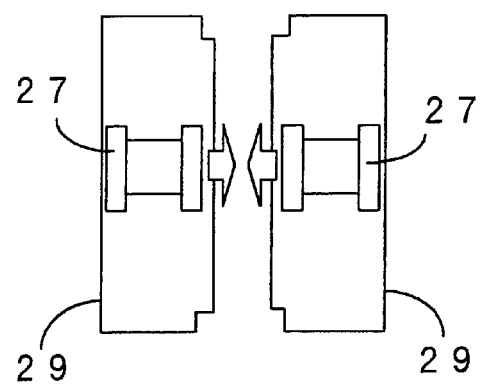
FIG. 68 is a plan view of the conventional communications apparatus in another use.
Figure 69:
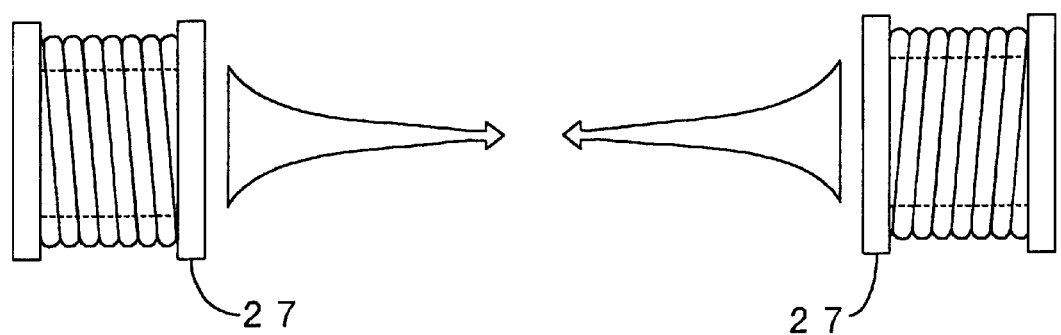
FIG. 69 is an explanatory diagram of an operation of the conventional communications apparatus.
Figure 70:
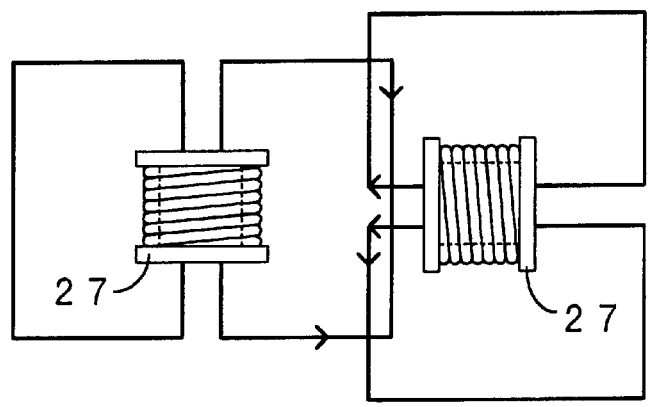
FIG. 70 is an explanatory diagram of an operation of the conventional communications apparatus.

FIG. 9 shows a back side of an electric switchboard to which a plurality of switch assemblies 51 are mounted. By using the switch assemblies 51 in this manner, the wiring layout on the backside of the electric switchboard is more simplified than the conventional wiring layout shown in FIG. 66.

It is noted that the aforesaid push-button section 52 and the push-button body 53 are equivalent to the operation transmitting member of the present invention. The LED box 54 is equivalent to the functioning member of the present invention, having the lighting component which performs the lighting operation under control of the control unit. The communications contact 55 and the contact-making contact 56 are each equivalent to the functioning member of the present invention. Particularly, the communications contact 55 is equivalent to the information input/output functioning member of the present invention; the contact-making contact 56 to the direct functioning member of the present invention; the LED 72 to the lighting component of the present invention; the CPU 15 to the control unit of the present invention; and the motor M1 to the control target of the present invention.

Therefore, the switch assembly 51 of the first embodiment accomplishes a compact combination of plural functioning members of different functions, which include the direct functioning member (the contact-making contact 56), the information input/output functioning member (communications contact 55) and the like. Thus, the installation space can be reduced. In addition, the operation transmitting members (the push-button section 52 and the push-button body 53) as a single driving unit can positively drive the plural functioning members of different functions, such as the direct functioning member, the information input/output functioning member and the like.

In the above first embodiment, the communications contact 55 and the contact-making contact 56 may each be provided with an LED responding to the operation given to the push-button section 52 by performing a lighting operation.

Alternatively, the LED 72 owned by the LED box 54 may be provided to the push-button body 53.

The aforementioned first embodiment is arranged such that the lighting operation of the LED 72 of the LED box 54 is effected in response to the control signal sent from the CPU connected to the network having the bus line BL (see FIG. 8).

However, an exemplary modification of the first embodiment may be made such that the LED 72 directly responds to the signal from the communications contact 55 by performing the lighting operation. In this case, as shown in FIG. 10 for example, the LED box 54 is provided with projections 97 on its lateral side surface and the communications contact 55 is provided with grooves 98 on its lateral side surface whereby the LED box 54 and the communications contact 55 are fixedly combined together. The projection 97 and the groove 98 on the lateral side surfaces are each provided with a contact, such that the LED box 54 and the communications contact 55 may establish a direct electrical connection therebetween when combined together.

Figure 11:
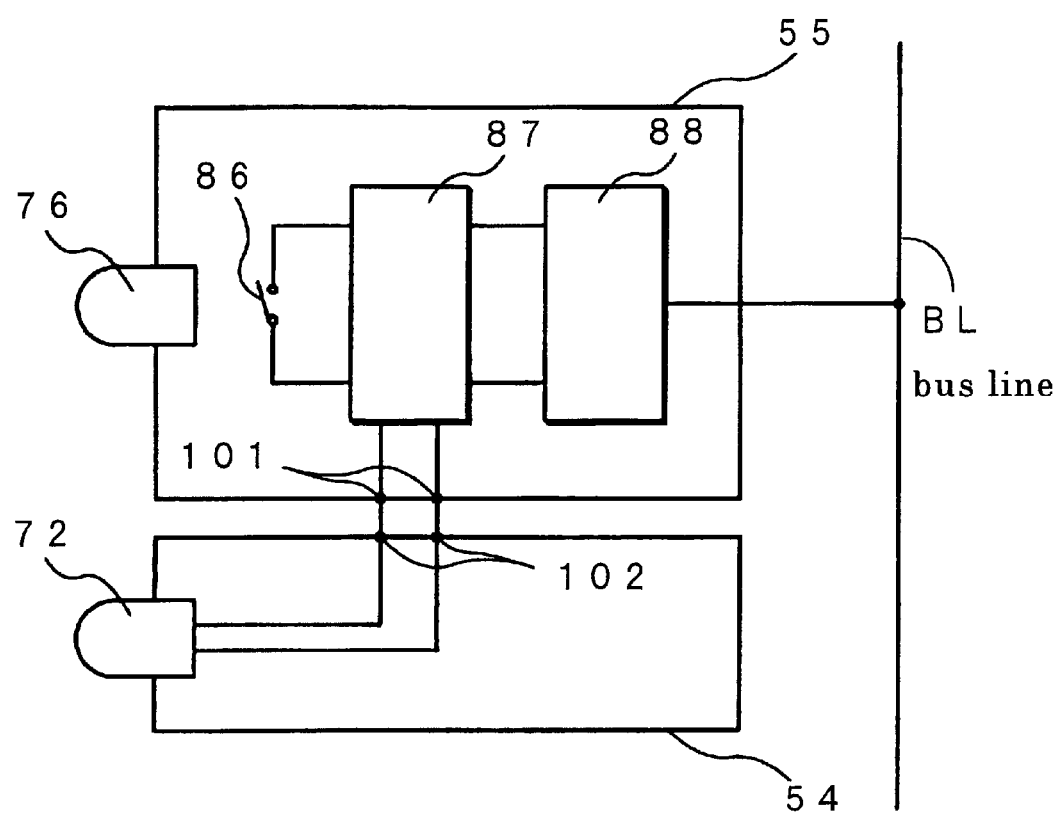
FIG. 11 is a connection block diagram showing a circuit configuration of an exemplary modification of the switch assembly of the first embodiment.

FIG. 11 shows an exemplary circuit configuration of the LED box 54 and the communications contact 55 of this modification. The communications contact 55 has a similar circuit configuration to that shown in FIG. 5 and further includes a contact 101 on its lateral side for establishing an electrical connection with an external device. On the other hand, the LED box 54 has the LED 72 and further includes a contact 102 on its lateral side for establishing an electrical connection with an external device. Thus, the communications contact 55 and the LED box 54 are electrically interconnected by means of the contact 101 of the communications contact 55 and the contact 102 of the LED box 54. The communications section 88 of the communications contact 55 is connected to an external device via the bus line BL (see FIG. 8).

When the push-button 62 is manipulated to activate the communications contact 55, the communications contact 55 transmits an information signal from the communications section 88 to another device via the bus line BL. Receiving this information signal, the CPU issues a lighting signal for causing the LED 72 to light up.

When receiving the lighting signal, the communications contact 55 transmits the lighting signal to the LED box 54 via the communications section 88, the interface section 87 and the contact 101. The LED box 54 receives the lighting signal via the contact 102 to cause the LED 72 to light up.

That is, when the switch assembly 51 is manipulated, the communications contact 55 outputs the information signal, based on which the lighting of the LED 72 of the LED box 54 or the operation of the motor M1 is controlled.

However, an arrangement may be made such that besides the operation of the above switch assembly 51, an operation of another switch assembly connected to the bus line BL (see FIG. 8) provides an output of an information signal, based on which the LED of the switch assembly 51 is caused to light up or the operation of the motor M1 is controlled.

Although the above-mentioned first embodiment employs a normal LED as the LED 72, there may be used a high-performance device such as of four elements or gallium nitride, which features a much higher light emitting efficiency than the conventional LEDs. This contributes a high luminance at low current, thereby avoiding the problem of heat generation when a plurality of switch assemblies are collectively mounted. Incidentally, an incandescent bulb is also usable.

The first embodiment has the arrangement wherein the communications contact 55 is adapted to output the information signal in response to the operator manipulating the push-button section 52. However, the present invention is not limited to this arrangement and any arrangement is possible so long as the information signal can be outputted in response to the operation given by the operator. For instance, a timer unit may be employed such that the information signal is outputted after a lapse of a predetermined period of time subsequent to the operation of the push-button section 52 by the operator.

Furthermore, the first embodiment describes the push-button section 52, the push-button body 53, the LED box 54, the communications contact 55 and the contact-making contact 56 as being independently formed. However, these components may be integrally formed.

In the above first embodiment, the communications contact 55 is designed to output the information signal in response to the operation of the push-button section 52. Alternatively, the communications contact 55 may be designed to receive a certain information signal from somewhere external of the switch assembly 51 via the bus line and to output an information signal corresponding to the received signal. The information input/output functioning member is not limited to the type which outputs the information signal like the communications contact 55 but also includes a type like LED which is applied with the information signal through an operation of an external device, and a type which is adapted for input and output of the information signal.

(Second Embodiment)

Figure 12:
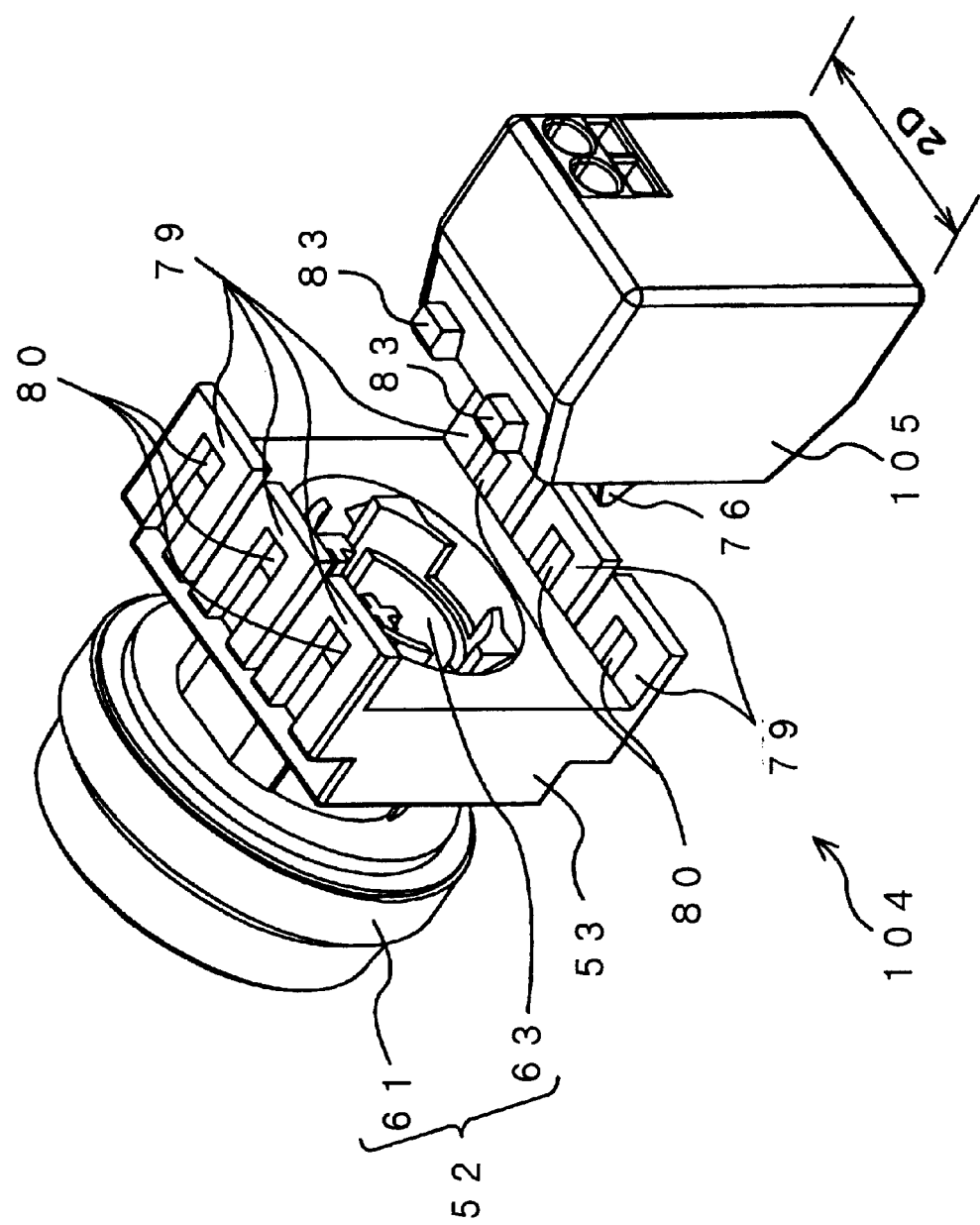
FIG. 12 is a disassembled oblique perspective view of a switch assembly according to a second embodiment hereof.

A switch assembly according to a second embodiment of the present invention will be described with reference to FIGS. 12 to 14. FIG. 12 is a disassembled oblique perspective view of the switch assembly, FIG. 13 a disassembled oblique perspective view of the assembly in use, and FIG. 14 a disassembled oblique perspective view of an exemplary modification of the assembly.

Since an essential arrangement of a switch assembly 104 of this embodiment is the same as that of the switch assembly 51 shown in FIG. 1, like parts in FIG. 12 are represented by the same reference characters as those in FIGS. 1 to 8, respectively. The following description principally focuses on a communications contact 105 having a different configuration from that of the switch assembly 51.

Similarly to the communications contact 55 of the above first embodiment, the communications contact 105 of this embodiment comprises the switching projection 76 and the projecting connector 83. However, this embodiment differs from the first embodiment in that the communications contact 105 has a width '2D' twice the width 'D' of the communications contact 55 and that two pairs of projecting connectors 83 are provided on an upper and a lower sides of the communications contact 105.

Where such a communications contact 105 with the width '2D' is used as combined with the push-button body 53, the push-button body 53 with three pairs of contact dedicated connectors 79 is left with one pair available. Therefore, either one of the communications contact 55 and the contact-making contact 56 having the width 'D', as shown in FIG. 1 for example, may be used as connected with the push-button body 53.

Figure 13:
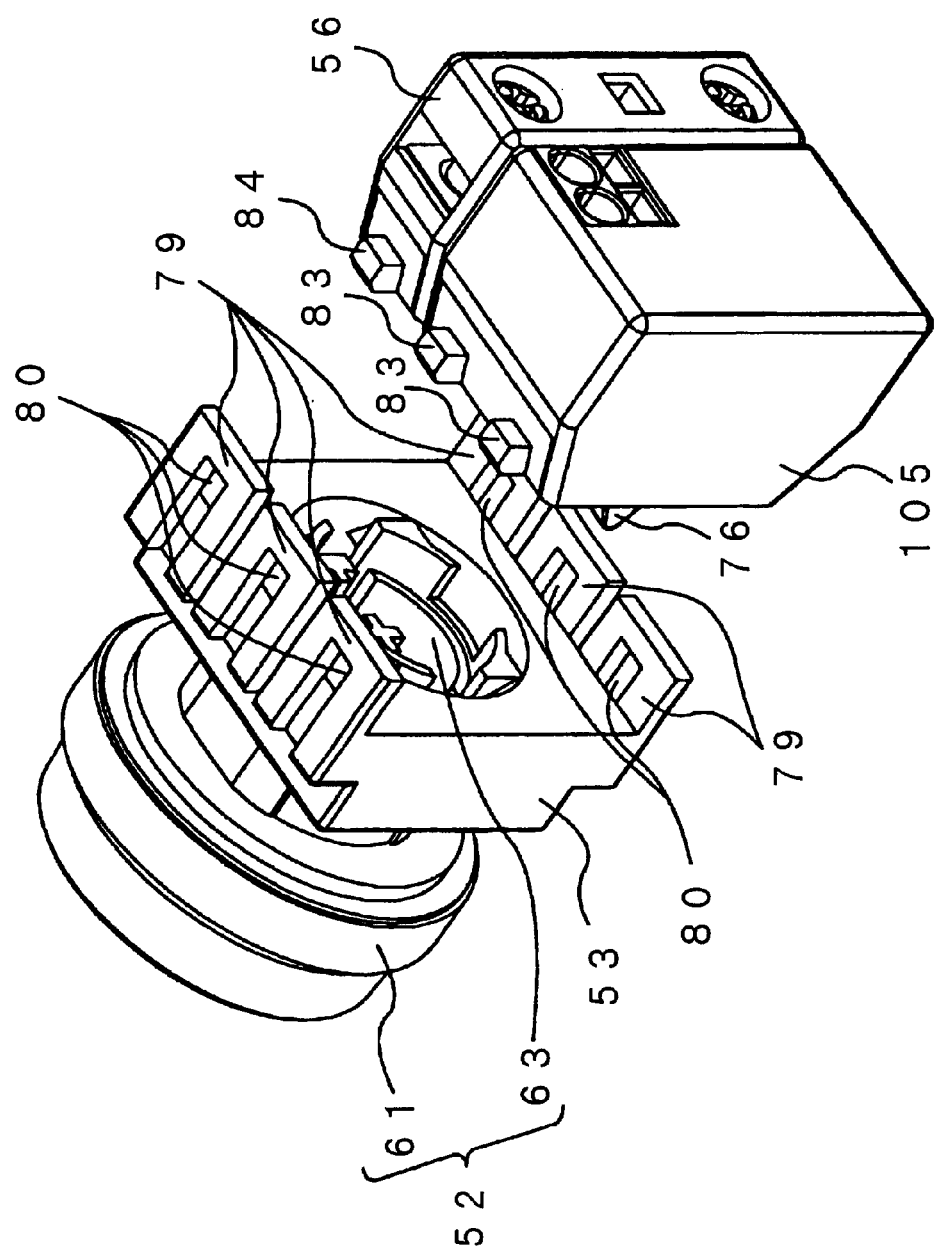
FIG. 13 is a disassembled oblique perspective view of the switch assembly of the second embodiment in use.
Figure 14:
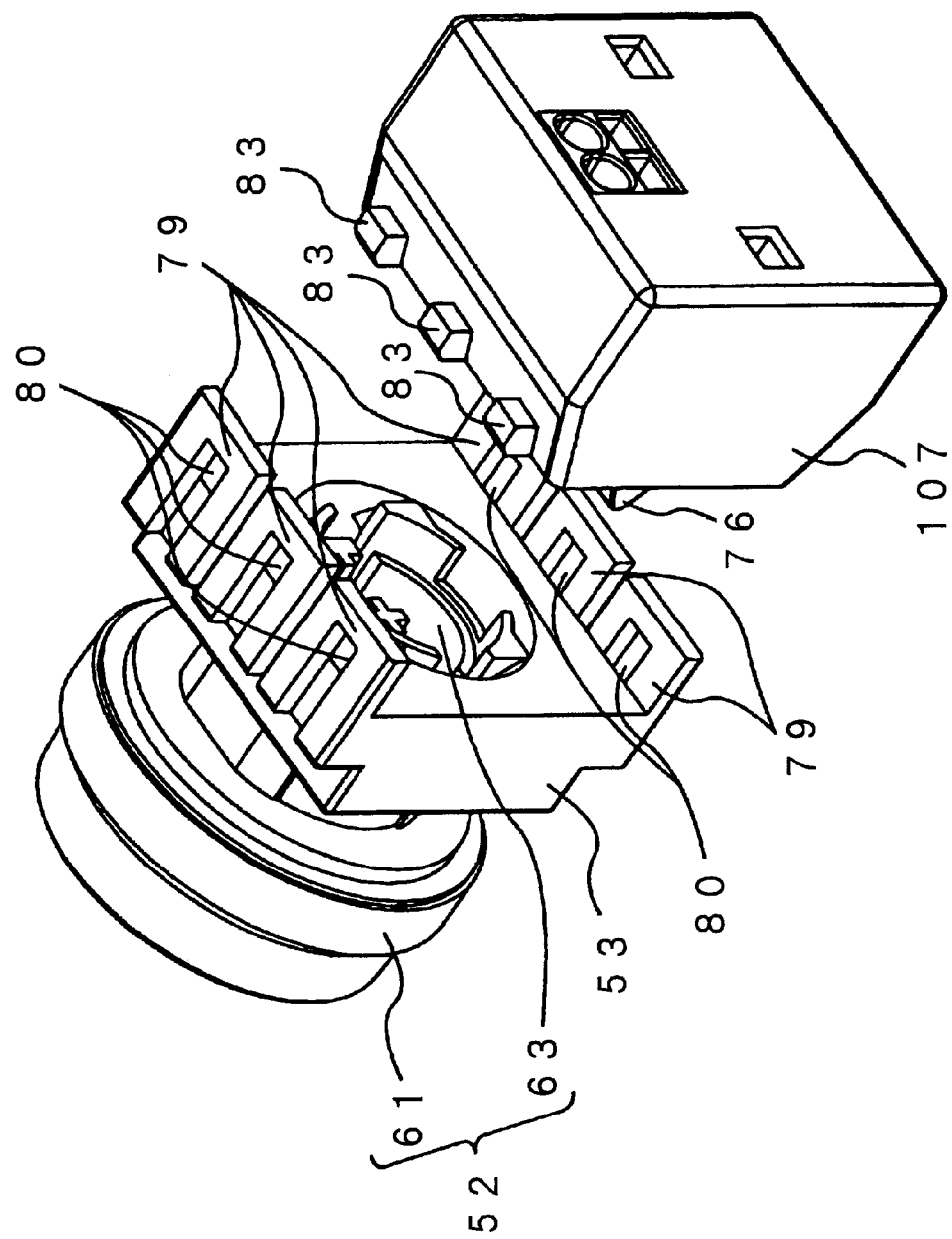
FIG. 14 is a disassembled oblique perspective view of an exemplary modification of the switch assembly of the second embodiment.

FIG. 13 illustrates a case where the communications contact 105 of the width '2D' and the contact-making contact 56 of the width 'D' are used. As seen in FIG. 13, two pairs of projecting connectors 83 of the communications contact 105 are connected with the left-hand two pairs of contact dedicated connectors 79 of the push-button body 53, whereas one pair of projecting connectors 84 of the contact-making contact 56 are connected with the right-hand one pair of contact dedicated connectors 79.

In an exemplary modification of the communications contact 105, the communications contact may have an even greater width of '3D'. FIG. 14 is an external view of a communications contact 107 having a width of '3D'. The communications contact 107 comprises the switching projection 76 and three pairs of projecting connectors 83 disposed in vertical positional relation. The projecting connectors 83 of the communications contact 107 are engaged with three pairs of contact dedicated connectors 79 of the push-button body 53, respectively.

Besides the same effect as in the first embodiment, the second embodiment offers a particular effect when a need exists for accommodating a circuit or the like having a more complicated configuration because this embodiment permits the use of the communications contact 105 of the width '2D' twice the width of the communications contact 55 of FIG. 1 or the communications contact 107 of the width '3D' three times that of the communications contact 55, thereby increasing an internal capacity.

It is noted here that the communications contacts 105, 107 are both equivalent to the information input/output functioning member of the present invention.

The embodiment has been described with reference to the communications contact 105 of the width '2D' which is twice the width of the communications contact 55 and the communications contact 107 of the width '3D' which is three times that of the communications contact 55. Instead of the communications contact, the contact-making contact 56 or the LED box 54 with the width '2D' or '3D' twice or three times the width 'D' may be used as combined with the push-button body 53. Alternatively, any ones of these components may be combined into an integral unit.

(Third Embodiment)

A switch assembly according to a third embodiment of the present invention will be described with reference to FIG. 15. It is noted that FIG. 15 omits the illustration of the LED box 54, the communications contact 55 and the contact-making contact 56 shown in FIG. 1.

Figure 15:
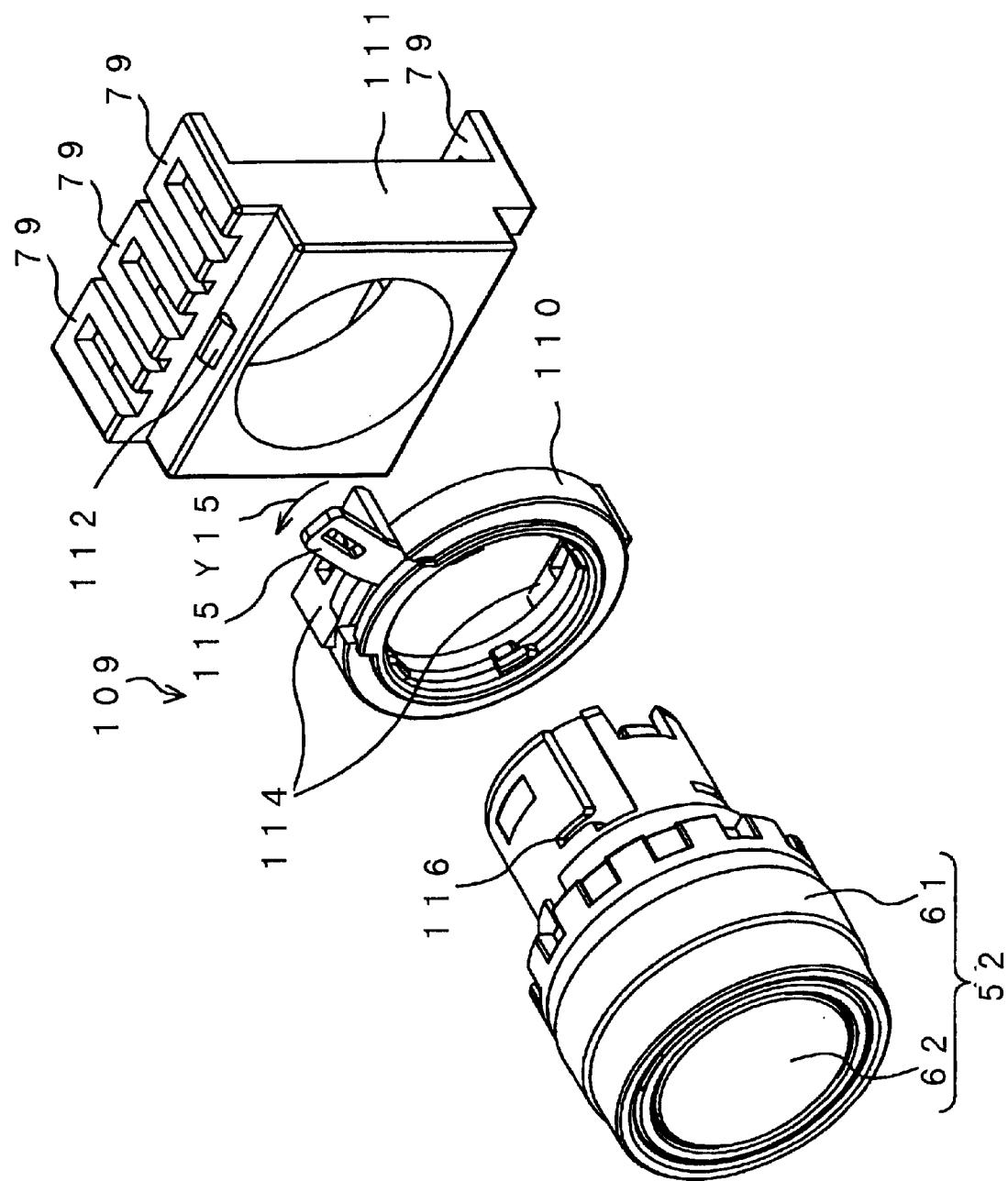
FIG. 15 is a disassembled oblique perspective view of a part of a switch assembly according to a third embodiment hereof.

Since an essential arrangement of a switch assembly 109 of this embodiment is the same as that of the switch assembly 51 shown in FIG. 1, like parts in FIG. 15 are represented by the same reference characters as those in FIGS. 1 to 8, respectively. The switch assembly of this embodiment differs from the above switch assembly 51 in that the push-button body 53 has a different configuration and that a switch adaptor 110 is added. Hence, the following description principally focuses on these differences.

<Push-Button Body>

A push-button body 111 of this embodiment comprises a pair of adaptor-connecting projections 112 (one of which is not shown) in addition to three pairs of contact dedicated connectors 79.

<Switch Adaptor>

The switch adaptor 110 includes a pair of connectors 114. The switch adaptor 110 is fixedly combined with the push-button body 111 by engaging the connectors 114 with the adaptor-connecting projections 112 of the push-button body 111.

The switch adaptor 110 is formed with a push-button engaging projection 115 which is designed to be rotatable in a direction of an arrow Y15 and an opposite direction thereto. The switch adaptor 110 is rotated from a position shown in FIG. 15 in the direction of the arrow Y15 thereby to bring the push-button engaging projection 115 into engagement with an L-shaped engagement groove 116 defined at the push-button section 52. Thus, the switch adaptor 110 is fixedly combined with the push-button section 52.

According to the third embodiment, the provision of the switch adaptor 110 permits the push-button section 52 and the push-button body 111 to be combined for use even if their configurations are not compatible with each other.

In a case where a required contact is designed to be exclusively connectable with a certain push-button body 111 and the use of a particular push-button section 52 is desired, for example, combining the push-button section 52 and the push-button body 111 having incompatible connection structures is impracticable but the use of the switch adaptor 110 of this embodiment permits such push-button section 52 and push-button body 111 to be combined together.

It is noted here that the push-button section 52 is equivalent to an operation member of the present invention, the push-button body 111 to an operation connection member of the present invention, the switch adaptor 110 to an operation-adaptor member of the present invention, and the contact dedicated connector 79 to a functioning-member dedicated connection portion of the present invention.

The above third embodiment has been described by way of the example where the connection between the push-button section 52 and the switch adaptor 110 is accomplished by the structure for establishing engagement between the push-button engaging projection 115 and the engagement groove 116. However, the present invention is not limited to this structure but any structure is usable so long as the push-button section 52 and the switch adaptor 110 can be connected with each other. For instance, the push-button section 52 and the switch adaptor 110 can be combined together as follows. A similar projection to the projection 65 of FIG. 3 is formed at the switch adaptor 110 whereas a similar recess to the recess 67 of FIG. 3 is formed at the push-button section 52. The projection of the switch adaptor 110 is pressed into the push-button section 52 so as to be engaged with the recess thereof whereby the switch adaptor 110 and the push-button section 52 are fixedly combined together.

Furthermore, the third embodiment may be arranged such that the switch adaptor 110 is provided with a position/stroke changing section (see FIG. 24) which will be described hereinafter. Alternatively, such a position/stroke changing section may be disposed at the push-button body 111.

(Fourth Embodiment)

Figure 16:
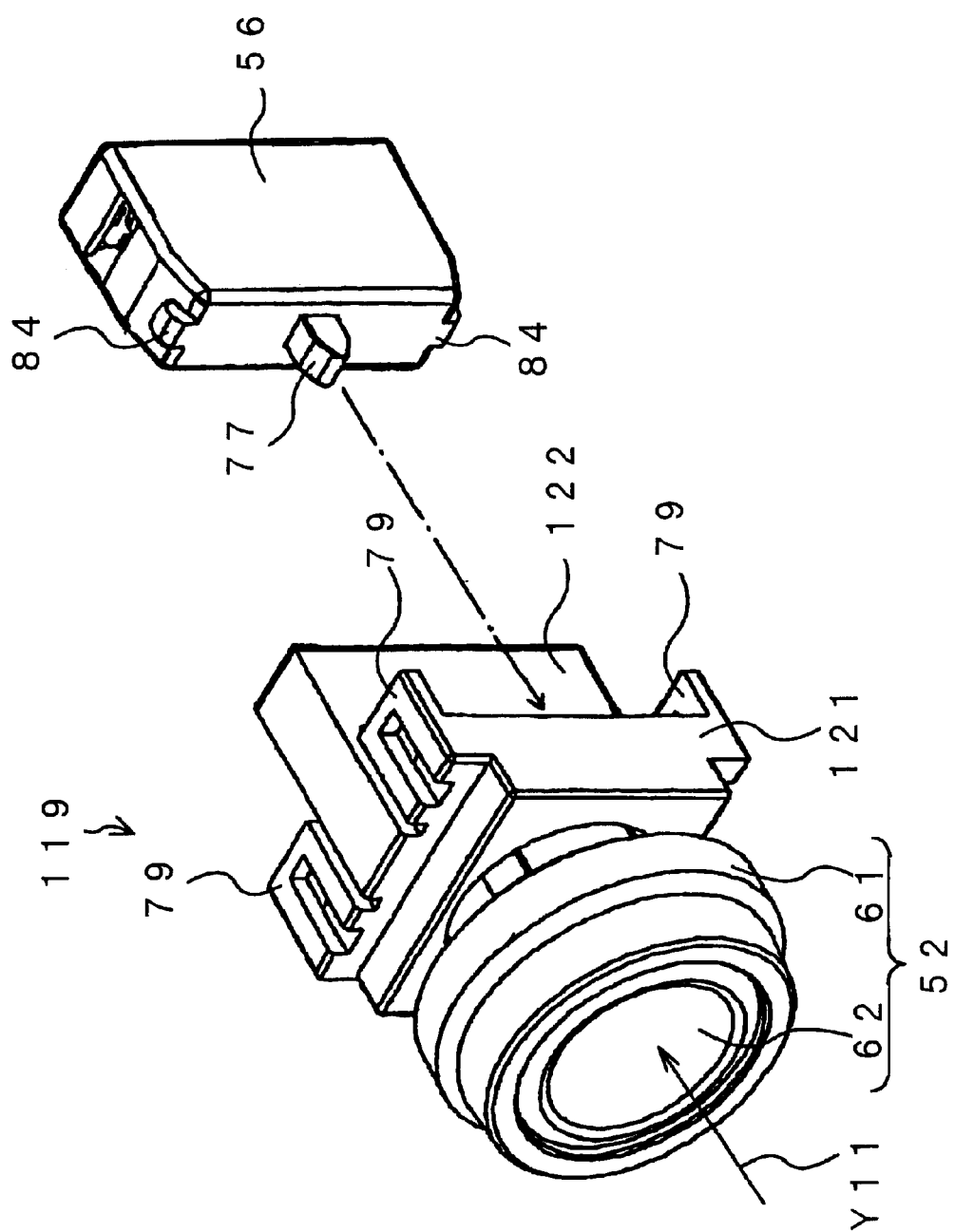
FIG. 16 is a disassembled oblique perspective view of a switch assembly according to a fourth embodiment hereof.

A switch assembly according to a fourth embodiment of the present invention will be described with reference to FIG. 16. Since an essential arrangement of a switch assembly 119 of this embodiment is the same as that of the switch assembly 51 shown in FIG. 1, like parts in FIG. 16 are represented by the same reference characters as those in FIGS. 1 to 8, respectively. The following description principally focuses on a difference from the switch assembly 51.

A push-button body 121 of this embodiment has a configuration wherein the push-button body 53 of FIG. 1 incorporates therein the communications contact 55. That is, the push-button body 121 is integrally formed with a communications block 122 at a center thereof. Disposed on laterally opposite sides of the communications block 122 are a respective pair of contact dedicated connectors 79 having a vertical positional relation. This permits either one of the communications contact 55 and the contact-making contact 56 shown in FIG. 1 to be connected to either the left-hand or the right-hand contact dedicated connector pair 79 or permits both the contacts to be connected to both the contact dedicated connector pairs.

The communications block 122 incorporates therein the switch section 86, the interface section 87, the communications section 88 and the like (see FIG. 5) which are incorporated in the communications contact 55 shown in FIG. 1. Thus, the communications block 122 having the same functions as the communications contact 55 is unified with the push-button body 121. The communications block 122 is also adapted to output an information signal corresponding to an operation given to the push-button section 52 by the operator.

It is noted here that the push-button section 52 and the push-button body 121 are equivalent to the operation transmitting member of the present invention and that the communications block 122 is equivalent to the information input/output functioning member of the present invention.

According to the fourth embodiment, the following advantage is offered. When the switch assembly is connected to the bus-system network, for example, the first embodiment requires an operation for connecting the communications contact 55 to the push-button section 52. In contrast, the fourth embodiment can omit such an operation because the communications block 122 is unified with the push-button body 121. This results in quite a simple operation for connecting the switch assembly to the network.

Although the above fourth embodiment is arranged such that the communications block 122 as the information input/output functioning member is unified with the push-button body 121, the contact-making contact 56 or the LED box 54 as the direct functioning member (see FIG. 1) may be unified with the push-button body 121.

Alternatively, the above fourth embodiment may have an arrangement wherein both the communications contact 55 and the contact-making contact 56 (or the LED box 54) are unified with the push-button body 121. Then, the LED may be provided to the communications contact 55 and the contact-making contact 56 or to the push-button body 121 so that the LED may perform the lighting operation in response to the operation given to the push-button section 52.

(Fifth Embodiment)

Figure 17:
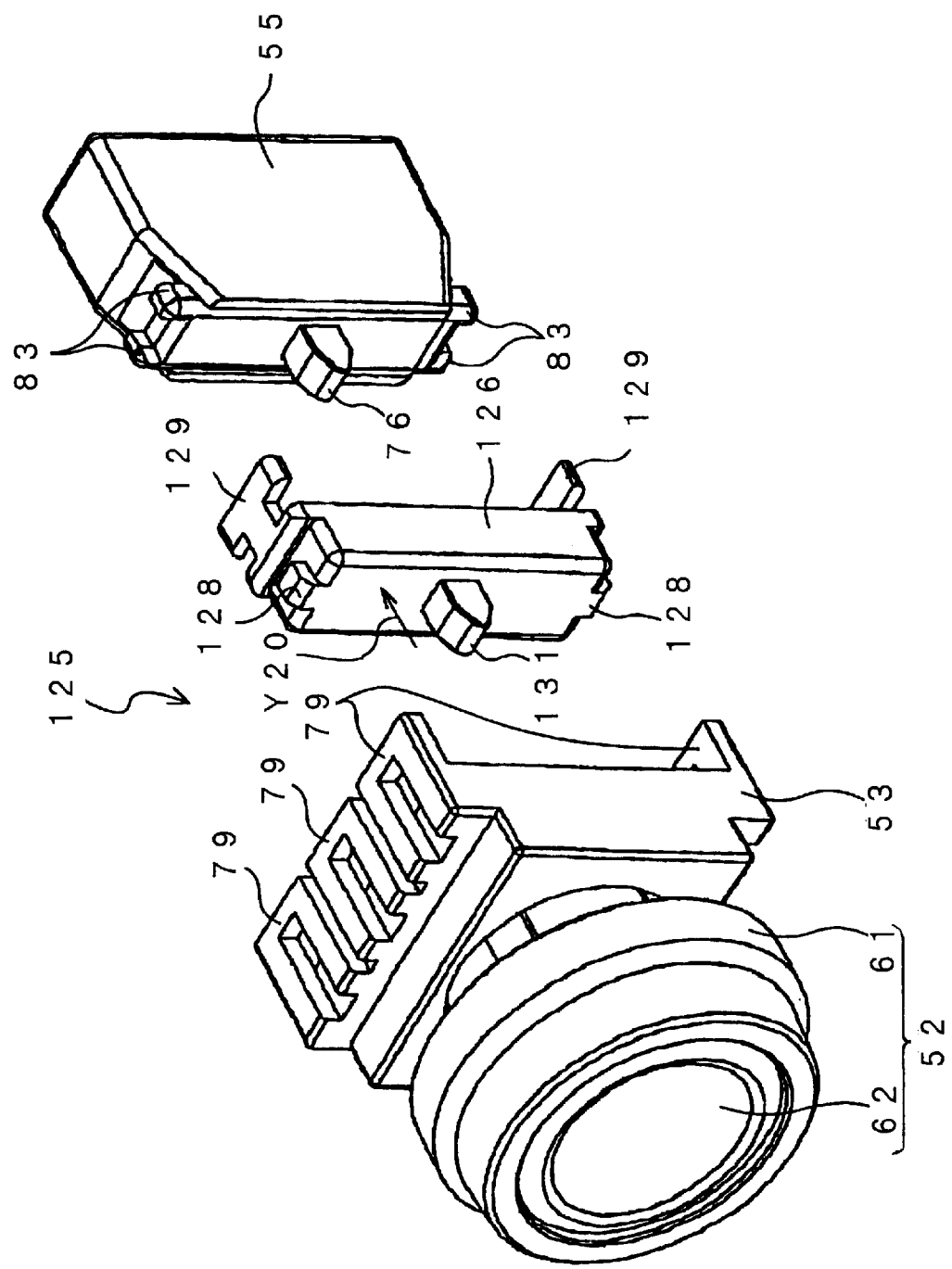
FIG. 17 is a disassembled oblique perspective view of a switch assembly according to a fifth embodiment hereof as seen from the front side.
Figure 18:
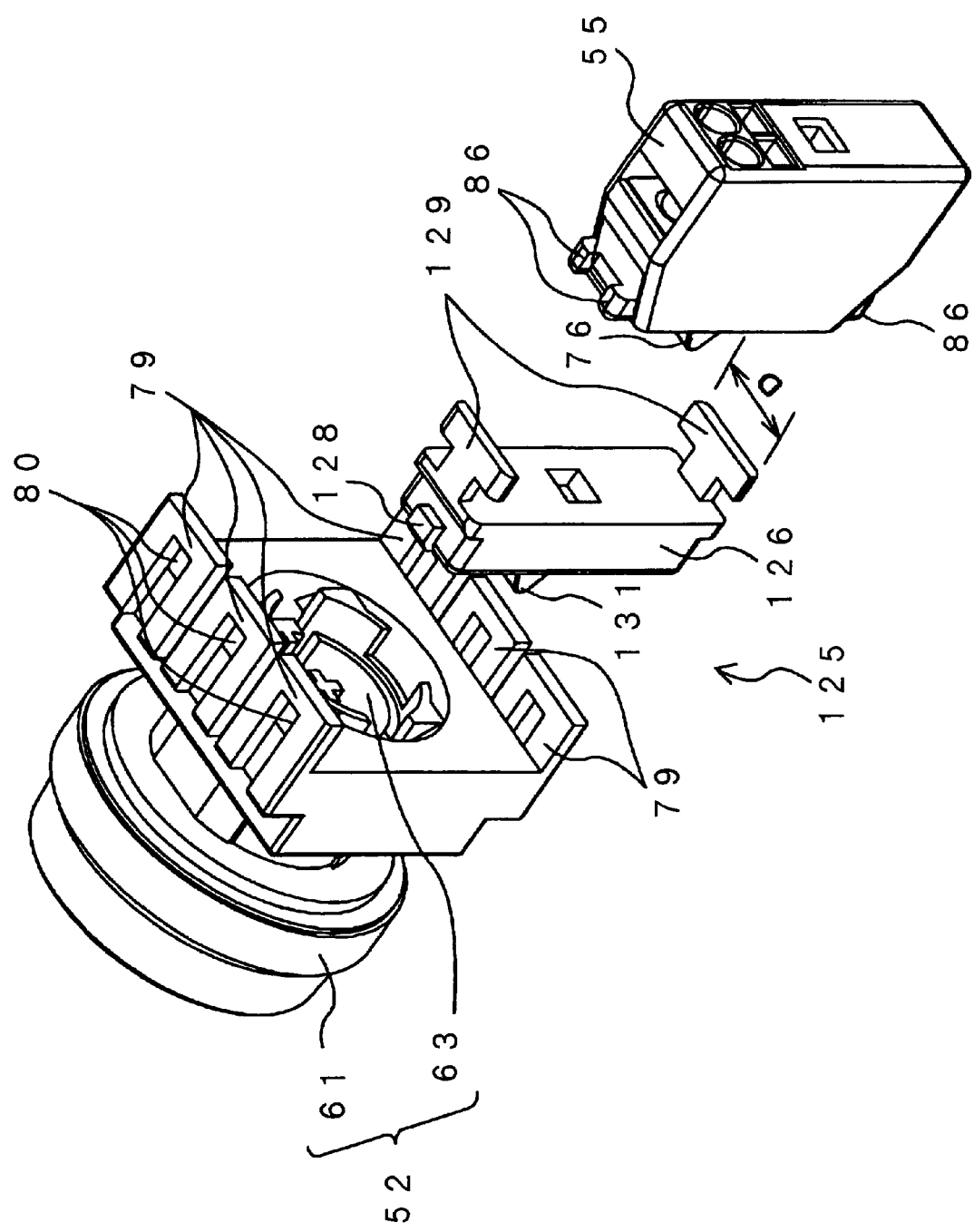
FIG. 18 is a disassembled oblique perspective view of the switch assembly of the fifth embodiment as seen from the rear side.
Figure 19:
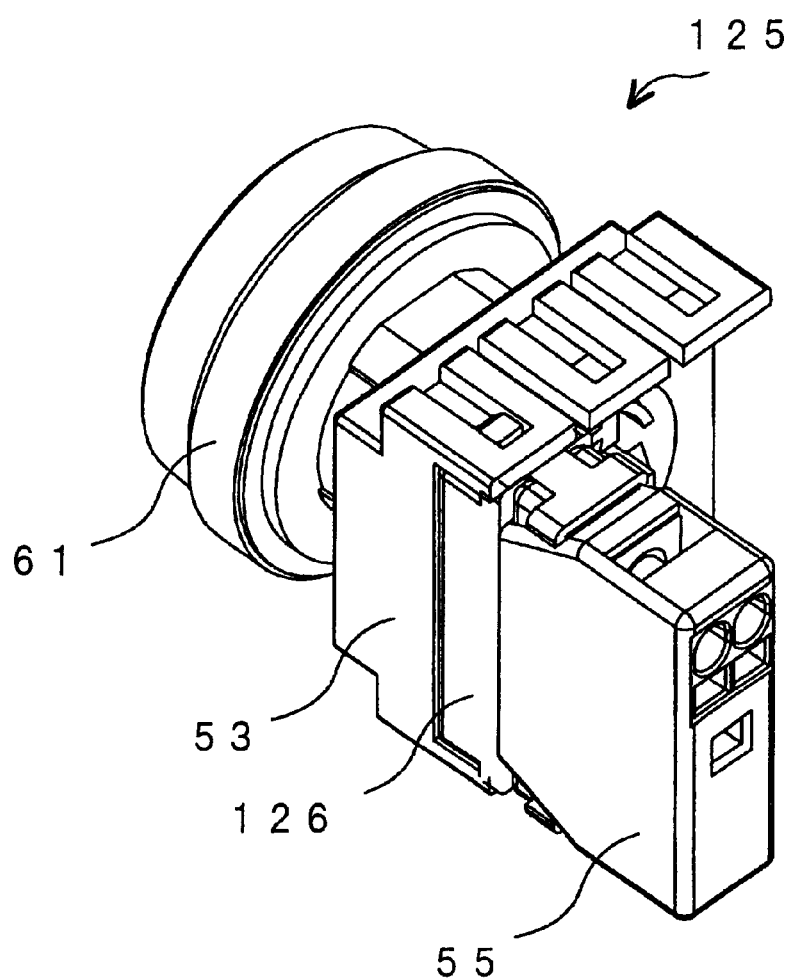
FIG. 19 is an oblique perspective view of the switch assembly of the fifth embodiment in use as seen from the rear side.

A switch assembly according to a fifth embodiment of the present invention will be described with reference to FIGS. 17 to 20. FIG. 17 is a disassembled oblique perspective view of the assembly as seen from the front side, FIG. 18 a disassembled oblique perspective view thereof as seen from the rear side, FIG. 19 an oblique perspective view of the switch assembly in use as seen from the rear side, and FIG. 20 an oblique perspective view for explaining an operation of a part thereof.

Since an essential arrangement of a switch assembly 125 of this embodiment is the same as that of the switch assembly 51 shown in FIG. 1, like parts in FIGS. 17 to 20 are represented by the same reference characters as those in FIGS. 1 to 8, respectively. The assembly of this embodiment differs from the switch assembly 51 in that an adaptor 126 is provided and hence, the following description principally focuses on such a difference.

The adaptor 126 of this embodiment comprises a pair of push-button dedicated connectors 128 disposed in vertical positional relation for combining the adaptor with the push-button section 52, and a pair of contact dedicated connectors 129 disposed in vertical positional relation for establishing the connection with the communications contact 55. It is noted here that the contact dedicated connector 129 has a standardized configuration for connection with various types of contacts. For example, the configuration is adapted to engage with the projecting connectors 83 of the communications contact 55.

Figure 20:
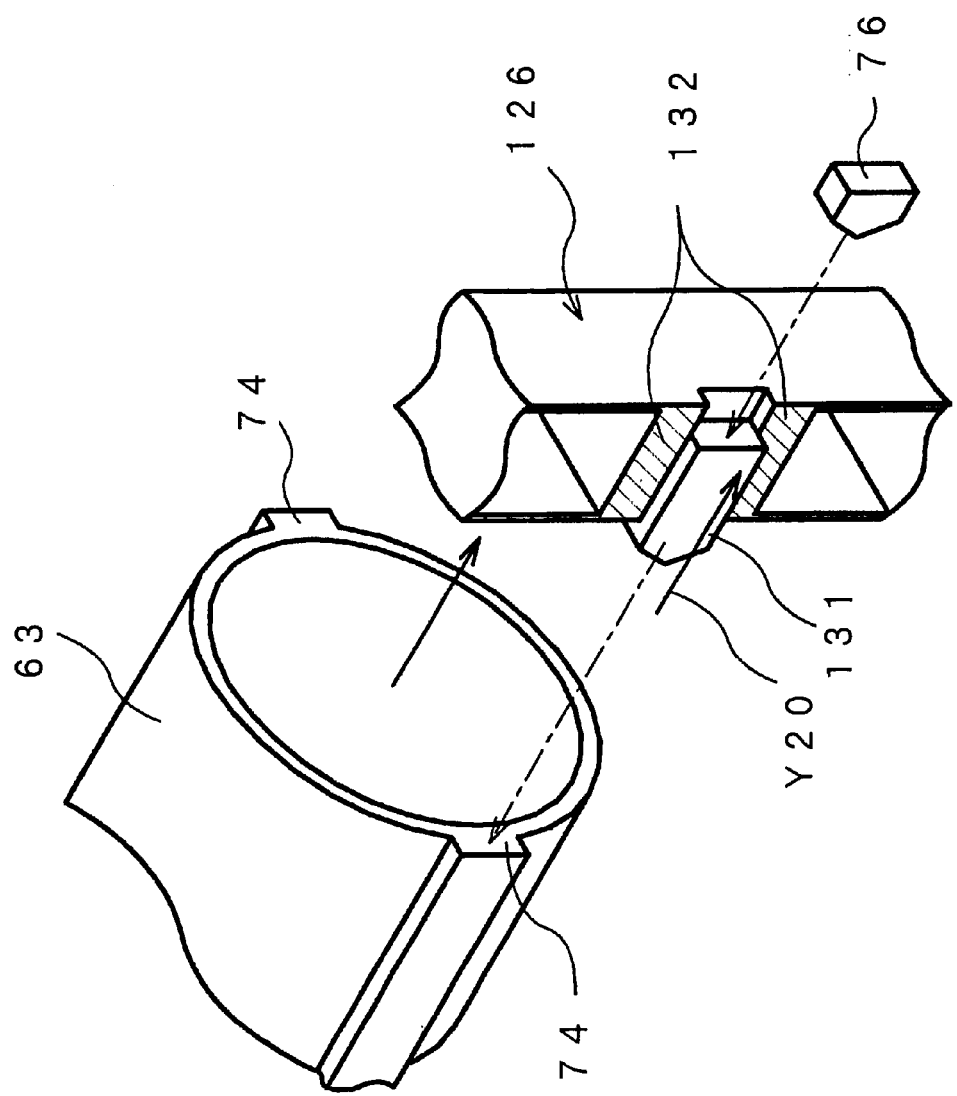
FIG. 20 is an oblique perspective view for explaining an operation of a part of the switch assembly of the fifth embodiment.

As seen in FIG. 20 partially showing a sectional configuration of the adaptor 126, the adaptor 126 is formed with a transmitting projection 131, the movement of which is restricted by guide rails 132. Thus, the adaptor 126 is designed to move only in a direction of an arrow Y20 and the opposite direction. The transmitting projection 131 is constantly urged in the opposite direction to the arrow Y20 by a spring or the like as a resilient member (not shown).

When the push-button section 52 is not subjected to an operating force, the transmitting projection 131 abuts against the projection 74 of the operating shaft 63 of the push-button section 52. However, when the push-button section 52 is depressed to apply the operating force to move the operating shaft 63 along the depressed direction, the transmitting projection 131 is accordingly moved in the direction of the arrow Y20. The transmitting projection 131, thus moved, pushes the switching projection 76 of the communications contact 55 in the direction of the arrow Y20 so that the state of the communications contact 55 is changed.

This adaptor 126 is used when the configuration of the connector of the communications contact 55 is incompatible with the configuration of the connector of the push-button body 53. Various combinations of the contacts and the push-button sections are made possible by providing the adaptor 126 conforming to the configurations of the connector of the communications contact 55 and the push-button body 53.

It is noted here that the push-button section 52 and the push-button body 53 are equivalent to an operation receiving member of the present invention, the adaptor 126 to an adaptor member of the present invention, the communications contact 55 to the information input/output functioning member of the present invention, the push-button dedicated connector 128 to an operation-receiving-member dedicated connection portion of the present invention, and the contact dedicated connector. 129 to the functioning-member dedicated connection portion of the present invention.

Although it has been the general practice to combine a contact available from 'A' company with a push-button section available from the 'A' company, the fifth embodiment provides the adaptor 126 with the standardized configuration thereby making it possible to use a contact and the push-button section 52 available from different companies as connected with each other.

Although the above fifth embodiment is described by way of the example where the communications contact 55 as the information input/output functioning member is connected with the adaptor 126, the contact-making contact 56 (see FIG. 1) as the direct functioning member may be used as combined with the adaptor.

Alternatively, the adaptor 126 may be designed to be connectable with both the communications contact 55 and the contact-making contact 56 so that both the communications contact 55 and the contact-making contact 56 are concurrently used as combined with the adaptor. In this case, the communications contact 55 and the contact-making contact 56 in connection with the adaptor 126 are simultaneously operated by the operation given to the push-button section 52 by the operator.

In principle, the aforementioned adaptor 126 of the fifth embodiment is intended to interconnect the communications contact 55 and the push-button body 53 which are unconnectable. However, this adaptor 126 may incorporate a contact (or a block) having the same communication function as the communications contact 55. In this case, an arrangement may be made such that the communication function incorporated in the adaptor 126 is operated in conjunction with the operation given to the push-button section 52. Likewise, the adaptor 126 may incorporate a contact (or a block) having the same function as the contact-making contact 56.

An alternative arrangement is possible wherein the adaptor 126 incorporates therein an LED for permitting the operation given to the push-button section 52 to cause the LED to light up.

Further, the communications contact 55 of the fifth embodiment (see FIG. 17) may be formed with the contact dedicated connector 79, for example, such that another contact can be connected with the communications contact 55. In a case where the adaptor 126 is connected with the contact-making contact 56, the contact-making contact may similarly be adapted to allow another contact to be connected therewith.

(Sixth Embodiment)

Figure 21:
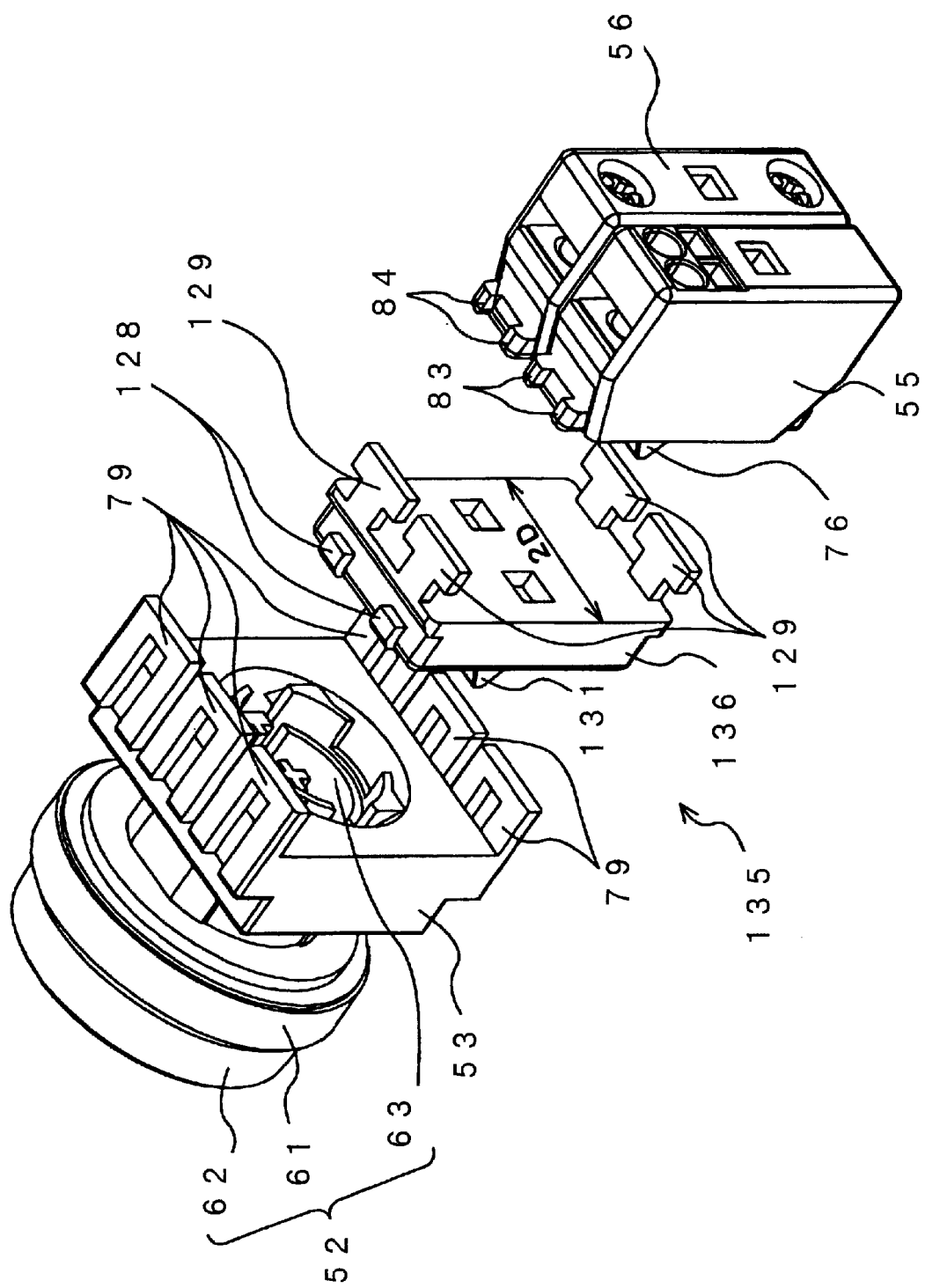
FIG. 21 is a disassembled oblique perspective view of a switch assembly according to a sixth embodiment hereof as seen form the rear side.
Figure 22:
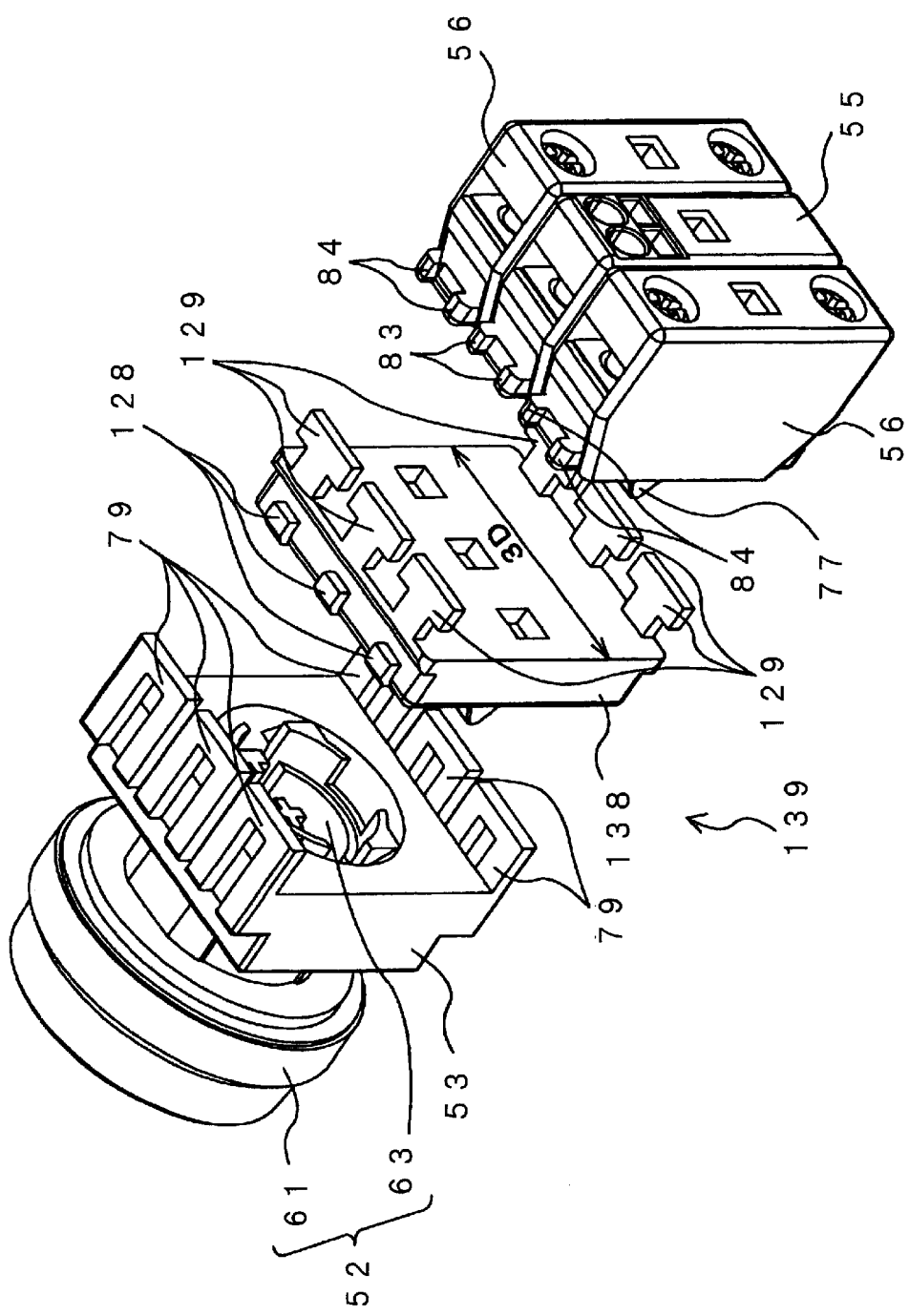
FIG. 22 is a disassembled oblique perspective view of an exemplary modification of the switch assembly of the sixth embodiment as seen from the rear side.

A switch assembly according to a sixth embodiment of the present invention will be described with reference to FIGS. 21 and 22. Since an essential arrangement of a switch assembly 135 of this embodiment is the same as that of the switch assembly 51 shown in FIG. 1, like parts in FIGS. 21 and 22 are represented by the same reference characters as those in FIGS. 1 to 8, respectively. The assembly of this embodiment differs from the switch assembly 51 in that an adaptor 136 has a different configuration and hence, the following description principally focuses on such a difference.

Similarly to the adaptor 126 shown in FIGS. 17 to 20, the adaptor 136 of the switch assembly 135 of this embodiment comprises the push-button dedicated connectors 128 and the contact dedicated connectors 129 as shown in FIG. 21. The contact dedicated connector 129 has the standardized configuration for connection with various types of contacts.

It is noted, however, that the adaptor 136 has two pairs of push-button dedicated connectors 128 and of contact dedicated connectors 129 which are disposed in vertical positional relation. Further, as shown in FIG. 21, the adaptor 136 has a width '2D' twice the width 'D' of the adaptor 126 of FIG. 18.

The two pairs of push-button dedicated connectors 128 of the adaptor 136 are connected with the left-hand two pairs of contact dedicated connectors 79 of the push-button body 53, the contact dedicated connectors disposed in vertical positional relation. The adaptor 136 has its respective pair of contact dedicated connectors 129 engaged with a pair of projecting connectors 83 of the communications contact 55 and with a pair of projecting connectors 84 of the contact-making contact 56, thus adapted for concurrent connection with the communications contact 55 and the contact-making contact 56.

The adaptor 136 may be further increased in width to '3D'. FIG. 22 is an external view of a switch assembly 139 including an adaptor 138 of the width '3D'. The adaptor 138 comprises three pairs of push-button dedicated connectors 128 and of contact dedicated connectors 129 which are disposed in vertical positional relation. The three pairs of push-button dedicated connectors 128 of the adaptor 138 engage with three pairs of contact dedicated connectors 79 of the push-button body 53, whereas a respective pair of contact dedicated connectors 129 thereof engage with a pair of projecting 9 connectors 83 of the communications contact 55 and with a respective pair of projecting connectors 84 of the contact-making contacts 56. Thus, the adaptor 138 is adapted for concurrent connection with the communications contact 55 and the contact-making contacts 56.

The sixth embodiment offers the following advantage by employing the adaptor 136 having the width '2D' twice the width 'D' of the adaptor 126 (see FIG. 18) or the adaptor 138 having the width '3D' three times that of the adaptor 126. Even if the projecting connectors 82, 83, 84 of the communications contact 55, the contact-making contact 56 and the LED box 54 have different configurations, the communications contact 55, the contact-making contact 56 and the LED box 54 can be connected with the switch assembly.

Let us consider a case where the LED box 54, the communications contact 55 and the contact-making contact 56 are each connected with the switch assembly, for example. If the projecting connectors 83, 84 of the communications contact 55 and the contact-making contact 56 have the same configuration but the projecting connectors 82 of the LED box 54 have a different configuration from that of the former connectors, the communications contact 55 and the contact-making contact 56 may be directly connected with the push-button body 53 if the projecting connectors 83, 84 thereof are compatible with the contact dedicated connectors of the push-button body 53, whereas the LED box 54 may be connected with the push-button body 53 by way of the adaptor 126 shown in FIG. 18.

If, on the other hand, the projecting connectors 82 of the LED box 54 are compatible with the contact dedicated connectors 79 of the push-button body 53, the LED box 54 may be directly connected with the push-button body 53 whereas the communications contact 55 and the contact-making contact 56 may be connected with the push-button body 53 by way of the adaptor 136 shown in FIG. 21.

If the projecting connectors of the communications contact 55 and the like to be connected with the push-button body 53 are all incompatible with the contact dedicated connectors 79 of the push-button body 53, the adaptor 138 of FIG. 22 may be used.

It is noted here that the adaptors 136, 138 are equivalent to the adaptor member of the present invention, and the contact dedicated connector 79 is equivalent to the functioning-member dedicated connection portion of the present invention.

Although the sixth embodiment has been described by way of the example of the adaptor 136 of the two-fold width '2D' of the width 'D' of the adaptor 126 (see FIG. 18) and the adaptor 138 of the three-fold width '3D', the present invention should not be limited to these. In short, the adaptor only needs to have a different width from the width 'D' of the adaptor 126 of FIG. 18. The adaptor may have any width such as 0.5, 1.5 or 4 times the width 'D' of the adaptor 126.

(Seventh Embodiment)

Figure 23:
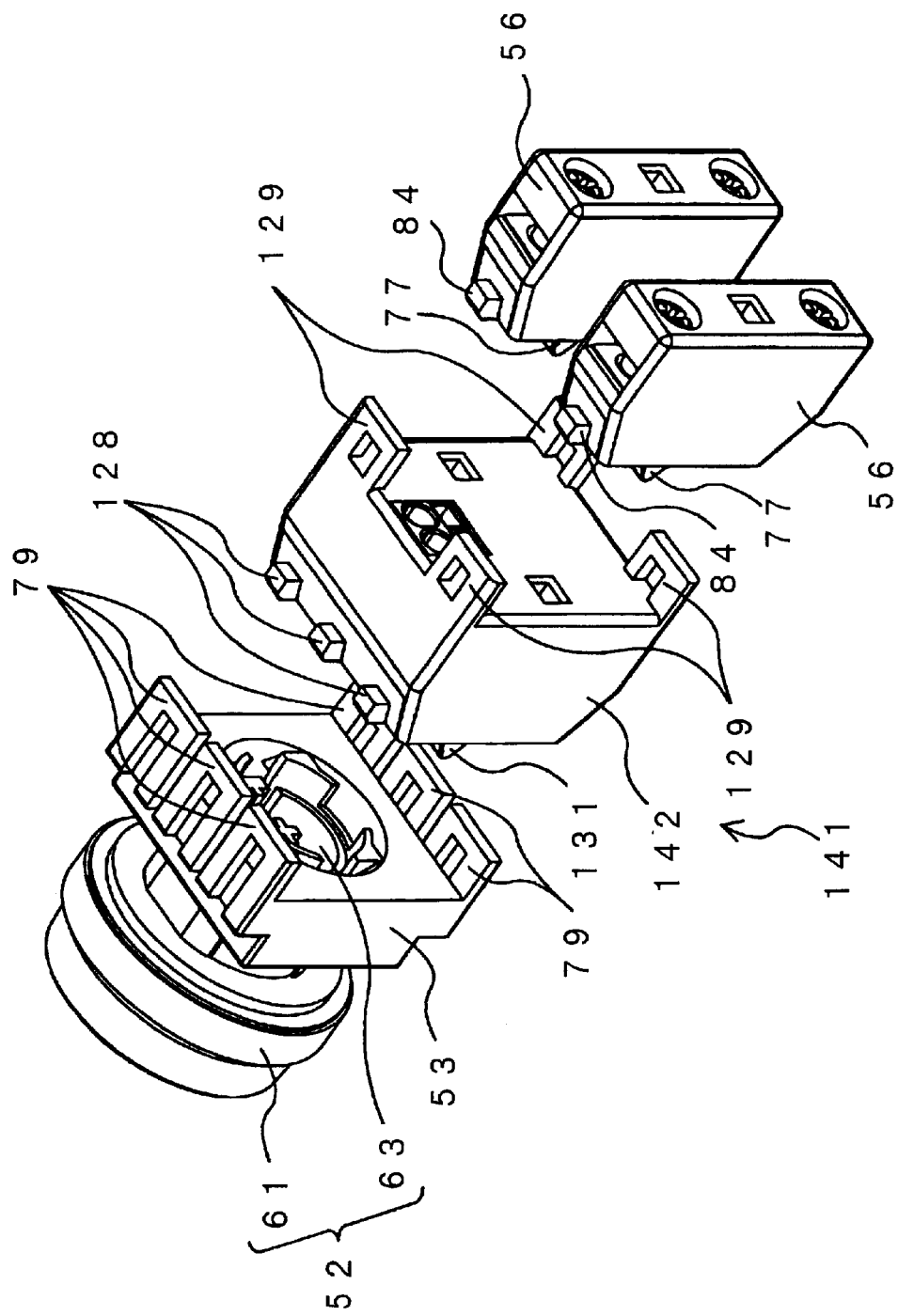
FIG. 23 is a disassembled oblique perspective view of a switch assembly according to a seventh embodiment hereof as seen from the rear side.

A switch assembly according to a seventh embodiment of the present invention will be described with reference to FIG. 23. An essential arrangement of a switch assembly 141 of this embodiment is the same as that of the switch assembly 139 shown in FIG. 22 but an adaptor 142 has a different configuration. Hence, the following description principally focuses on a difference from the switch assembly 139 of FIG. 22 by way of reference to FIGS. 1 to 22 as well.

The adaptor 142 of this embodiment comprises the adaptor 139 of FIG. 22 incorporating therein a communications contact having the same communication function as the communications contact 55. The adaptor 142 includes three pairs of push-button dedicated connectors 128 and two pairs of contact dedicated connectors 129, connectors disposed at an upper side and a loser side of the adaptor. The adaptor 142 further includes two transmitting projections 131 and one switching projection (not shown) having a communication function.

Since the transmitting projections 131 and the switching projection are simultaneously operated, the contact-making contacts 56 and the communications contact 55 incorporated in the adaptor 142 are simultaneously actuated.

The pairs of contact dedicated connectors 129 formed at transversely opposite places of the adaptor 142 are each connected with one contact-making-contact 56. Thus, the adaptor 142 incorporates therein the communications contact of a different function from that of the contact-making contact 56 connected therewith.

It is noted here that the adaptor 142 is equivalent to the adaptor member of the present invention whereas the communications contact incorporated in the adaptor. 142 is equivalent to the information input/output functioning member of the present invention.

Although the above seventh embodiment has been described by way of the example where the adaptor 142 is connected with the contact-making contact 56, the adaptor 142 may be connected with a communications contact 55 different from the communications contact incorporated in the adaptor 142. In this case, such an adaptor 142 may incorporate therein a function of the contact-making contact 56.

(Eighth Embodiment)

Figure 24:
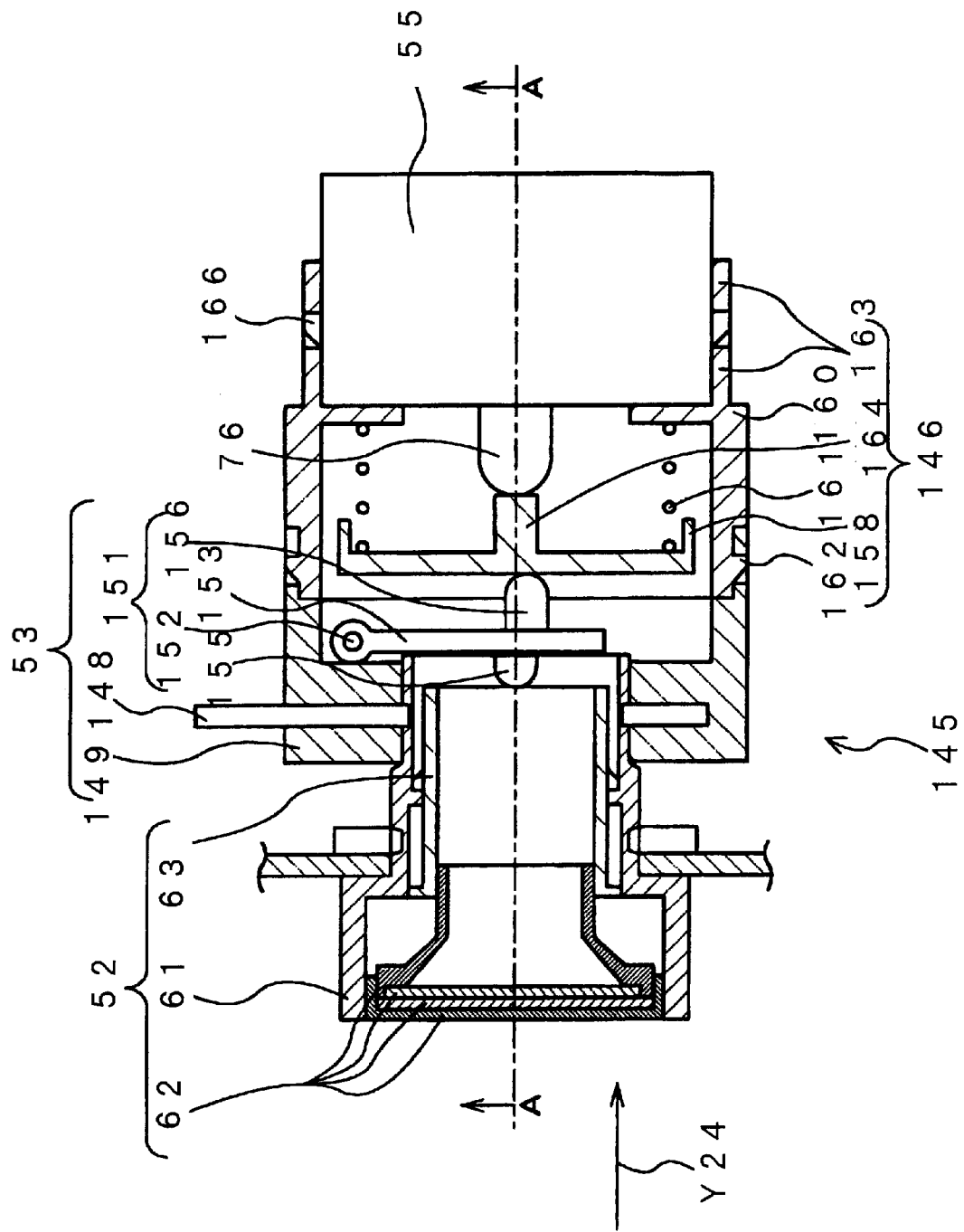
FIG. 24 is a sectional view of a switch assembly according to an eighth embodiment hereof.
Figure 25:
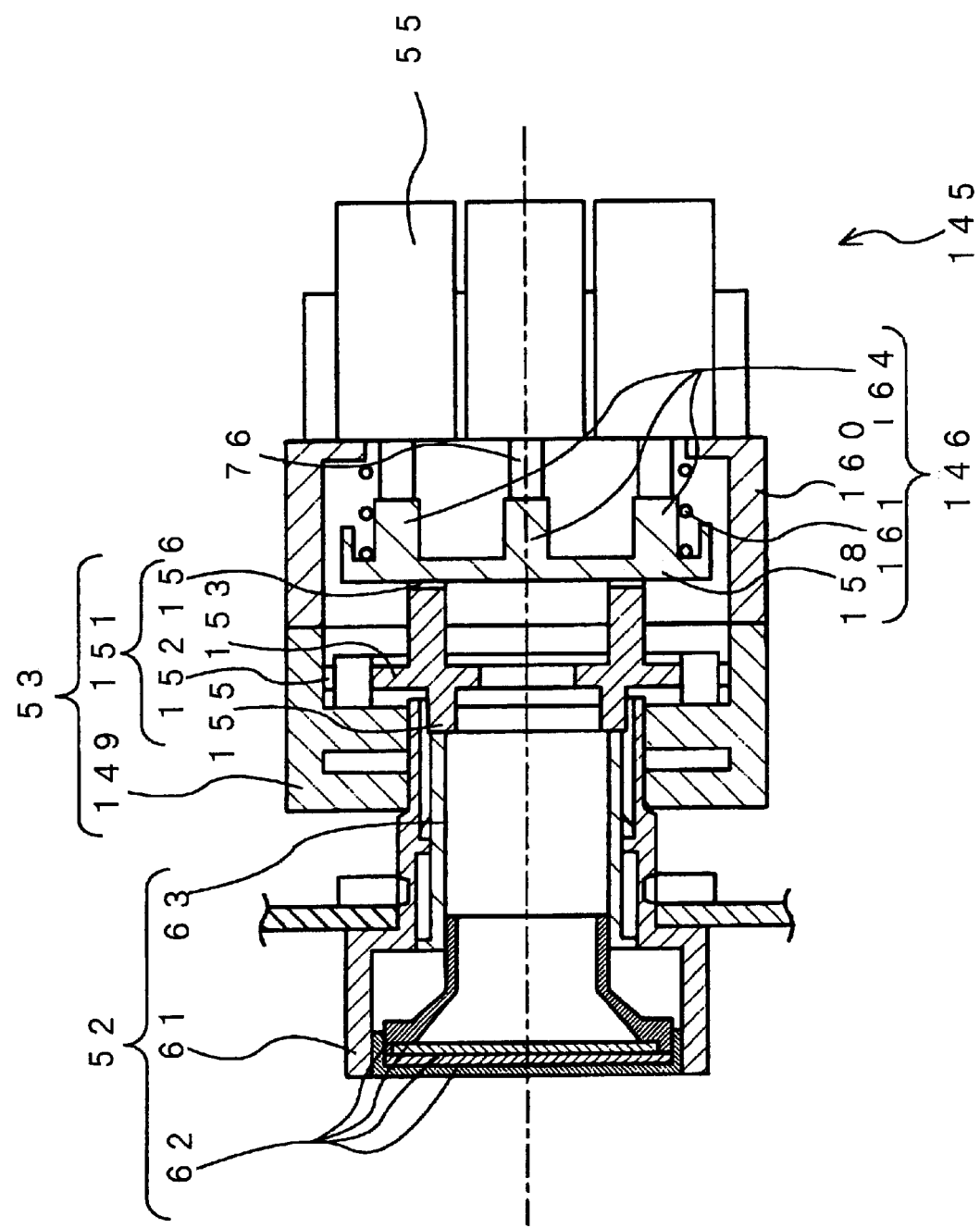
FIG. 25 is a sectional view taken on the line A—A in FIG. 24.
Figure 26:
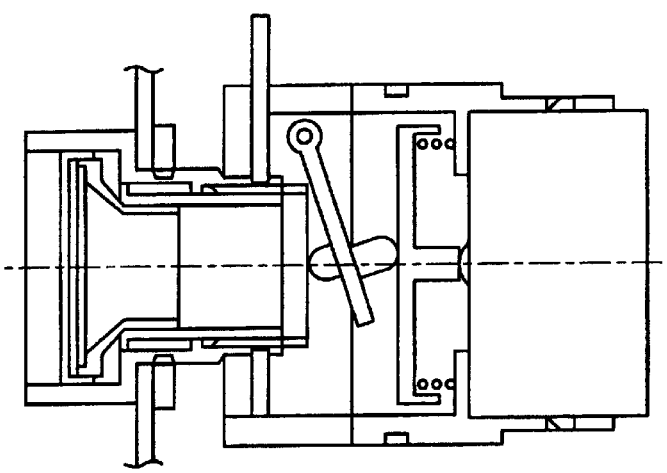
FIG. 26 is a group of explanatory diagrams of an operation of the switch assembly of the eighth embodiment.
Figure 26:
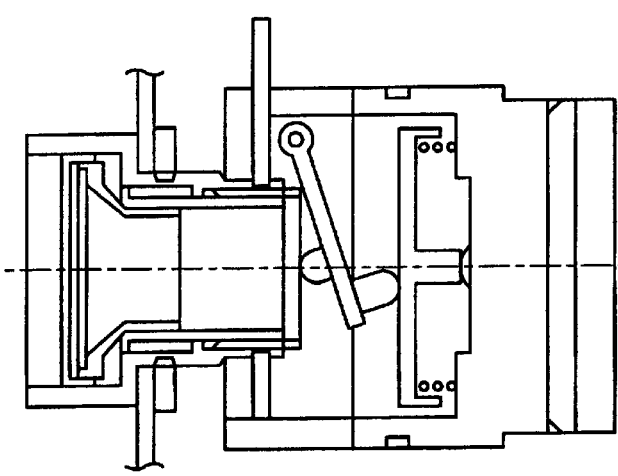
Figure 26:
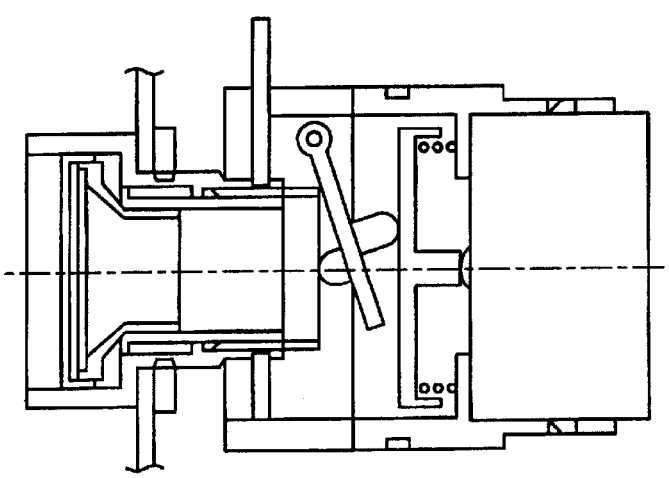
Figure 27:
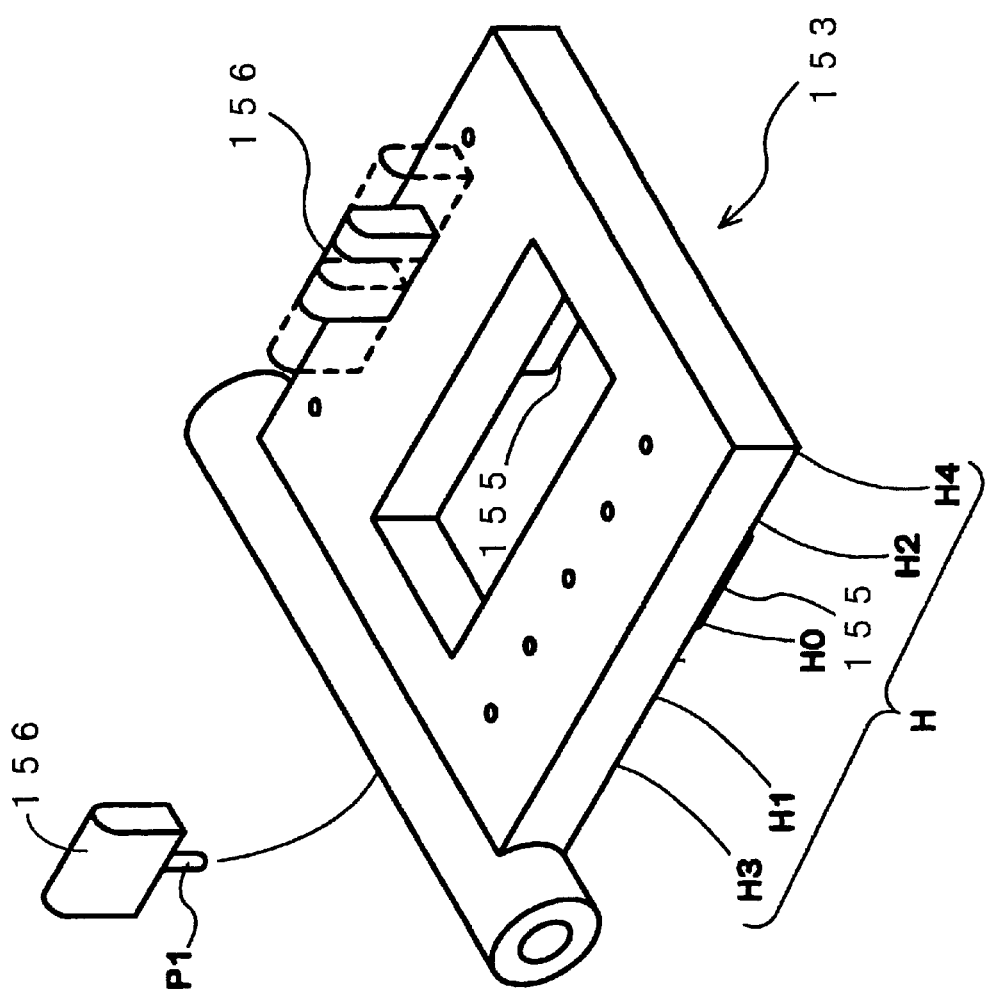
FIG. 27 is a disassembled oblique perspective view of a part of the switch assembly of the eighth embodiment.

A switch assembly according to an eighth embodiment of the present invention will be described with reference to FIGS. 24 to 28. FIG. 24 is a sectional view of the switch assembly; FIG. 25 a sectional view taken on the line A—A in FIG. 24; FIG. 26 a group of explanatory diagrams of an operation of the switch assembly; FIG. 27 a disassembled oblique perspective view of a part of the switch assembly; and FIG. 28 an oblique perspective view of a part of an exemplary modification of the switch assembly. In FIGS. 24 and 25, the same reference characters as those in FIGS. 1 to 23 represent the same or equivalent parts, respectively.

A switch assembly 145 of this embodiment comprises the push-button section 52, the push-button body 53, an adaptor 146 and the communications contact 55. As described in the first embodiment, the push-button section 52 comprises the casing 61, the push button 62 and the operating shaft 63 whereas the push-button body 53 comprises a locking member 148 for fixing the push-button section and a casing 149.

A position/stroke changing section 151 is formed within the push-button body 53. The position/stroke changing section 151 comprises a shaft 152 and a pivotal member 153. The pivotal member 153 includes an operating-shaft dedicated projection 155 and an adaptor dedicated projection 156. The operating-shaft dedicated projection 155 abuts against one end of the operating shaft 63.

The adaptor dedicated projection 156 is formed on the opposite side of the pivotal member 153 from the operating-shaft dedicated projection 155, abutting against an operating-force transmitting member 158 of the adaptor 146.

The adaptor 146 comprises a casing 160, the aforesaid operating-force transmitting member 158, a spring 161 as a resilient member, a push-button dedicated connector 162 and a contact dedicated connector 163. The operating-force transmitting member 158 has a contact dedicated projection 164 at a center thereof. The spring 161 is interposed between the casing 160 and the operating-force transmitting member 158 so that the operating-force transmitting member 158 receives a force from the spring 161 in an opposite direction to an arrow 24 when receiving a pressing force of above a given level in a direction of the arrow Y24.

The communications contact 55 comprises the projection 76 and a connector 166. When the projection 76 is depressed in the direction of the arrow Y24, a switch incorporated in the communications contact 55 (not shown) is switched.

It is noted here that the push-button section 52 and the push-button body 53 are equivalent to the operation receiving member of the present invention, the adaptor 146 and the position/stroke changing section 151 to the adaptor member of the present invention, the communications contact 55 to the information input/output functioning member of the present invention, the push-button dedicated connector 162 to the operation-receiving-member dedicated connection portion of the present invention, and the contact dedicated connector 163 to the functioning-member dedicated connection portion of the present invention.

Next, an operation of each part of the switch assembly 145 is described. When the push button 62 is depressed in the direction of the arrow Y24 (see FIG. 24), the operating shaft 63 is accordingly moved in the same direction while pressing the operating-shaft dedicated projection 155. The operating-shaft dedicated projection 155 thus pressed causes the pivotal member 153 to pivot about the shaft 152.

As a result, the adaptor dedicated projection 156 presses the operating-force transmitting member 158, the contact dedicated projection 164 of the operating-force transmitting member 158, in turn, presses the projection 76 of the communications contact 55. The switch assembly 145 is adapted to transmit the pressing force, applied to the push button 62, to the communications contact 55 by way of the operations of the individual parts thereof.

As shown in FIGS. 24 and 25, the pivotal member 153 pivotally mounted on the shaft 152 is provided between the operating shaft 63 and the operating-force transmitting member 158 thereby permitting the stroke of slide (a movable distance) of the operating shaft 63 to be changed. The stroke of a contact such as the push-button section 52, the communications contact 55 or the like is normally decided by each maker.

Thus, even if the strokes of the push-button section 52 and the communications contact 55 from different makers are out of agreement, the eighth embodiment is capable of accomplishing the agreement between these strokes by virtue of the pivotal member 153 pivotally mounted on the shaft 152 as mentioned above.

Now, how the inherent stroke of the push-button section 52 is changed by the pivotal member 153 pivotally mounted on the shaft 152 is explained with reference to FIG. 26. FIG. 26(b) illustrates a case where the inherent stroke of the push-button section 52 is increased. FIG. 26(a) illustrates a case where the inherent stroke of the push-button section 52 is not changed. FIG. 26(c) illustrates a case where the inherent stroke of the push-button section 52 is decreased.

As seen in FIGS. 26(a) to (c), the stroke can be changed depending upon a position at which the adaptor dedicated projection 156 is formed. Specifically, in a case where the adaptor dedicated projection 156 and the operating-shaft dedicated projection 155 are formed in a manner to establish a substantial alignment between central axes of these projections, as shown in FIG. 26(a), a distance covered by the operating-shaft dedicated projection 155 is equal to a distance covered by the adaptor dedicated projection 156.

On the other hand, the distance covered by the operating-shaft dedicated projection 155 is equal to the stroke of the operating shaft 63. The distance covered by the adaptor dedicated projection 156 is equal to a distance covered by the operating-force transmitting member 158 of the adaptor 146 and also equal to a stroke of the switching projection 76 of the contact. That is, in the case shown in FIG. 26(a), the stroke of the operating shaft 63 is equal to the stroke of the switching projection 76 of the contact.

Let us consider a case, as shown in FIG. 26(c), where the adaptor dedicated projection 156 is formed at place closer to the shaft 152 than the operating-shaft dedicated projection 155. In this case, the distance covered by the adaptor dedicated projection 156 is shorter than the distance covered by the operating-shaft dedicated projection 155. That is, in the case shown in FIG. 26(c), the stroke of the switching projection 76 of the contact can be made shorter than the stroke of the operating shaft 63.

Further, let us consider a case, as shown in FIG. 26(b), where the adaptor dedicated projection 156 is formed at place farther away from the shaft 152 than the operating-shaft dedicated projection 155. In this case, the distance covered by the adaptor dedicated projection 156 is longer than the distance covered by the operating-shaft dedicated projection 155. That is, in the case shown in FIG. 26(b), the stroke of the switching projection 76 of the contact can be made longer than that of the operating shaft 63.

In this manner, the stroke of the operating shaft 63 can be changed simply by changing the positional relation of the adaptor dedicated projection 156 on the pivotal member 153 relative to the operating-shaft dedicated projection 155 thereon, thereby establishing the agreement with the stroke of the switching projection 76 of the contact.

The pivotal member 153 of the above eighth embodiment is adapted for an easy change of the positional relationship between the operating-shaft dedicated projection 155 and the adaptor dedicated projection 156. FIG. 27 is an oblique perspective view of the pivotal member 153. A plurality of holes H0 to H4 are formed in one surface of the pivotal member 153, on which the adaptor dedicated projection 156 is formed. On the other hand, the adaptor dedicated projection 156 is formed with a fixing extension P1 which is in corresponding relation to the holes H0 to H4. The position at which the adaptor dedicated projection 156 is formed can be changed depending upon which one of the holes H0 to H4 receives the fixing extension P1.

The pivotal member is also formed with similar holes (not shown) to the above on the opposite surface from that where the adaptor dedicated projection 156 is formed as shown in FIG. 27. Further, the operating-shaft dedicated projection 155 is also formed with a similar fixing extension (not shown) to the fixing extension P1. Such an arrangement permits the change of the position at which the operating-shaft dedicated projection 155 is formed.

Thus, the positional relationship between the operating-shaft dedicated projection 155 and the adaptor dedicated projection 156 is decided based on a desired mode of changing stroke. According to the positional relationship thus decided, the operating-shaft dedicated projection 155 and the adaptor dedicated projection 156 may be attached to the pivotal member 153.

FIG. 27 illustrates the structure of the pivotal member 153 formed with the holes H0 to H4 so as to permit the change of positions at which the operating-shaft dedicated projection 155 and the adaptor dedicated projection 156 are formed. However, the present invention is not particularly limited to this structure and any structure is usable so long as the positions of the operating-shaft dedicated projection 155 and the adaptor dedicated projection 156 are changeable. For instance, the pivotal member 153 may be formed with slits whereas extensions corresponding to these slits may be formed on the operating-shaft dedicated projection 155 and the adaptor dedicated projection 156, respectively, such that the slits and the extensions are engaged with each other in a manner to permit the change of positions of the projections.

Although the embodiment is described with reference to the case where the adaptor 146 is connected with the communications contact 55, the adaptor 146 may be connected with the contact-making contact 56 (see FIG. 1) or the like. Alternatively, the adaptor may be concurrently connected with both the communications contact 55 and the contact-making contact 56.

According to the eighth embodiment, the illustrated position/stroke changing section 151 allows its operating-shaft dedicated projection 155 to abut against the operating shaft 63 in aligned relation therewith. However, the operating-shaft dedicated projection 155 does not always come into abutment against the operating shaft 63 in aligned relation therewith. Such a situation may occur when, for example, the push-button section 52 including the operating shaft 63 and the push-button body 53 including the position/stroke changing section 151 are fabricated by different makers.

Figure 28:
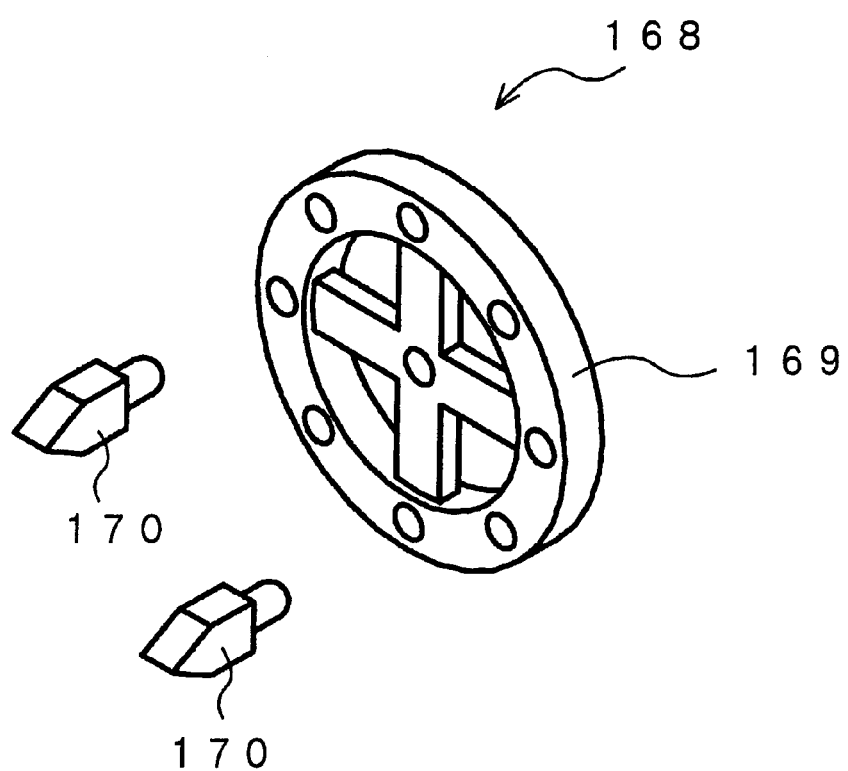
FIG. 28 is an oblique perspective view of an exemplary modification of the switch assembly of the eighth embodiment.

FIG. 28 shows a position changing member 168 for providing an abutment between the operating shaft 63 and the operating-shaft dedicated projection 155 such that the change of stroke may be performed. The position changing member 168 comprises a cap 169 and a position changing jut 170.

The cap 169 is formed with a plurality of holes in its surface. The cap 169 is fitted over an end of the operating shaft 63 which abuts against the operating-shaft dedicated projection 155, the fitted cap 169 presenting its surface with the holes to the operating-shaft dedicated projection 155. Then, the position changing jut 170 may be set in a hole located at place against which the operating-shaft dedicated projection 155 abuts.

This brings the operating shaft 63 and the operating-shaft dedicated projection 155 into abutment even if they are out of alignment and cannot establish abutment therebetween.

(Ninth Embodiment)

Figure 29:
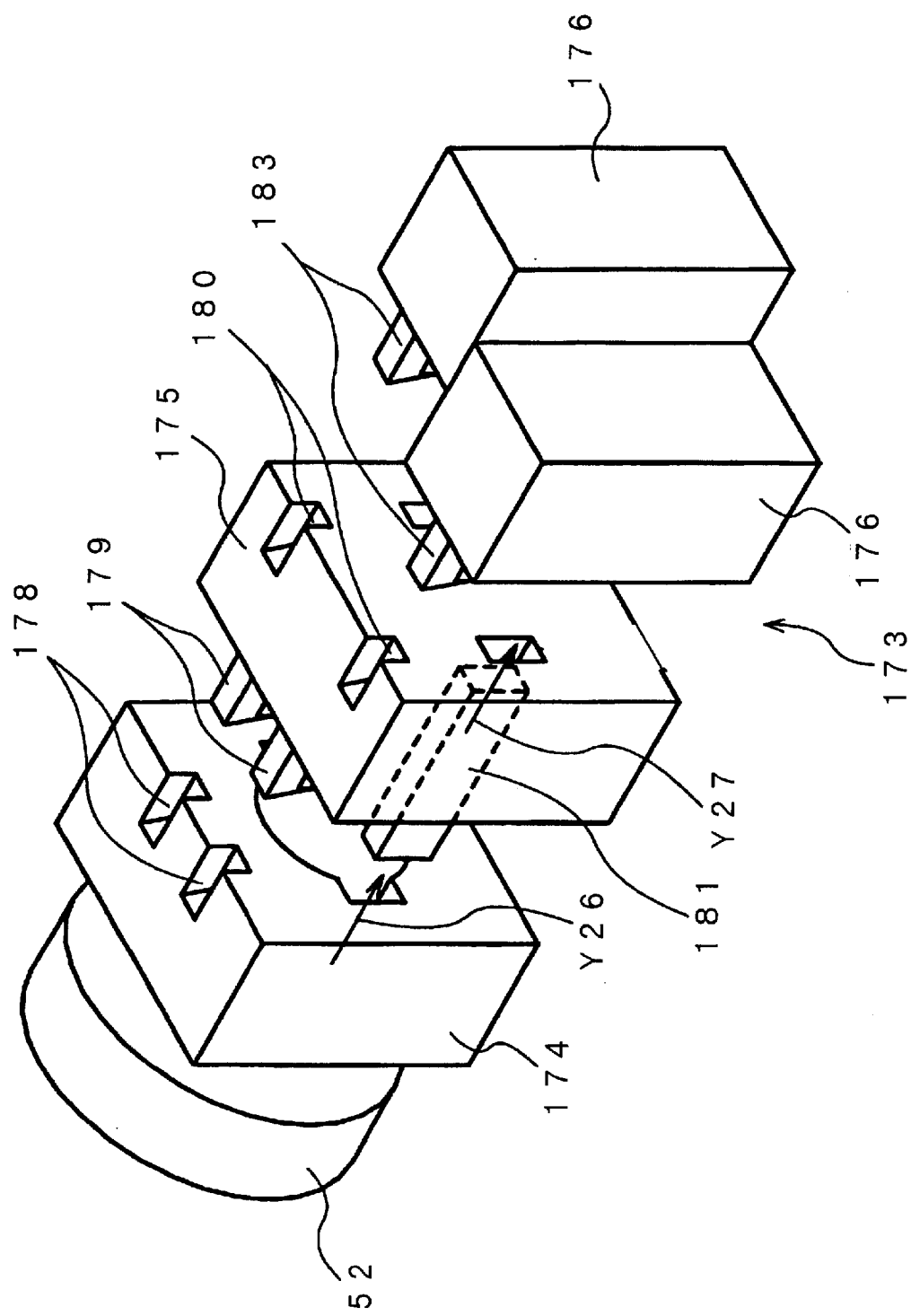
FIG. 29 is a disassembled oblique perspective view of a switch assembly according to a ninth embodiment hereof as seen form the rear side.

A switch assembly according to a ninth embodiment of the present invention will be described with reference to FIG. 29. In FIG. 29, the same reference characters as those in FIGS. 1 to 28 represent the same or equivalent parts, respectively.

A switch assembly 173 of this embodiment comprises the push-button section 52, a push-button body 174, a communication-function incorporating contact (hereinafter referred to as "communications contact") 175 and a contact-making contact 176.

<Push-Button Body>

The push-button body 174 is formed with a communications-contact dedicated connection groove 178, which is provided with a wiring for establishing electrical connection with the communications contact 175.

<Communications Contact>

The communications contact 175 is provided with a communication circuit within its body and includes a connecting projection 179 for connection with the push-button body 174. The communications contact is formed with a connecting projection 179 on its surface opposite to the push-button body 174. The connecting projection 179 is provided with a wiring for establishing electrical connection with the push-button body 174.

The connecting projection 179 engages with the communications-contact dedicated connection groove 178 of the push-button body 174 thereby fixedly interconnecting as well as electrically interconnecting the push-button body 174 and the communications contact 175.

The communications contact 175 is formed with a plurality of contact dedicated connection grooves 180 for establishing connection between the communications contact itself 175 and other contacts including the contact-making contact 176 and the like. This permits the communications contact 175 to be concurrently connected with plural contact-making contacts 176. It is noted here that the contact dedicated connection groove 180 has the same configuration as the communications-contact dedicated connection groove 178 of the push-button body 174.

The communications contact 175 further includes therein a switch 181 operated in conjunction with the operation of the operating shaft (not shown) of the push-button section 52. The switch 181 is moved in a direction of an arrow Y27 in conjunction with a movement of the operating shaft in a direction of an arrow Y26. This actuates a switch (not shown) of the contact-making contact 176 thereby to switch the state of the contact-making contact 176.

<Contact-Making Contact>

The contact-making contact 176 is provided with a connecting projection 183 on its surface opposite to the communications contact 175. The connecting projection 183 has the same configuration as the connecting projection 179 of the communications contact 175. The connecting projection 183 engages with the contact dedicated connection groove 180 of the communications contact 175 thereby fixedly interconnecting as well as electrically interconnecting the communications contact 175 and the contact-making contact 176.

It is noted here that the push-button section 52 and the push-button body 174 are equivalent to the operation receiving member of the present invention, whereas the communications contact 175 is equivalent to the adaptor member of the present invention.

Similarly to the first embodiment, the ninth embodiment permits plural functioning members to be concurrently connected for use.

(Tenth Embodiment)

Figure 30:
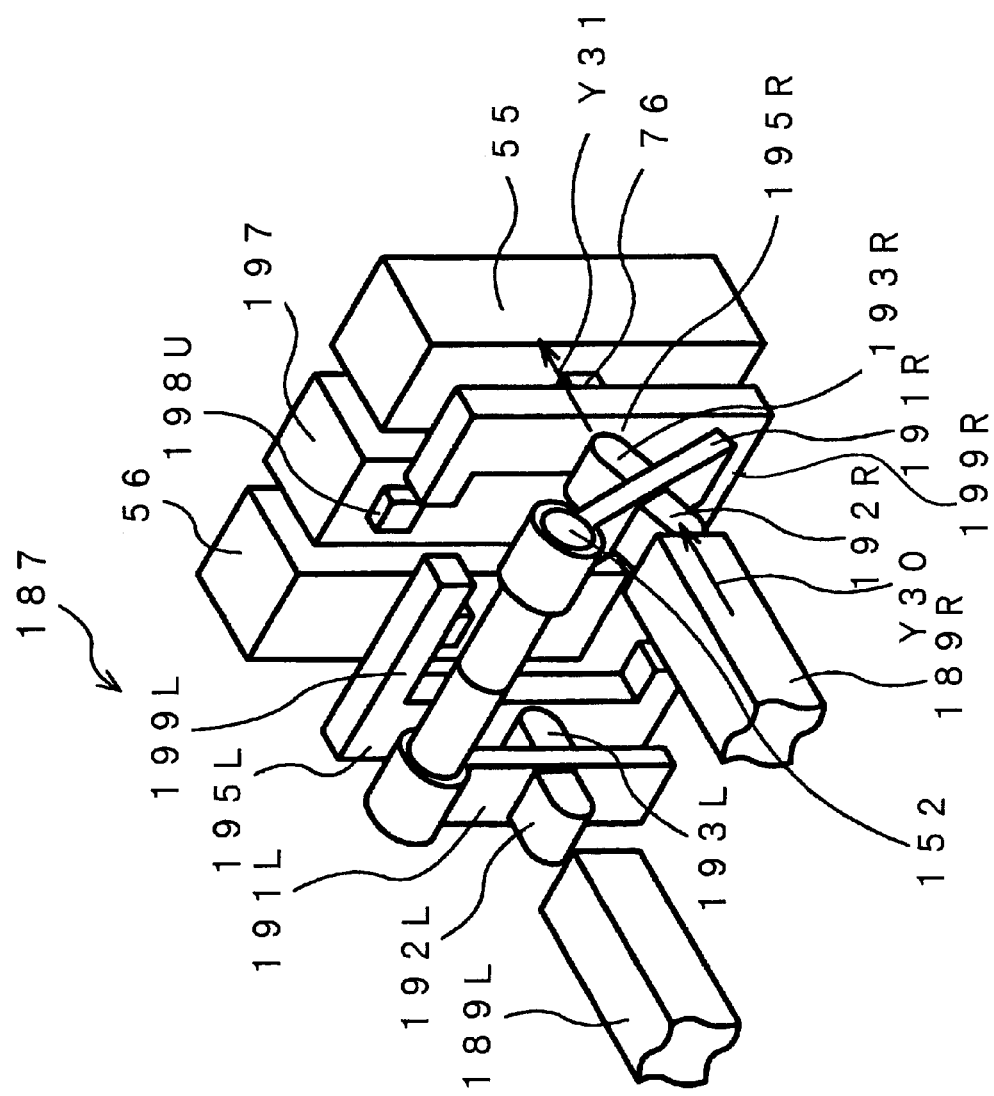
FIG. 30 is an oblique perspective view of a part of a switch assembly according to a tenth embodiment hereof.

A switch assembly according to a tenth embodiment of the present invention will be described with reference to FIG. 30, which is an oblique perspective view of a part of an internal configuration of a switch assembly 187 of this embodiment. In FIG. 30, the same reference characters as those in FIGS. 1 to 29 represent the same or equivalent parts, respectively.

The switch assembly 187 of this embodiment has a similar arrangement to that of the switch assembly 145 shown in FIG. 24 wherein a pivotal section pivotally mounted on a pivot shaft is pivotally moved by a force from the operating shaft, thereby operating the switch of the contact. However, the assembly of this embodiment is principally different from the switch assembly 145 in that two pairs of operating-shaft dedicated projections 155 and the adaptor dedicated projections 156 formed on the pivotal section are adapted to operate independently from each other.

Such a configuration is particularly advantageous in that the push-button section 52 can be applied not only to a so-called push-button switch shown in FIG. 24 but also to a selector switch.

Specifically, the selector switch (not shown) has left-hand and right-hand operating shafts which are adapted to operate independently from each other. For example, turning the selector switch clockwise operates the right-hand operating shaft 189R. Likewise, turning the selector switch counter-clockwise operates the left-hand operating shaft 189L. Incidentally, FIG. 30 shows a state where the right-hand operating shaft 189R is operated.

The pivotal section of this embodiment has a different configuration from that of the pivotal member 153 of the eighth embodiment. As seen in FIG. 30, pivotal members 191R, 191L are adapted to move a respective pair of operating-shaft dedicated projection 192R, 192L and adaptor dedicated projection 193R, 193L independently from each other. It is noted here that the pivotal members 191R and 191L are formed by dividing the pivotal member 153 of FIG. 24 into two parts, each of which include a respective pair of 192R, 192L and the adaptor dedicated projection 193R, 193L. However, unnecessary portions are removed to attain the light-weight pivotal members 191R, 191L of FIG. 30 so that their shapes do not perfectly coincide with shapes obtained by dividing the pivotal member 153 of FIG. 24 into two parts.

Operating-force transmitting members 195R, 195L are formed by dividing a quadrilateral plate with a rectangular hole defined at its center into two parts. In this case, a 21N-type contact 197 is used as the contact. The 21N-type contact 197 is adapted to vary its output based on a relation between the state of an upper protrusion 198U and the state of a lower protrusion (not shown).

When the upper protrusion 198U is depressed while the lower protrusion is not depressed, for example, the contact outputs 'State A'. On the other hand, when the upper protrusion 198U is not depressed while the lower protrusion is depressed, the contact outputs 'State B'.

In order to handle such a 21N-type contact 197, the operating-force transmitting members 195R, 195L have elongated length portions for 21N-type contact (hereinafter referred to as "elongated length portion") 199R, 199L, respectively.

Next, an operation of the switch assembly 187 is described. When the right-hand operating shaft 189R is moved in a direction of an arrow Y30, the right-hand operating-shaft dedicated projection 192R is depressed in the same direction by the movement of this operating shaft 189R, thereby causing the pivotal member 191R to pivot about the shaft 152.

This causes the adaptor dedicated projection 193R to depress the right-hand operating-force transmitting member 195R in a direction of an arrow Y31. As a result, the contact dedicated projection (not shown) formed on the right-hand operating-force transmitting member 195R operates the switching projection 76 of the communications contact 55 so that the state of the communications contact 55 is changed.

Since the right-hand operating-force transmitting member 195R is formed with the elongated length portion 199R, the switching projection 76 of the communications contact 55 and the lower protrusion of the 21N-type contact 197 are depressed by the right-hand operating-force transmitting member 195R thus depressed (see FIG. 30).

On the other hand, the left-hand operating-force transmitting member 195L is formed with the elongated length portion 199L and therefore, the projection (not shown) of the contact-making contact 56 and the upper protrusion 198U of the 21N-type contact 197 are depressed by the left-hand operating-force transmitting member 195L so depressed.

It is noted here that the operating shafts 189R, 189L are equivalent to a part of the operation receiving member of the present invention; the shaft 152, the right-hand operating-force transmitting member 195R, the left-hand operating-force transmitting member 195L, the right-hand pivotal member 191R, the left-hand pivotal member 191L, the right-hand operating-shaft dedicated projection 192R, the left-hand operating-shaft dedicated projection 192L, the right-hand adaptor dedicated projection 193R and the left-hand adaptor dedicated projection 193L are equivalent to a part of the adaptor member of the present invention; the communications contact 55 is equivalent to the information input/output functioning member of the present invention; and the contact-making contact 56 is equivalent to the direct functioning member of the present invention.

Accordingly, the tenth embodiment is applicable not only to the button switch but also to the selector switch, resulting in an expanded scope of application.

(Eleventh Embodiment)

Figure 31:
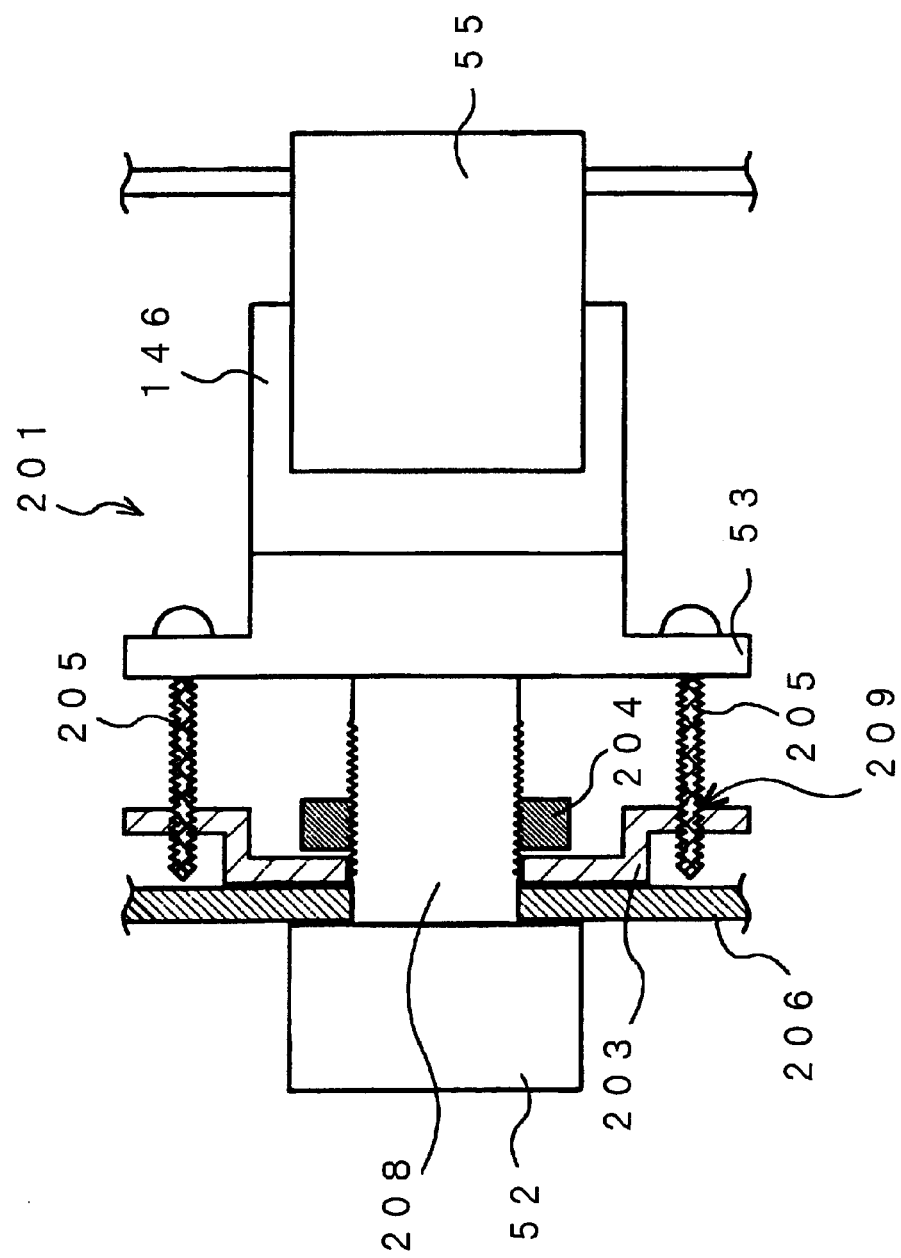
FIG. 31 is a partially cutaway side view showing an internal configuration of a switch assembly according to an eleventh embodiment hereof.

A switch assembly according to an eleventh embodiment of the present invention will be described with reference to FIG. 31, which is a partially cutaway side view showing an internal configuration of a switch assembly 201 of this embodiment. In FIG. 31, the same reference characters as those in FIGS. 1 to 30 represent the same or equivalent parts, respectively.

The switch assembly 201 of this embodiment comprises the push-button section 52, the push-button body 53, the adaptor 146, the communications contact 55, a collar member 203, a fixing nut 204 and a fixing screw 205.

The push-button section 52 is mounted to a mounting board 20.6 at a predetermined place thereof. The collar member 203 is mounted to a projecting portion 208 of the push-button section 52. The collar member 203 is of a circular shape and formed with a circular hole at its center. The projecting portion 208 of the push-button section 52 is inserted in this circular hole.

Then, a female screw formed on the fixing nut 204 is screwed together with a male screw formed on an outer periphery of the projecting portion 208 of the push-button section 52, thereby fixing the push-button section 52 to the mounting board 206.

Next, the fixing screw 205 is inserted in a fixing hole (not shown) defined in the push-button body 53 and then a distal end of the fixing screw 205 is inserted in a fixing screw hole 209 defined at the collar member 203. The fixing screw hole 209 is formed with a female screw.

In this state, the push-button body 53 is secured to the push-button section 52 by tightening the fixing screw 205 for screwing the fixing screw 205 with the fixing screw hole 209 of the collar member 203.

It is noted here that the push-button section 52 is equivalent to the operation receiving member of the present invention, the push-button body 53 and the adaptor 146 to the adaptor member of the present invention, the communications contact 55 to the information input/output functioning member of the present invention, the collar member 203 to the operation-receiving-member dedicated connection portion of the present invention, the fixing nut 204 to a base member of the present invention, and the fixing screw 205 to a fixing member of the present invention.

According the eleventh embodiment, the functioning member such as the communications contact 55 and the like may be used as combined with the push-button section 52 via the adaptor 146.

(Twelfth Embodiment)

Figure 32:
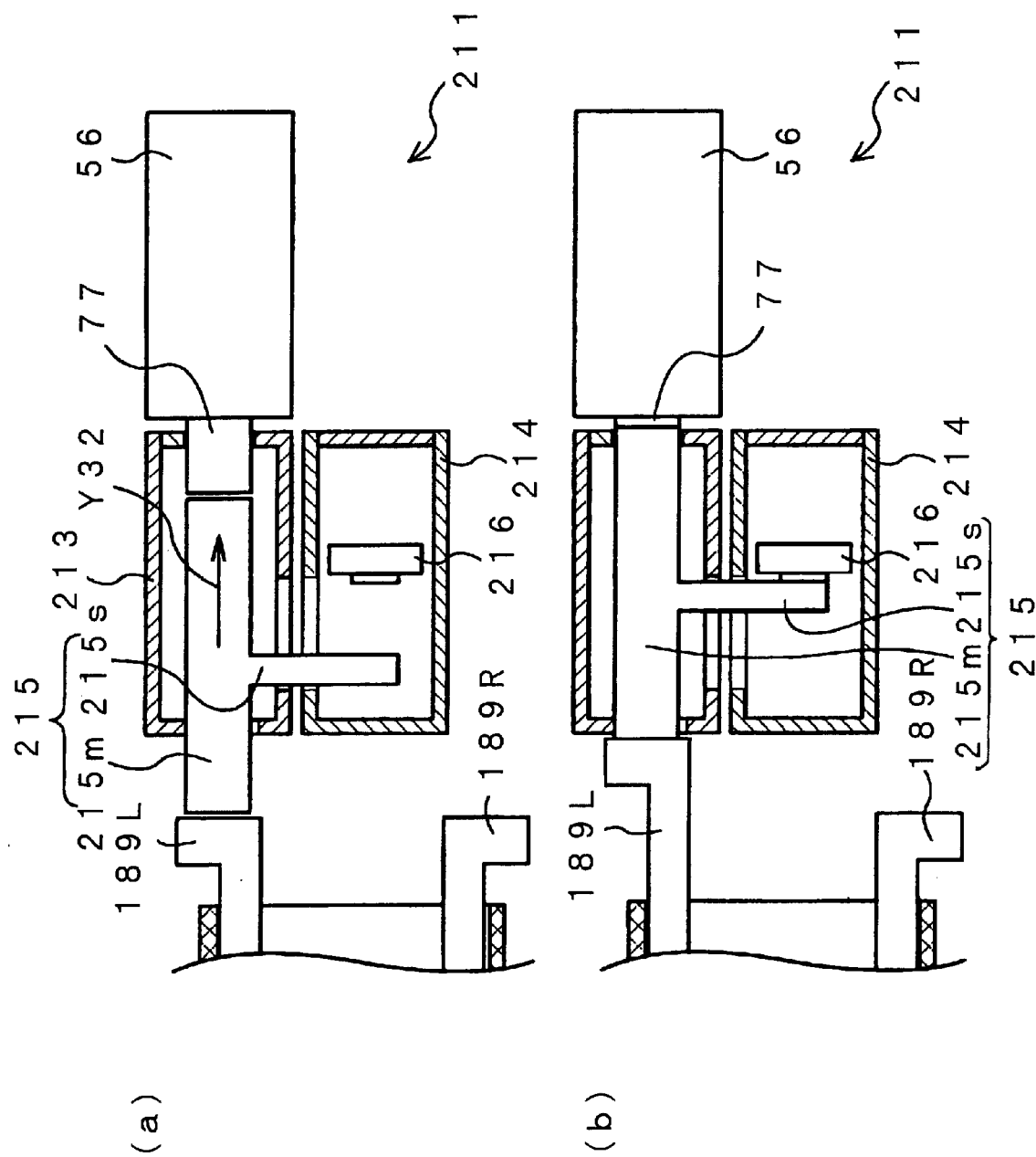
FIG. 32 is a group of explanatory diagrams of an operation of a switch assembly according to a twelfth embodiment hereof.

A switch assembly according to a twelfth embodiment of the present invention will be described with reference to FIG. 32, which explains an operation of a switch assembly 211 of this embodiment. In FIG. 32, the same reference characters as those in FIGS. 1 to 31 represent the same or equivalent parts, respectively.

The switch assembly 211 of this embodiment employs the selector switch of the above tenth embodiment as a switch section thereof. As mentioned supra, the selector switch is designed such that turning the switch clockwise operates the right-hand operating shaft 189R whereas turning the switch counter-clockwise operates the left-hand operating shaft 189L.

The switch assembly 211 comprises an intermediary box 213, a communications contact 214, and the contact-making contact 56.

The intermediary box 213 contains therein an intermediary bar 215. The intermediary bar 215 comprises a main shaft 215m as a central portion, and a branch shaft 215s perpendicularly extended from the main shaft 215m.

The intermediary bar 215 is operated in a direction of an arrow Y32 in conjunction with a movement of the left-hand operating shaft 189L of the selector switch in the direction of the arrow Y32. That is, as the left-hand operating shaft 189L is moved in the direction of the arrow Y32 as seen in FIG. 32(a), the intermediary bar 215 is also moved in the same direction as the above. As shown in FIG. 32(b), this allows the main shaft 215m of the intermediary bar 215 to press the switching projection 77 of the contact-making contact 56, thereby changing the state of the contact-making contact 56.

On the other hand, the movement of the intermediary bar 215 in the direction of the arrow Y32 involves a movement of the branch shaft 215s in the direction of the arrow Y32. As shown in FIG. 32(b), this allows the branch shaft 215s to press a switch 216 disposed internally of the communications contact 214. As a result, an information signal is outputted from the communications contact 214.

Incidentally, the communications contact 214 is formed with a rectangular hole in its side surface for receiving an operating force provided by the intermediary box 213.

In this manner, the intermediary box 213 transmits the operating force in the direction of the arrow Y32, received from the operating shaft 189L or 189R, to the contact-making contact 56 present on an extended line along the operating direction of the operating shaft 189L or 189R (the direction of the arrow Y32), while directing the operating force to a different direction and then outputting the resultant operating force to the communications contact 214.

According to the twelfth embodiment, the use of the intermediary box 213 permits the motion of the operating shafts 189L, 189R to be transmitted along a different direction from the extended line of the movement of the operating shafts 189L, 189R.

It is noted that the operating shafts 189L, 189R are equivalent to a part of the operation transmitting member of the present invention whereas the intermediary box 213 is equivalent to a intermediary member of the present invention.

According to the illustration of the above twelfth embodiment, the branch shaft 215s operates the communications contact 214. It is needless to say that an arrangement may be made such that the contact-making contact 56 is operated by the branch shaft 215s. On the other hand, the main shaft 215m is described to operate the contact-making contact 56. However, it is also possible for the main shaft 215m to operate the communications contact 214.

In the illustration of the twelfth embodiment, only the intermediary box 213 for the operating shaft 189L is shown. As a matter of course, the same intermediary box may be provided for the operating shaft 189R. Likewise, the intermediary boxes 213 may concurrently be provided for the operating shafts 189L, 189R.

Alternatively, there may be provided an adaptor member (such as the adaptor 138 shown in FIG. 22, for example) capable of receiving the operation of the operating shafts 189L, 189R while the intermediary box 213 may be connected with the adaptor member.

The above twelfth embodiment is arranged such that the intermediary member 213 changes the operating direction of the operating shafts 189L, 189R before providing the output to the communications contact 214. However, the intermediary member may directly output the operating force of the operating shafts 189L, 189R in the same direction as received, thereby operating the communications contact 214 or the like.

(Thirteenth Embodiment)

Figure 33:
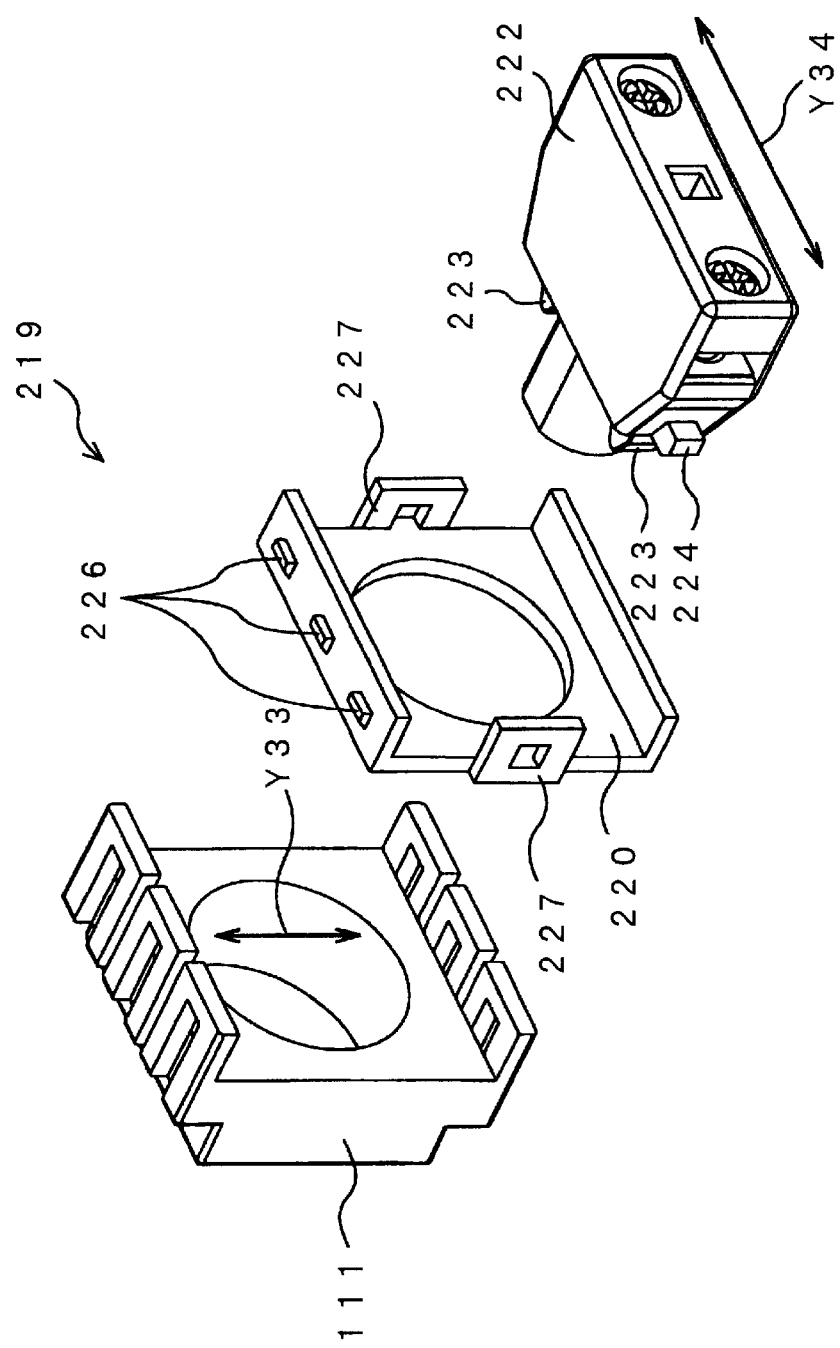
FIG. 33 is a disassembled oblique perspective view of a switch assembly according to a thirteenth embodiment hereof as seen from the rear side.
Figure 34:
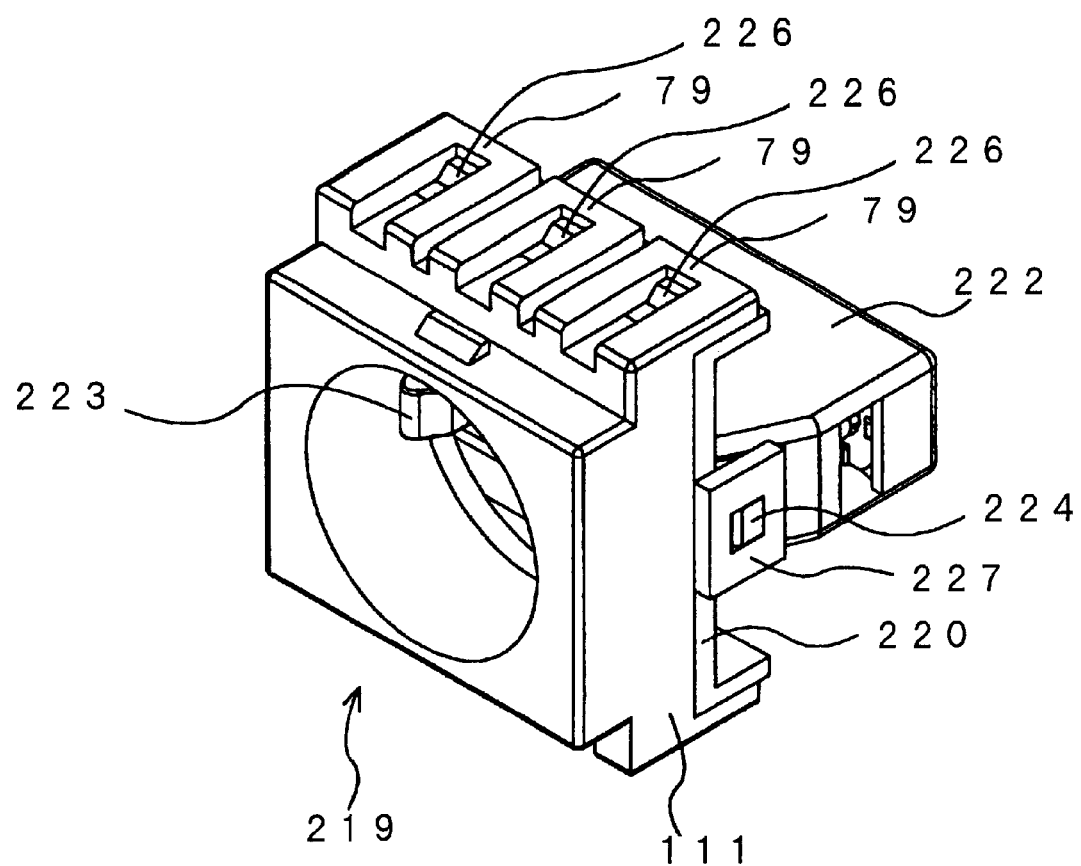
FIG. 34 is an oblique perspective view of a part of the switch assembly of the thirteenth embodiment.

A switch assembly according to a thirteenth embodiment of the present invention will be described with reference to FIGS. 33 and 34. FIG. 33 is a disassembled oblique perspective view of a switch assembly 219 of this embodiment as seen from the rear side, whereas FIG. 34 is an oblique perspective view of a part thereof. In FIGS. 33 and 34, the same reference characters as those in FIG. 1 to 32 represent the same or equivalent parts, respectively.

The switch assembly 219 of this embodiment comprises a switch section (not shown), a switch adaptor (not shown), the push-button body 111, a vertical/horizontal-orientation changing adaptor 220 and a 2IN-type contact-making contact having LED 222.

<2IN-Type Contact-Making Contact Having LED)

The 2IN-type contact-making contact having LED (hereinafter referred to as "2IN contact") 222 comprises two switching projections 223 and a pair of projecting connectors 224 (one of which is not shown).

The 2IN contact 222 resembles the 2IN-type contact 197 of the above tenth embodiment in that the output is changed depending upon the state of the two switching projections 223. It is noted that the 2IN contact 222 of this embodiment is adapted to change the lighting state of the LED (such as light-up or light-off of the LED) based on the sate of the switching projections 223.

The projecting connector 224 has the same configuration as the communications contact 55 shown in FIG. 1 or the like. Therefore, it is also possible to connect the 2IN contact 222 with the push-button body 111 by engaging the projecting connectors 224 of the 2IN contact 222 with the contact dedicated connectors 79 of the push-button body 111. In this case, the switching projections 223 are arranged along a direction of an arrow Y33 (see FIG. 33). Accordingly, an operation-position changing mechanism, such as shown in FIG. 32, is required for operating each of the switching projections 223.

<Vertical/Horizontal-Orientation Changing Adaptor>

Mounting projections 226 engage with the contact dedicated connectors 79 of the push-button body 111 for fixing the vertical/horizontal-orientation changing adaptor 220 to the push-button body 111. The vertical/horizontal-orientation changing adaptor 220 is provided with the mounting projections 226 and with contact dedicated connectors 227 formed along a plane orthogonal to the plane on which the mounting projections 226 are formed.

The contact dedicated connectors 227 engage with the projecting connectors 224 of the 2IN contact 222 thereby fixedly connecting the 2IN contact 222 with the vertical/horizontal-orientation changing adaptor 220.

According to the thirteenth embodiment, the vertical/horizontal-orientation changing adaptor 220 is used to fix the 2IN contact 222 so that the switching projections 223 are arranged along a direction of an arrow Y34. As a result, the state of the 2IN contact 222 can be changed without the operation-position changing mechanism or the like which is necessary when the 21N contact 222 is directly connected with the push-button body 111.

FIG. 34 shows a state where the push-button body 111, the vertical/horizontal-orientation changing adaptor 220 and the 2IN contact 222 are combined together.

In the above thirteenth embodiment, the 2IN contact 222 is described as the contact-making contact. Instead, the 2IN contact may serve as the communications contact.

The above thirteenth embodiment has been described by way of the example where the push-button body 111 is connectable with the switch adaptor 110. Alternatively, there may be used the push-button body 53 (see FIG. 1) wherein the switch adaptor 110 and the push-button body 111 are unified.

(Fourteenth Embodiment)

Figure 35:
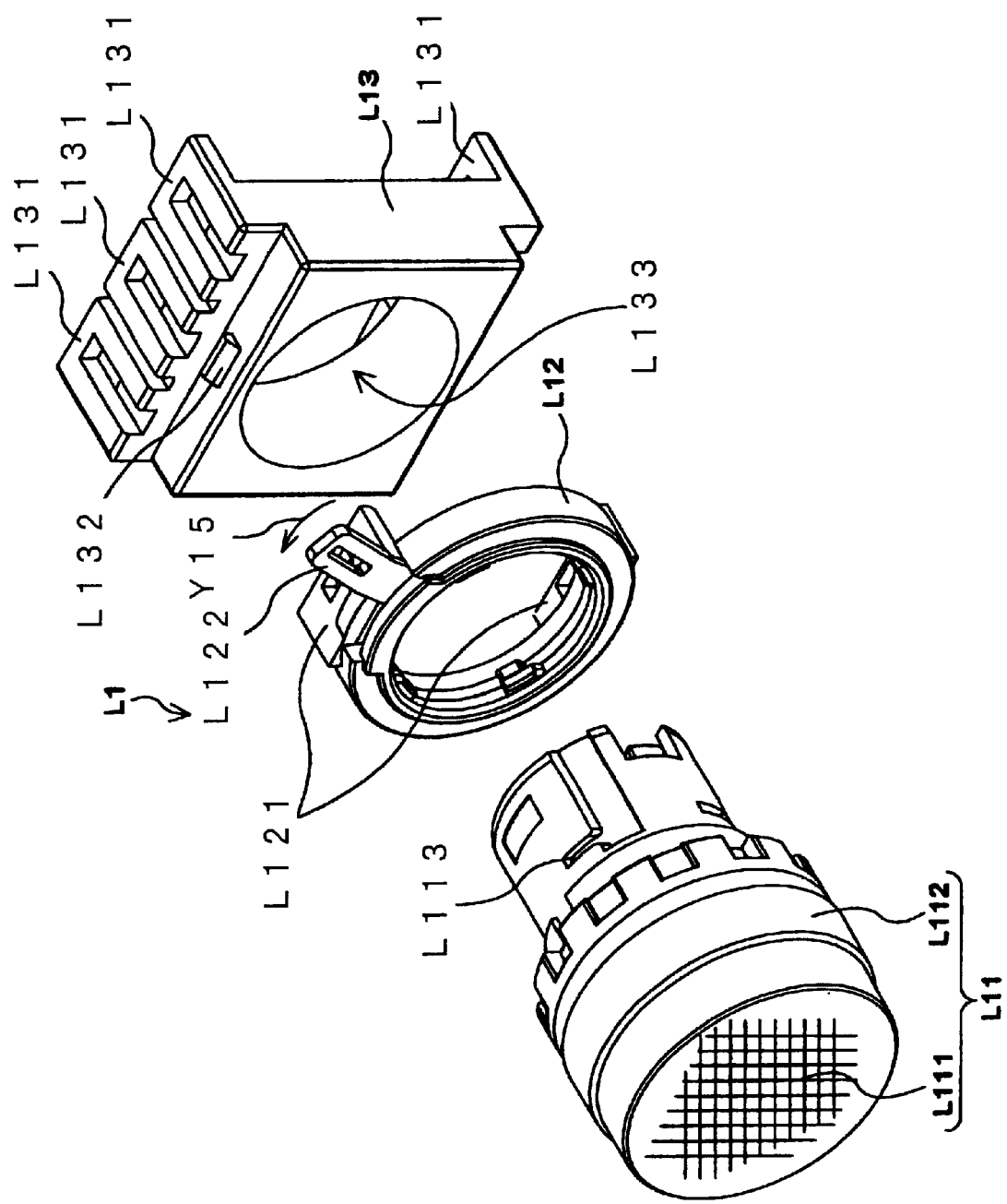
FIG. 35 is a disassembled oblique perspective view of an indicator lamp according to a fourteenth embodiment hereof as seen from the front side.

A switch assembly according to a fourteenth embodiment of the present invention will be described with reference to FIG. 35. In FIG. 35, the same reference characters as those in FIGS. 1 to 32 represent the same or equivalent parts, respectively.

This embodiment represents an example where the switch assembly is applied to an indicator lamp L1, which comprises an indication section L11, an indicator adaptor L12, an indicator connection section L13, and an LED box (not shown) as a functioning member including a lighting component for lighting operation. The indication section L11, the indicator adaptor L12 and the indicator connection section L13 are equivalent to a front-side member of the present invention.

Since the unillustrated LED box is the same as the LED box 54 (see FIG. 7) of the first embodiment, this LED box has the contact dedicated connectors 79 for connection with the indicator connection section L13 which have a compatible configuration with the communications contact or the contact-making contact.

By the way, the indication section L11 includes a translucent colored indication panel L111 and a casing L112 for retaining the indication panel L111. The casing L112 is formed with an engagement groove L113.

On the other hand, the indicator adaptor L12 is provided with a pair of connectors L121, and an engaging projection L122. The connectors L121 and the engaging projection L122 have the same configurations as the connectors 114 and the push-button engaging projection 115 of the switch adaptor 110 of the third embodiment (see FIG. 15).

Accordingly, the indicator adaptor L12 and the indication section L11 are fixedly combined together through engagement between the engaging projection L122 and the engagement groove L113.

The indicator connection section L13 is provided with three pairs of contact dedicated connectors L131, and a pair of adaptor-connecting projections L132. The connecting projections L132 engage with the connectors L121 thereby fixedly connecting the indicator connection section L13 with the indicator adaptor L12.

Mounted to the contact dedicated connectors L131 is the unillustrated LED box, an LED (the same LED as the LED 72 of FIG. 7) of which is inserted through an aperture L133 of the indicator connection section L13 and then into the indication section L11. Therefore, the lighting condition of the LED can be checked through the indication panel L111.

Since the indicator connection section L13 is formed with three pairs of contact dedicated connectors L131, the LED boxes individually having LEDs of different colors may be mounted thereby increasing the kinds of indication colors.

As understood from the foregoing, the indicator lamp L1 has no operation section so that the light-up and light-off of the LED are effected by a signal from a source external of the indicator lamp L1.

According to the fourteenth embodiment, the provision of the indicator adaptor L12 permits the indication section L11 and the indicator connection section L13 to be interconnected for use even if the indication section L11 is not configured to be compatible with the indicator connection section L13.

(Fifteenth Embodiment)

Figure 36:
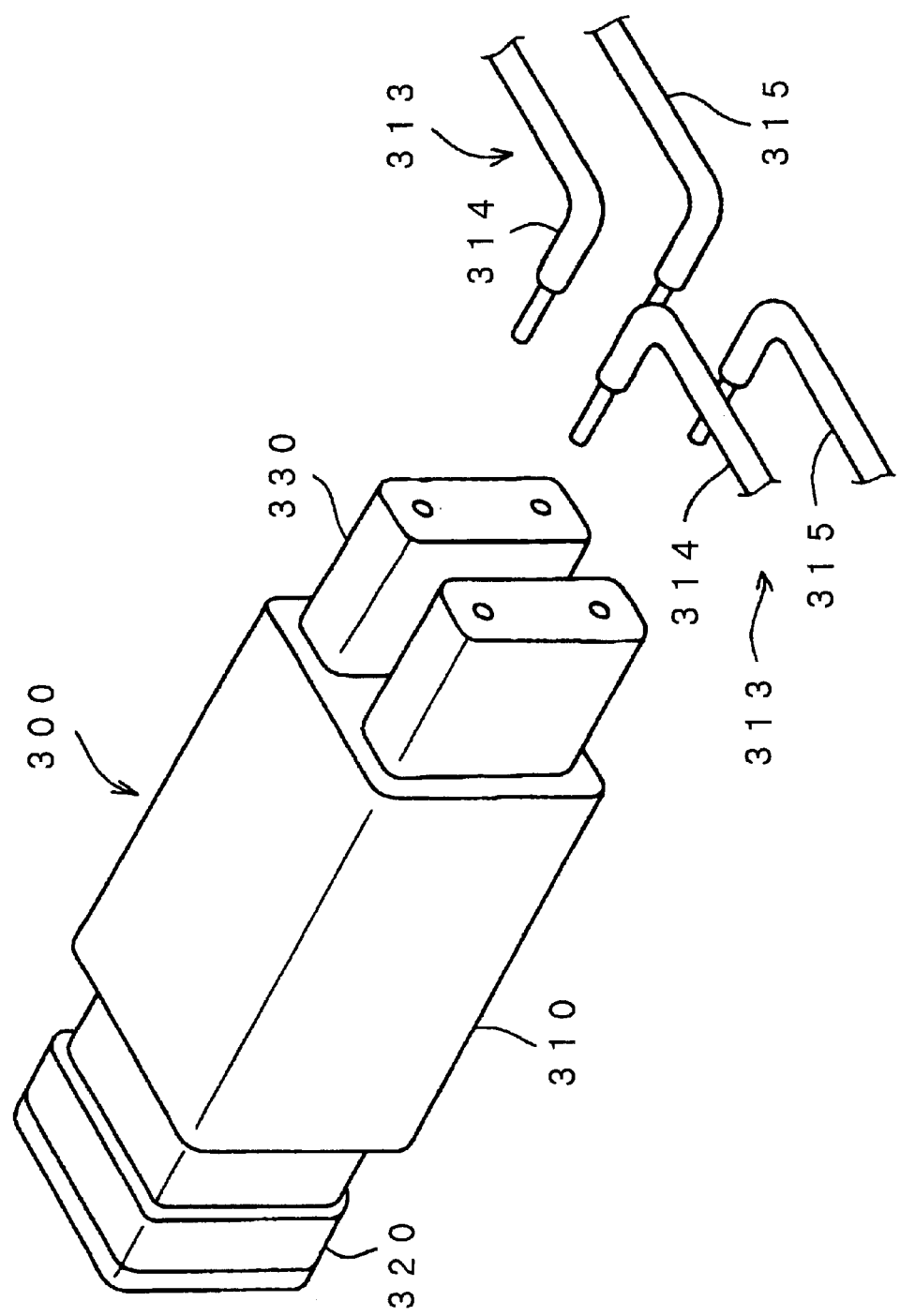
FIG. 36 is an oblique perspective view of a switch module with lamp according to a fifteenth embodiment hereof as seen from the rear side.

A switch module with lamp or an input/output module as an electrical component according to a fifteenth embodiment of the present invention will be described with reference to FIGS. 36 and 37. FIG. 36 is an oblique perspective view of the module as seen from the rear side, whereas FIG. 37 is a sectional view showing an internal configuration of the module.

A switch module with lamp 300 shown in FIG. 36 comprises a casing 310 which contains therein a communications section 311 as the information input/output functioning member and a device section 312 including a variety of devices as the direct functioning member. An operation section 320 is exposed from one side of the casing 310, the operation section 320 giving a lamp indication to the operator or serving as the operation transmitting member (the driving member) providing a switch to be depressed by the operator. The casing 310 is provided with a connecting section 330 on its opposite side from the operation section 320, the connecting section 330 being connected with a transmission path 313 (a first transmission line 314 and a second transmission line 315).

Figure 37:
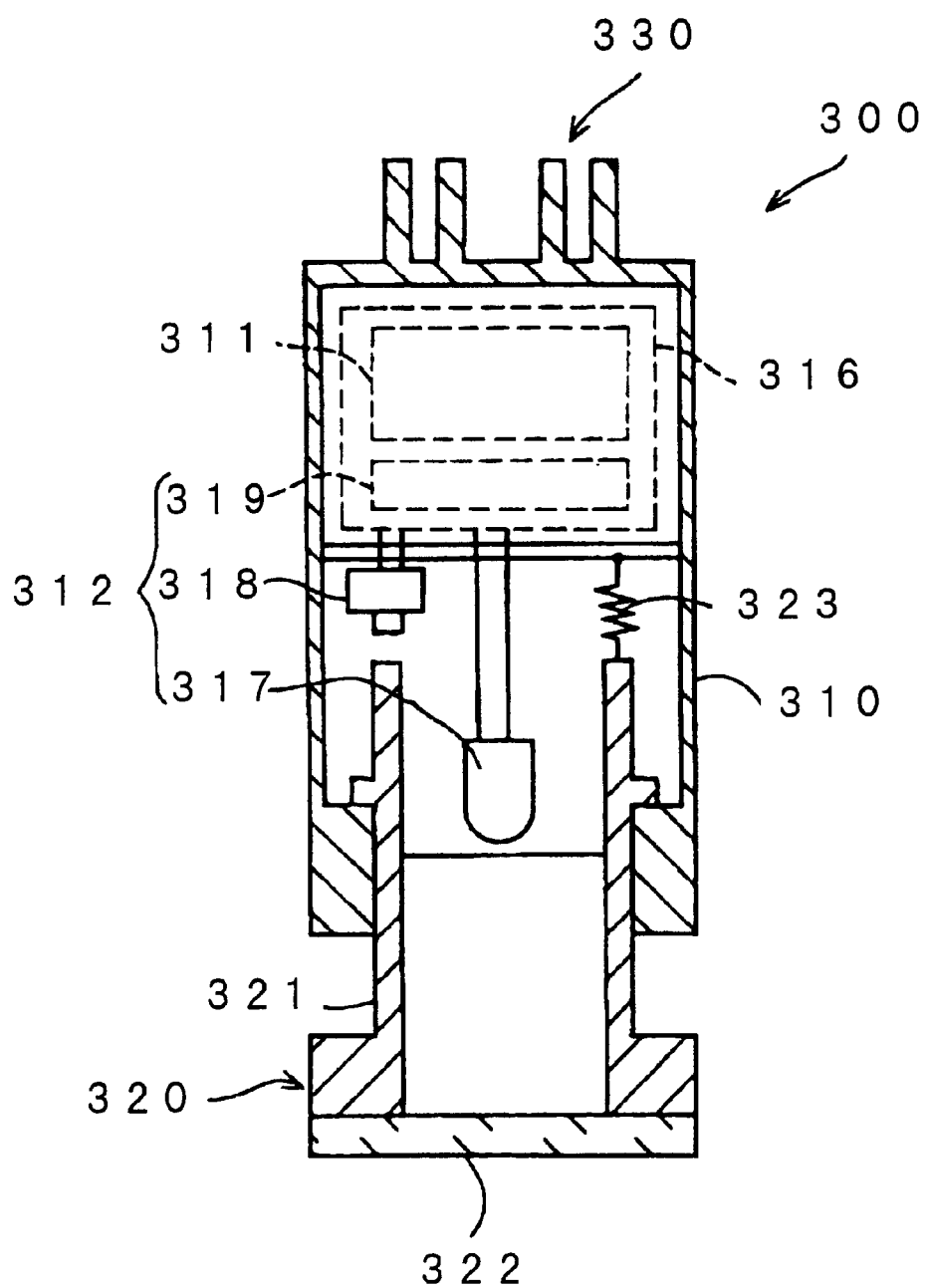
FIG. 37 is a sectional view showing an internal configuration of the switch module with lamp of the fifteenth embodiment.

FIG. 37 is a vertical sectional view showing the internal configuration of the switch module with lamp 300, the switch module having the connecting section 330 positioned upwardly and the operation section 320 positioned downwardly. It is noted that the internal configuration of the switch module with lamp 300 is depicted in a properly simplified fashion.

The casing 310 contains therein a circuit-board 316 for performing input or output of signal via the transmission path 313 and for receiving an electric power supplied via the transmission path 313, a lamp 317 for emitting light to the operator, a switch 318 detecting a pressing action of the operator for performing a switching operation, and the like.

Defined on the circuit-board 316 are the communications section 311 for communicating signals with a main control unit (not shown) via the transmission path 313, and an interface section 319, as a part of the device section 312, which is interposed between the communications section 311 and input and output devices such as the lamp 317, the switch 318 and the like.

A barrel portion 321 of a tubular shape is formed at a connection portion between the operation section 320 and the casing 310. A transparent member 322 transparent to light is mounted to an end surface of the operation section 320, the end surface facing the operator. This permits the operator to recognize light emitted from the lamp 317 and traveling through an interior of the barrel portion 321 and the transparent member 322.

The switch 318 and a spring 323 are disposed at the other end (on the opposite side to the transparent member 322) of the barrel portion 321. When the operator presses the operation section 320 with his finger, the spring 323 is energized while the switch 318 performs the switching operation. When the operator releases his finger from the operation section 320, the operation section 320 is returned to its initial position by means of a restoring force of the spring 323.

In this manner, the casing 310 provides an integrated configuration to the switch module with lamp 300, containing therein the device section 312 composed of the lamp 317, the switch 318 and the interface section 319, and the communications section 311.

According to the fifteenth embodiment, the casing 310 unifies the device section 312 and the communications section 311 (into a unit block), thereby, for example, negating the need for an operation and space for wiring between the communications section and the devices necessary for the transmission system in the general bus-system network. Hence, various types of input/output modules including the switch module with lamp 300 may be readily installed in the transmission system in the bus-system network. Furthermore, the overall installation space for the transmission system may be decreased.

(Sixteenth Embodiment)

A sixteenth embodiment of the present invention will be described with reference to FIG. 38, which is a connection block diagram of a part of this embodiment. The same reference characters as those in FIGS. 36 and 37 represent the same or equivalent parts, respectively.

Figure 38:
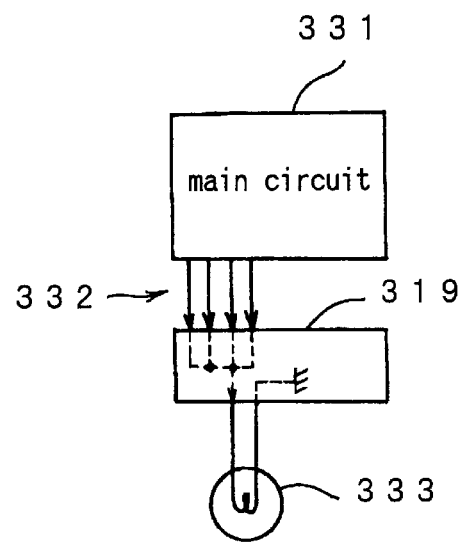
FIG. 38 is a connection block diagram of a part of a switch module with lamp according to a sixteenth embodiment hereof.

FIG. 38 illustrates a method for efficiently utilizing output ports 332 of a main circuit 331 with the aim of achieving the greatest possible omission of additional power sources connected with the input/output module such as the aforesaid switch module with lamp. FIG. 38 assumes, as the device, an input/output module only having a lamp 333 so that only the main circuit 331, the interface section 319 and the lamp 333 are shown.

In the general transmission system of the bus-system network, connection is normally made such that one output port 332 of the main circuit 331 always corresponds to one input of a device. For instance, a device having one input, such as a lamp, is connected to one output port 332.

For comparison with this embodiment, Table 1 shows a conventional example of how four output ports 332 are

TABLE 1

| Port No. | 1 | 2 | 3 | 4 | Output Current |
|---|---|---|---|---|---|
| 1 output point | A | — | — | — | 1 mA |
| 2 output points | A | B | — | — | 1 mA |
| 4 output points | A | B | C | D | 1 mA |

As shown in Table 1, where the device has only one input (for example, one lamp), one signal is to be outputted from the output port 332 (hereinafter, expressed as "the number of output point is 1"), so that it has been a practice to directly or indirectly connect only one output port 332 with the device. Where the number of output point is 2, two output ports 332 are connected with the device. Since the main circuit 331 has four output ports 332, the main circuit 331 is capable of simultaneously outputting four kinds of signals to the device.

According to the conventional connection method shown in Table 1, current supply to one output point is limited to the amount of current flowing out of one output port 332. When a lamp operable on a low current is used as the device, the amount of current supplied from one output port 332 of the main circuit 331 is sufficient for operating the lamp and hence, there is no need for an additional power source. However, in order to operate a lamp requiring a relatively high current, the current supplied from one output port 332 is insufficient so that an additional power source must be connected to the interface section 319.

The example of FIG. 38 suggests a connection method wherein even the lamp 333, requiring a relatively high current and an additional power source in the conventional connection method, can be operated without being connected with the additional power source. As seen in FIG. 38, the four output ports 332 of the main circuit 331 are connected with the interface section 319, in which the four output ports 332 are unified and led to the lamp 333. Additionally, the same signal is outputted from the four output ports 332. Thus, the amount of current flowing into the lamp 333 is increased to the sum of currents flowing out of the four output ports 332.

As a result, even if one output port 332 is capable of outputting up to 1 mA, the connection method of FIG. 38 permits a current of up to 4 mA to flow through the lamp 333. That is, if the lamp 333 operates on a current of not less than 1 mA and not more than 4 mA, the lamp 333 can be activated without providing an additional power source.

Table 2 shows a connection relationship between the output port 332 and the interface section 319 when the output ports 332 are efficiently used according to this embodiment.

TABLE 2

| Port No. | 1 | 2 | 3 | 4 | Output Current |
|---|---|---|---|---|---|
| 1 output point | A | A | A | A | 4 mA |
| 2 output points | A | A | B | B | 2 mA |

As seen in Table 2, if the number of output point is 1 (only "A" shown in Table 2), the output point can be supplied with a current of up to 4 mA as shown in the example of FIG. 38. If the number of output points is 2 ("A" and "B" in Table 2), a current of up to 2 mA can be supplied to each output point by dividing the outputs from the four output ports 332 into two. As a matter of course, the output ports 332 may be divided at a ratio of 3:1 when the number of output points is 2. If the number of output points is 3, the output ports 332 may be divided at a ratio of 2:1:1. Then, the same signal is outputted from the output ports 332 unified by the interface section 319.

According to the sixteenth embodiment, the same output is assigned to two or more of the plural output ports 332 and hence, a device incapable of being activated by a current from one output port 332 can be activated without providing an additional power source. As a result, the embodiment accomplishes a reduced installation space as compared with the space where the input/output module, such as the switch module with lamp 300 provided with an additional power source (see FIG. 36), including an additional power source, is installed. This results in, for example, a simplified structure of the transmission system of the bus-system network.

(Seventeenth Embodiment)

Figure 39:
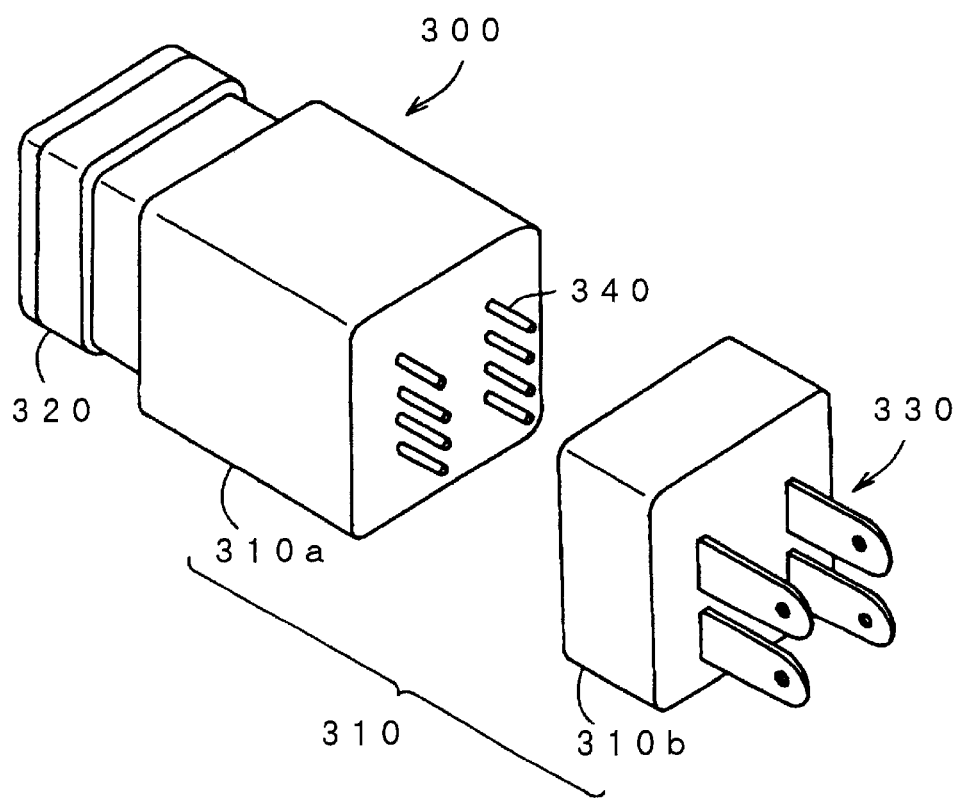
FIG. 39 is a disassembled oblique perspective view of a switch module with lamp according to a seventeenth embodiment hereof as seen from the rear side.
Figure 40:
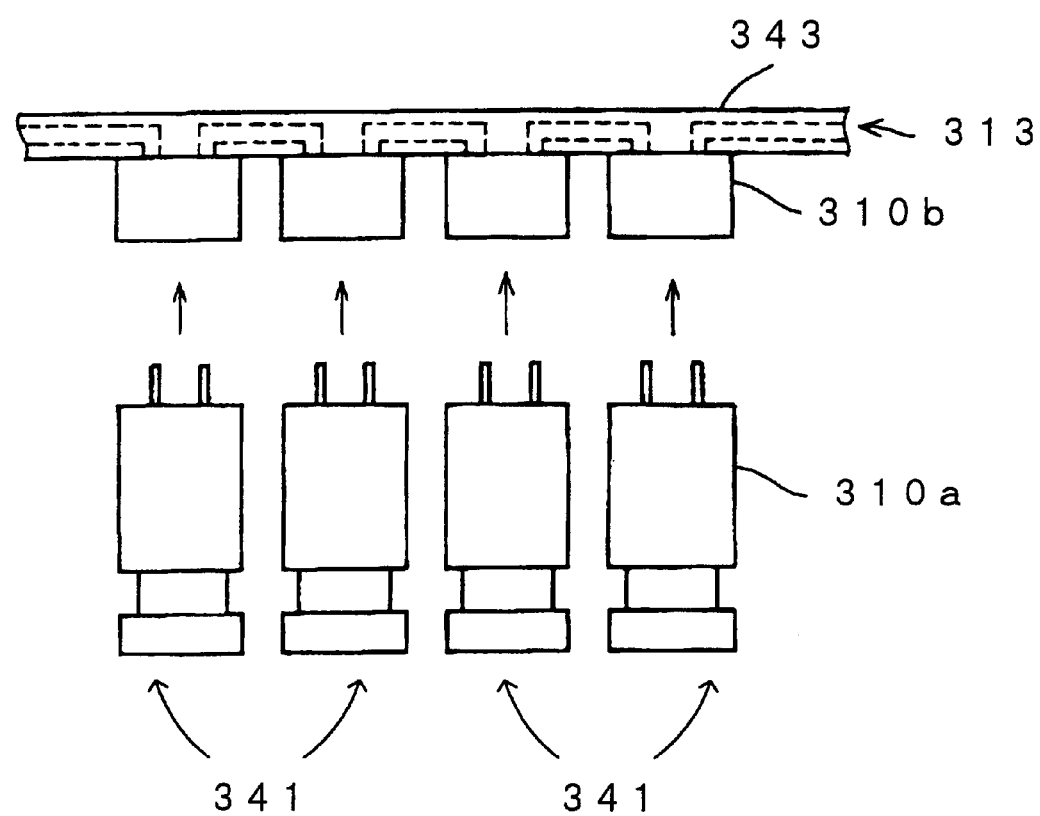
FIG. 40 is an explanatory diagram of an operation of the switch module with lamp of the seventeenth embodiment.

A switch module with lamp or an input/output module as the electrical component according to a seventeenth embodiment of the present invention will be described with reference to FIGS. 39 and 40. FIG. 39 is a disassembled oblique perspective view of the module as seen from the rear side, whereas FIG. 40 is an explanatory diagram of an operation thereof. It is noted that the same reference characters as those in FIGS. 36 and 37 represent the same or equivalent parts, respectively.

FIG. 39 illustrates another mode of the switch module with lamp 300 (see FIGS. 36 and 37) as the input/output module according to the fifteenth embodiment. The aforesaid switch module with lamp 300 includes the connecting section 330 in the form of a tab terminal. In the switch module with lamp 300 of FIG. 39, on the other hand, the casing 310 consists of two sub-casings 310a, 310b which are separable from each other. The sub-casing 310b on the side of the connecting section 330 contains therein the communications section 311 whereas the sub-casing 310a on the side of the operation section 320 contains therein the device section 312 including the interface section 319, the lamp 317, the switch 318 and the like. When the two sub-casings 310a, 310b are combined together, the main circuit 331 of the communications section 311 and the interface section 319 are interconnected via a terminal 340.

According to the seventeenth embodiment, even the input/output module integrating the communications section 311 and the device section 312 facilitates the installation, maintenance and design of the input/output module, as will be described hereinafter, because the sub-casing 310b contains therein a part of or the whole body of the communications section 311 and is provided with the connecting section 330 whereas the sub-casing 310a contains therein the remaining part of the communications section 311 and the device section 312, the sub-casings 310a, 310b being detachably connected with each other.

FIG. 40 is an explanatory diagram of an operation for installing an input/output module 341 such as the switch module with lamp including the two sub-casings 310a, 310b the same way as that of FIG. 39. As shown in FIG. 40, when the input/output module 341 is installed, the sub-casing 310b is first mounted to a predetermined mounting board 343 (the mounting board 343 is previously formed with a transmission path 313) so as to connect the communications section 311 with the transmission path 313.

In this case, the communications section 311 is common to various types of input/output modules 341 and hence, the sub-casing 310b including the communications section 311 may be mounted without considering the type of the input/output module 341 to be mounted. Therefore, the input/output module 341 can readily be installed.

After completion of the installation of the sub-casing 310b, the sub-casing 310a is connected with the sub-casing 301b to complete the installation of the input/output module 341. Thus, the operation for interconnecting wirings of the communications section and the device section, which is required by the general transmission system of the bus-system network, can be dispensed with by using the input/output module 341 of FIG. 39 wherein the sub-casing 310a is detachably connected with the sub-casing 310b.

In the event that the device section 312 of any one of the input/output modules 341 fails, the maintenance work for the transmission system can be done by merely replacing the sub-casing 310a while the sub-casing 301b is left as it is. Thus, there is no need to replace the whole body of the input/output module 341.

On the other hand, design efforts can be decreased by an approach wherein the sub-casing 310b and internal parts thereof are designed as common parts to various types of input/output modules 341 (that is, the sub-casing 310b is designed to totally or partially include the communications section 311), whereas the sub-casing 310a and internal parts thereof are designed as parts specific to each of the various types of input/output modules 341.

(Eighteenth Embodiment)

An eighteenth embodiment of the present invention will be described with reference to FIG. 41, which is a disassembled oblique perspective view showing a part of a switch module with lamp. The same reference characters as those in FIGS. 36 and 37 represent the same or equivalent parts, respectively.

Figure 41:
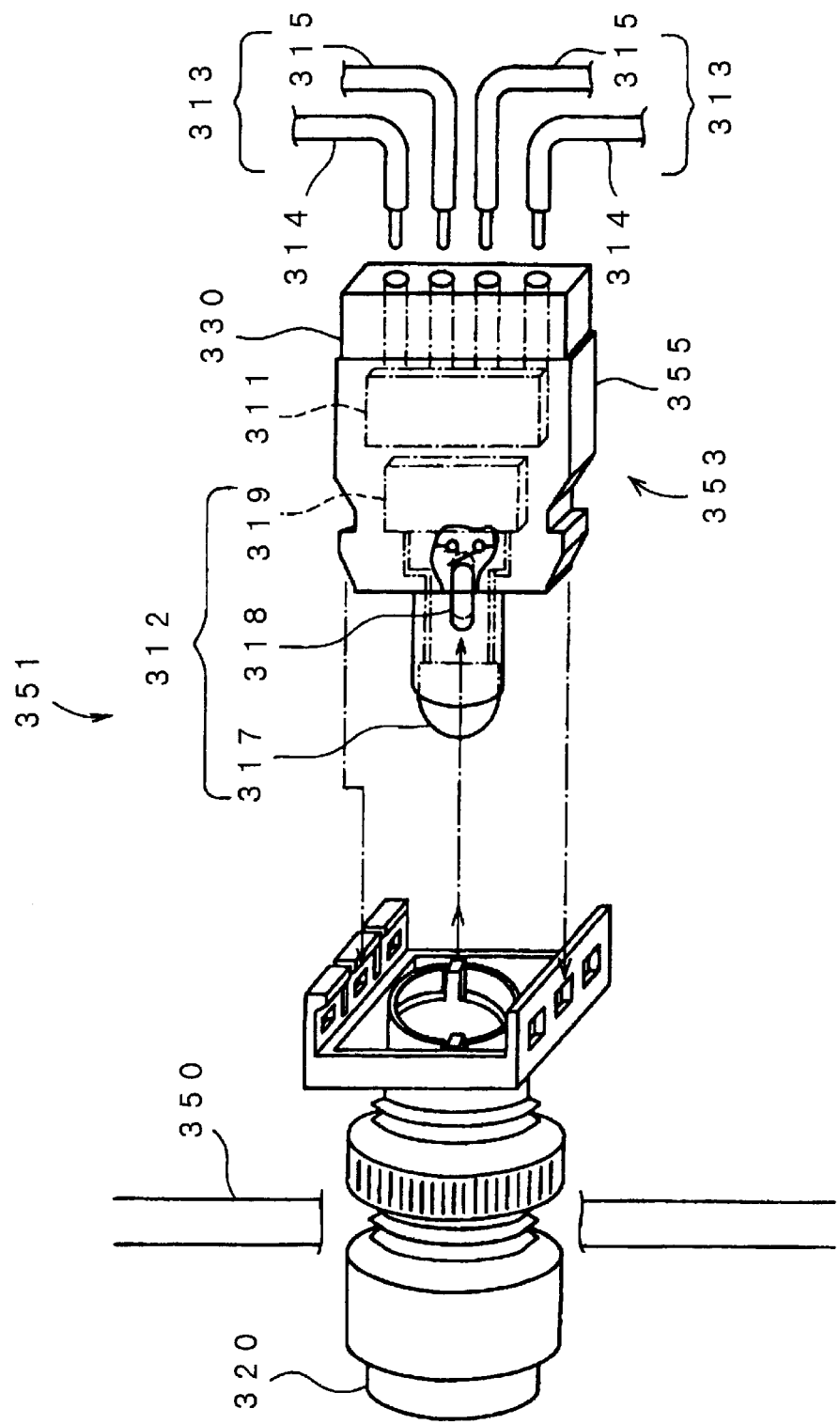
FIG. 41 is a disassembled oblique perspective view of a part of a switch module with lamp according to an eighteenth embodiment hereof.

FIG. 41 is an oblique perspective view showing a structure of a switch module with lamp 351 mounted to a mounting board 350, the module representing another specific example of the input/output module as the electrical component.

The switch module with lamp 351 has substantially the same configuration as the switch module with lamp 300 of FIG. 35. The switch module 351 includes the operation section 320 operatively depressed by the operator with his finger and directing the light from the lamp to the operator, and the connecting section 330 connected with the first and the second transmission lines 314, 315. A contact block 353 formed with the connecting section 330 is provided with the communications section 311, the interface section 319, the lamp 317 as an output device and the switch 318 as an input device. The lamp 317 is mounted to a surface of the contact block 353 whereas the switch 318 is mounted to the contact block 353 as partially contained therein. The interface section 319, the lamp 317 and the switch 318 constitute the device section 312.

In this manner, a casing providing the integral form of the input/output module may be defined by the combination of outside structures of the operation section 320 and of the contact block 353.

According to the eighteenth embodiment, the switch module with lamp 351 has the same outside structure as the conventional contact-making contact block, thus permitting a plurality of conventional contact-making contact blocks to be mounted in side-by-side relation with the thin contact block 353. This permits the operator to turn ON/OFF the load without using the network or to directly apply an emergency stop-signal especially required the safety without using the network.

According to the above eighteenth embodiment, the switch module with lamp 351 as a whole defines a single input/output module. However, the contact block 353 itself defines an input/output module having the device section 312 and the communications section 311. In this manner, an input/output module with a communication function may define the contact block 353. In this case, a member 355 defining an outside structure of the contact block 353 serves as the casing.

(Nineteenth Embodiment)

A nineteenth embodiment of the present invention will be described with reference to FIG. 42, which is a disassembled oblique perspective view. The same reference characters as those in FIGS. 36 and 37 represent the same or equivalent parts, respectively.

Figure 42:
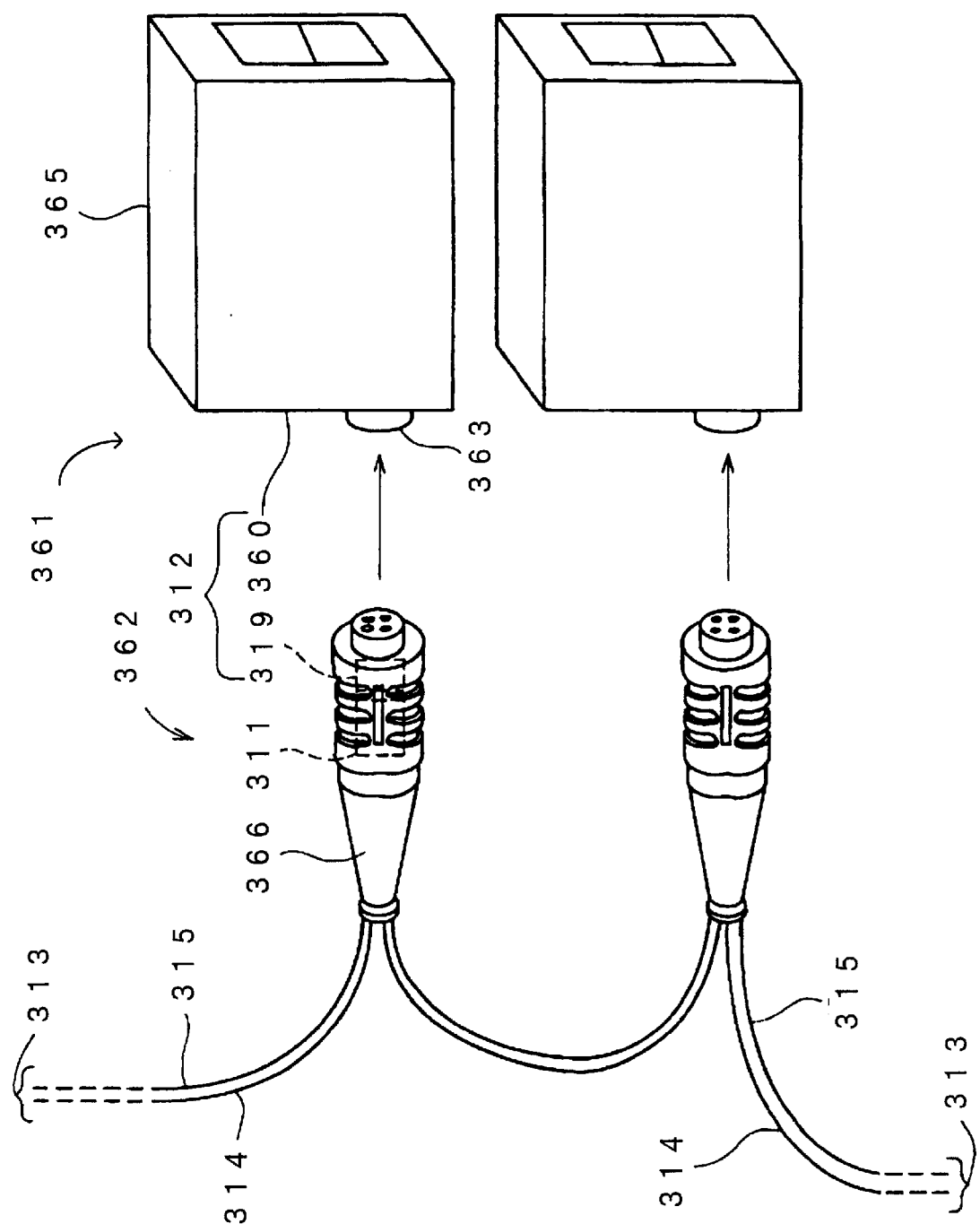
FIG. 42 is a disassembled oblique perspective view of a switch module with lamp according to a nineteenth embodiment hereof.

FIG. 42 is an oblique perspective view showing a structure of an input/output module 361 utilizing a known sensor 360, the module representing still another specific example of the input/output module as the electrical component.

The input/output module 361 comprises the known sensor 360 and a connector 362 interposed into the transmission path 313. The connector 362 is connected with a connector 363 of the sensor 360.

The connector 362 contains therein the interface section 319 and the communications section 311 such that the sensor 360 may be utilized as it is. Accordingly, the sensor 360 and the interface section 319 constitute the device section 312.

In the input/output module 361 of FIG. 42, a casing of the sensor 360 can be regarded as one sub-casing 365 whereas a casing of the connector 362 c an be regarded as another sub-casing 366. Thus, the input/output module 361 is constructed such that the device is disposed in the sub-casing 365 while the interface section 319 and communications section 311 are disposed in the sub-casing 366. The input/output module 361 integrally constructed from these structures is formed by combining the sub-casing 365 with the sub-casing 366.

According to the nineteenth embodiment, the sub-casing 366 is defined by the connector 362 having the communication function, thereby permitting the known sensor 360 itself to be used as a part of the input/output module 361. This negates the need for designing an additional sensor incorporating the communications section, contributing to decreased design efforts. Needless to say, the present invention is not limited to the use of the sensor but permits the known switch, lamp or the like to be directly used as a part of the input/output module.

(Twentieth Embodiment)

Figure 43:
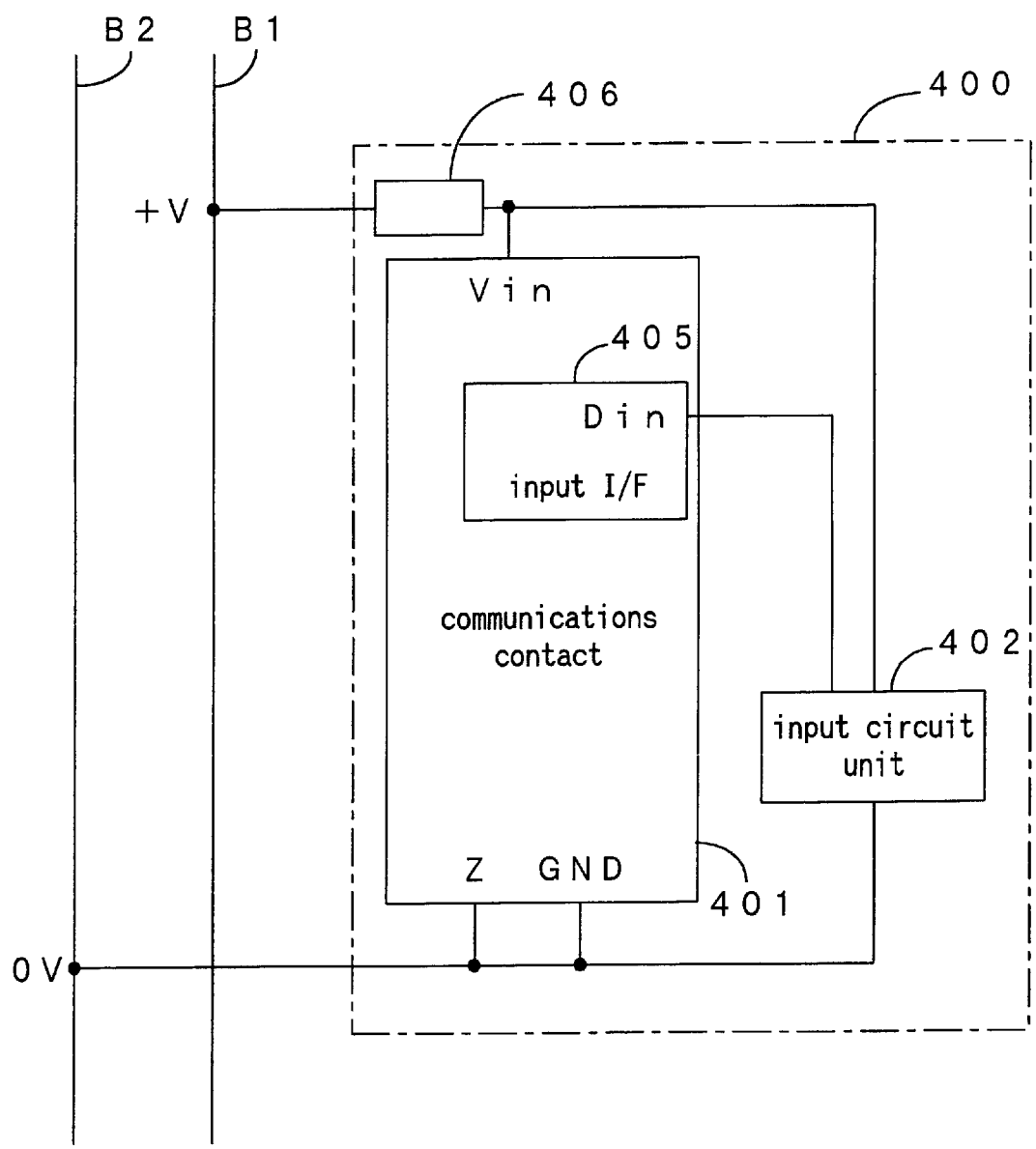
FIG. 43 is a connection block diagram of a communications apparatus according to a twentieth embodiment hereof.
Figure 44:
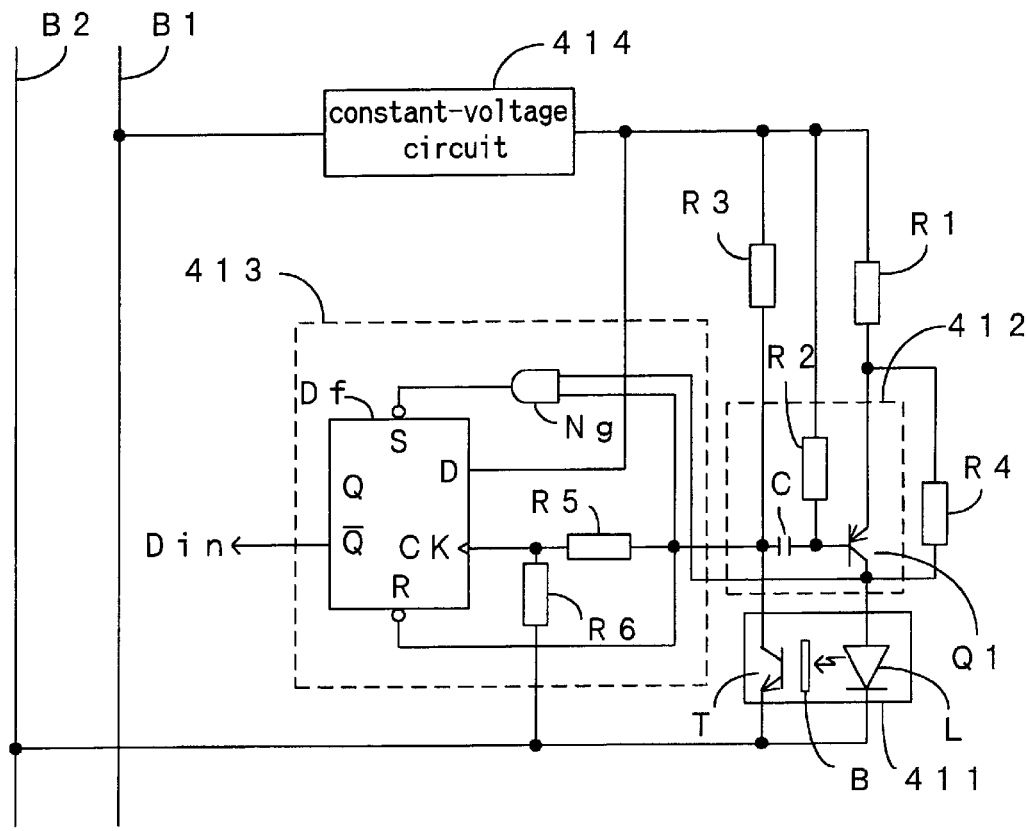
FIG. 44 is a connection diagram of a part of the communications apparatus of the twentieth embodiment.
Figure 45:
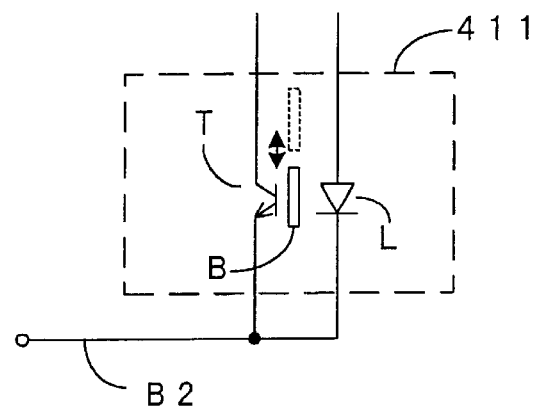
FIG. 45 is a schematic diagram showing a configuration of a part of the communications apparatus of the twentieth embodiment.

A communications apparatus according to a twentieth embodiment of the present invention will be described with reference to FIGS. 43 to 46. FIG. 43 is a connection block diagram of this embodiment; FIG. 44 a fragmentary connection diagram thereof; FIG. 45 a fragmentary schematic diagram showing a configuration thereof; and FIG. 46 a timing chart for explaining an operation thereof.

As shown in FIG. 43, a communications apparatus 400 of this embodiment may be applied to, for example, the bus-system network and is configured to integrate a communications contact 401 and an input circuit unit 402, the communications contact 401 representing the information input/output functioning member of the aforesaid switch assembly 51 or the like. In this case, for example, as shown in FIG. 1, the communications contact 401 may be unified with the input circuit unit 402 in a manner that an operation section (to be described hereinafter) of the input circuit unit 402 is constituted by the push-button section 52 and the push-button body 53 in detachably combined relation whereas a contact case incorporating the communications contact 401 and a circuit portion of the input circuit unit 402 is detachably mounted to the above push-button body.

The push button may be of a so-called temporary retention type which is operatively depressed to be retained in a depressed state and then is depressed again to be returned to its initial state. Otherwise, the push button may be of a type which is placed in the depressed state while subjected to a pressing force and returns to its initial state when the pressing force is released.

As shown in FIG. 43, the communications contact 401 comprises an integrated communication circuit incorporating an input interface 405 (hereinafter, referred to as "input I/F"). The communications contact 401 has its positive supply terminal Vin connected to the positive +V bus line B1 via a coil 406, and its zero-volt terminal Z and ground terminal GND connected to the reference 0V bus line B2. Furthermore, two transmission terminals (not shown) of the communications contact 401 are connected to both the bus lines B1, B2. Thus, the communications contact 401 communicates communication signals comprised of voltage signals superimposed on the bus lines B1, B2. In the case of a two-wire system using the bus lines B1, B2, the circuit is branched in parallel and need to satisfy a requirement of accomplishing the minimum possible attenuation for transmitting an AC component (signal) over a great distance as well as a requirement of flowing the greatest possible amount of DC current against a load present in the circuit. The above coil 406 is provided to serve these purposes. Hence, the coil 406 acts as a high impedance to the AC component (signal) thereby to prevent the attenuation, while acting as a low impedance to the DC component (electric power) thereby to permit a great amount of DC component to flow.

The input terminal Din of the input I/F 405 is connected with the input circuit unit 402, a movable part of which is operatively depressed for switching a level of the input terminal Din of the input I/F 405. Thus, an operation mode of the communications contact 401 is changed.

As shown in FIGS. 44 and 45, for example, the input circuit unit 402 comprises an operation section 411 having a contactless switching contact configuration, a current-limiting section 412, a retaining section 413, and a constant-voltage circuit 414 with an input terminal connected to the positive +V bus line B1.

As seen in FIG. 45, the operation section 411 comprises a photointerruptor including a light emitting diode L as a light emitting device and a phototransistor T as a photo acceptance unit, and a light-shielding member B for shielding light from the light emitting diode L into the phototransistor T in conjunction with the depression of the push button as the movable part. Both a cathode of the light emitting diode L and an emitter of the phototransistor T are connected to the reference 0V bus line B2.

The current-limiting section 412 responds to the movement of the light-shielding member B by controlling carrying current into the light emitting diode L to a set value for a previously determined period of time from the time when the light from the light emitting diode L enters the phototransistor T.

Specifically, the current-limiting section 412 comprises a mono-multi vibrator including a PNP transistor Q1, an emitter of which is connected to an output terminal of the constant-voltage circuit 414 via a resistance R1 and a collector of which is connected to an anode of the light emitting diode L of the operation section 411; a resistance R2, one end of which is connected to the output terminal of the constant-voltage circuit 414 and the other end of which is connected to a base of the transistor Q1; and a capacitor C, one end of which is connected to the base of the transistor Q1 and the other end of which is connected to the output terminal of the constant-voltage circuit 414 via a resistance R3.

The other end of the capacitor C is also connected to the collector of the phototransistor T so that the transistor Q1 is positive-feedback connected to the collector of the phototransistor T via the capacitor C. In FIG. 44, R4 represents a resistance connected between the collector and the emitter of the transistor Q1.

The retaining section 413 responds to the movement of the light-shielding member B of the operation section 411 by retaining the level of an input signal to the input I/F 405 of the communications contact 401 during a period between when the light from the light emitting diode L enters the phototransistor T and when the light from the light emitting diode L is blocked.

As shown in FIG. 44, the retaining section 413 comprises a D-flip-flop Df (hereinafter, referred to as "D-FF"), a NAND gate Ng, and resistances R5, R6. The NAND gate Ng has two input terminals thereof connected to the collector of the transistor Q1 and to the other end of the capacitor C, and has an output terminal thereof connected to a set terminal S of the D-FF Df. The D-FF Df has a D-input terminal thereof connected to the constant-voltage circuit 414, a clock terminal CK thereof connected to the other end of the capacitor C via the resistance R5, and a reset terminal R thereof directly connected to the other end of the capacitor C. A Q(bar)-output terminal of the D-FF Df is connected to the input terminal Din of the input I/F 405 of the communications contact 401. The resistance R6 is connected between the clock terminal CK of the D-FF Df and the bus line B2.

Figure 46:
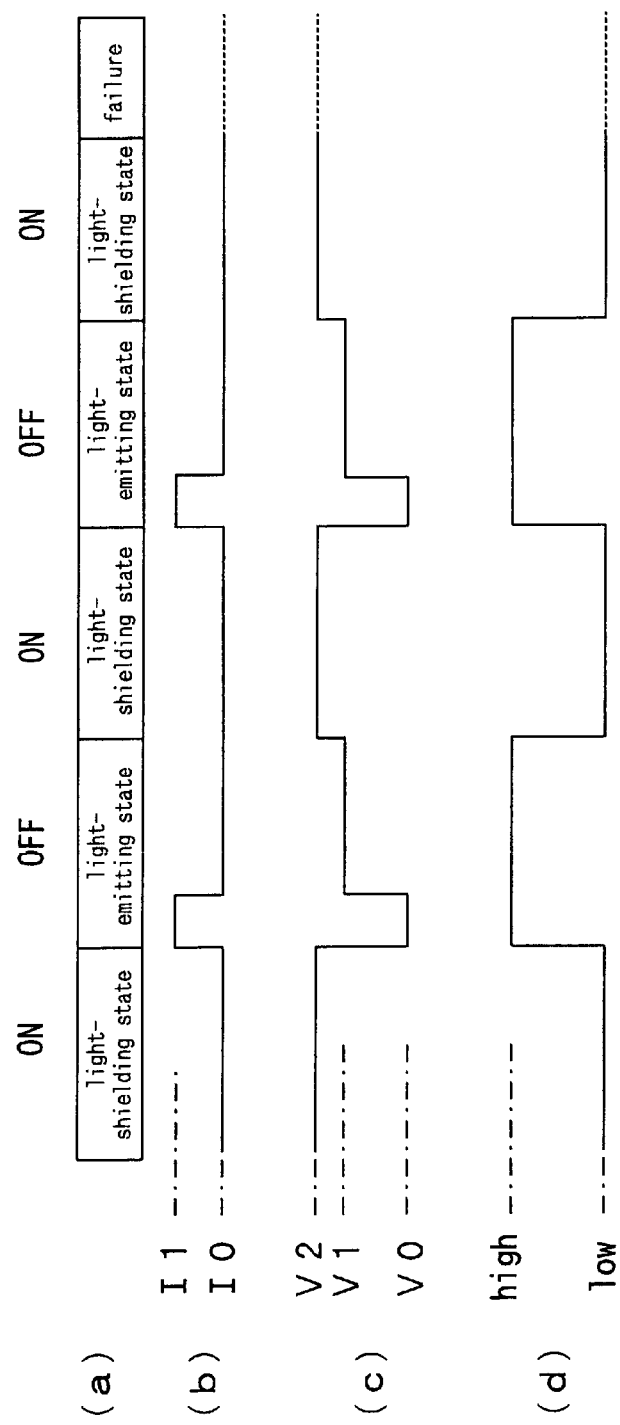
FIG. 46 is a timing chart for explaining an operation of the communications apparatus of the twentieth embodiment.

Next, an operation of the above input circuit unit 402 is described with reference to a timing chart of FIG. 46.

As shown in FIG. 46(a), the light-shielding member of the operation section 411 moves at each depression of the push button of the operation section 411, so that the photointerruptor is controllably switched between a light-shielding state (ON) and a light-emitting state (OFF).

When the photointerruptor is in the light-shielding state (ON) as indicated by FIG. 46(a), the phototransistor T is OFF having an output voltage (from the collector) at V2 (high level), as shown in FIG. 46(c). At this time, the transistor Q1 in positive-feedback connection with the collector of the phototransistor T is OFF while the current through the light emitting diode L is at I0, as indicated by FIG. 46(b). As seen in FIG. 46(d), the Q(bar)-output terminal of the D-FF Df of the retaining section 413 is at a low level.

When the push button in this state is depressed to be returned to its initial state thereby switching the photointerruptor to the light-emitting state (OFF) as indicated by FIG. 46(a), the light-shielding member B moves to allow the light from the light emitting diode L to enter the phototransistor T. Thus, the phototransistor T is turned ON thereby to switch ON the transistor Q1, so that the output voltage from the phototransistor T is at V0 (low level) as indicated by FIG. 46(c).

On the other hand, a base potential of the transistor Q1 rises at a time constant (equivalent to a predetermined time period) given by the resistance R2 and the capacitor C to reverse the transistor Q1 to OFF. Thus, the current of the set value I1 (>I0) flows through the light emitting diode L as indicated by FIG. 46(b) while the transistor Q1 is ON, and the current through the light emitting diode L is lowered again to I0 in conjunction with the transistor Q1 switched to OFF, as indicated by FIG. 46(b). At this time, the time-constant circuit formed by the resistance R1 and the capacitor C raises the output voltage from the phototransistor T to V1 (V2>V1>V0) as indicated by FIG. 46(c).

In conjunction with the output voltage of the phototransistor T to V0 (low level), a reset signal is inputted to the reset terminal R of the D-FF Df for resetting the D-FF Df, so that the Q(bar)-output terminal of the D-FF Df is reversed to high level as indicated by FIG. 46(d). The high level of the Q(bar)-output terminal is retained until the depression of the push button of the operation section 411 causes the light-shielding member B to move to switch the photointerruptor to the light-shielding state (ON) thereby raising the output voltage of the phototransistor T to V2 (high level).

In the event of a disconnection failure in the light emitting diode L of the operation section 411, the output voltage of the phototransistor T rises to V2 (high level) while the voltage of the collector of the transistor Q1 is pulled up by the resistances R1 and R4. Accordingly, the output from the NAND gate Ng is reversed to low level so that a set signal is inputted to the set terminal S of the D-FF Df of the retaining section 413 for retaining the Q(bar)-output terminal at low level as indicated by a broken line of FIG. 46(*d*).

Thus, responding to the depression of the push button of the operation section 411, the current-limiting section 412 controls the carrying current into the light emitting diode L to the set value of I1 for the predetermined period of time as the time constant given by the resistance R2 and the capacitor C, the time period starting from the time when the light from the light emitting diode L of the operation section 411 enters the phototransistor T. Therefore, the carrying current is decreased to I0 smaller than the set value after the lapse of the predetermined period of time.

On the other hand, the retaining section 413 retains the input signal to the input I/F 405 of the communications contact 401 at high level for a period of time between the time when the light from the light emitting diode L of the operation section 411 enters the phototransistor T and the time when the light-shielding member B blocks the light from the light emitting diode L. In the event of a disconnection failure in the light emitting diode L of the operation section 411, the Q(bar)-output terminal of the D-FF Df of the retaining section 413 is automatically switched to low level and hence, the input to the input I/F 405 of the communications contact 401 becomes low. Therefore, a failure of the photointerruptor can be recognized.

According to the twentieth embodiment, the operation section 411 in the input circuit unit 402 of the communications apparatus 400 can be driven like a pulse only when it is required. Therefore, the current value of the light emitting diode L of the operation section 411 can be lowered as compared with the conventional contact-making configuration. This results in an extended service life of the operation section 411 as well as in the reduction of power consumption.

Since the heat generation from the operation section 411 can be decreased by lowering the current value of the light emitting diode L thereof, a group of contact cases individually incorporating therein the communications contact 401 and a circuit portion of the input circuit unit 402 may be collectively mounted to constitute the communications apparatus 400 without encountering a fear of overheat.

In addition, the reliability of the apparatus can be improved because the failure of the operation-section 411 can be detected based on the variations of the level of the Q(bar)-output terminal of the D-FF Df of the retaining section 413 and the level of the output voltage from the phototransistor T.

(Twenty-First Embodiment)

Figure 47:
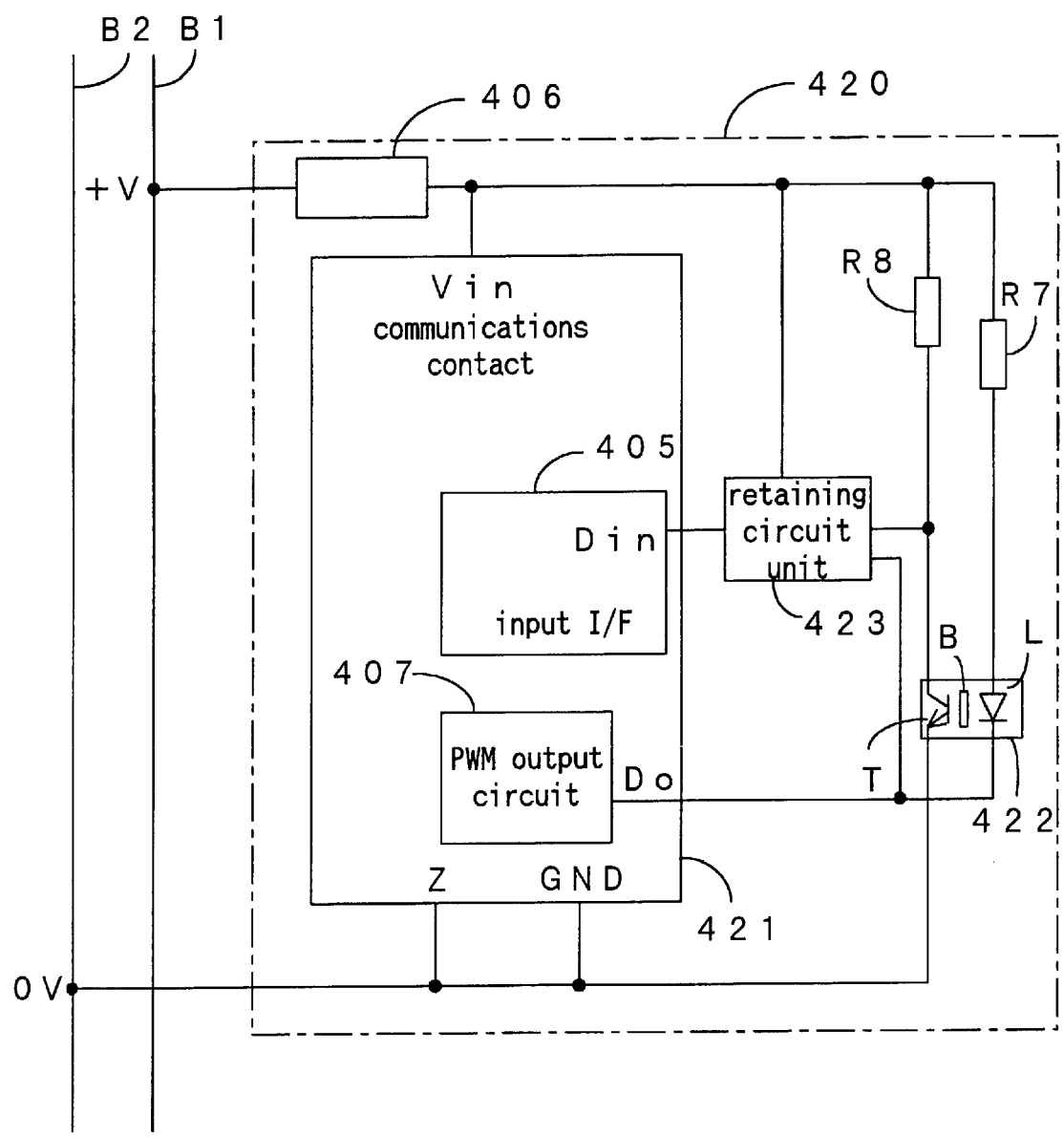
FIG. 47 is a connection block diagram of a communications apparatus according to a twenty-first embodiment hereof.
Figure 48:
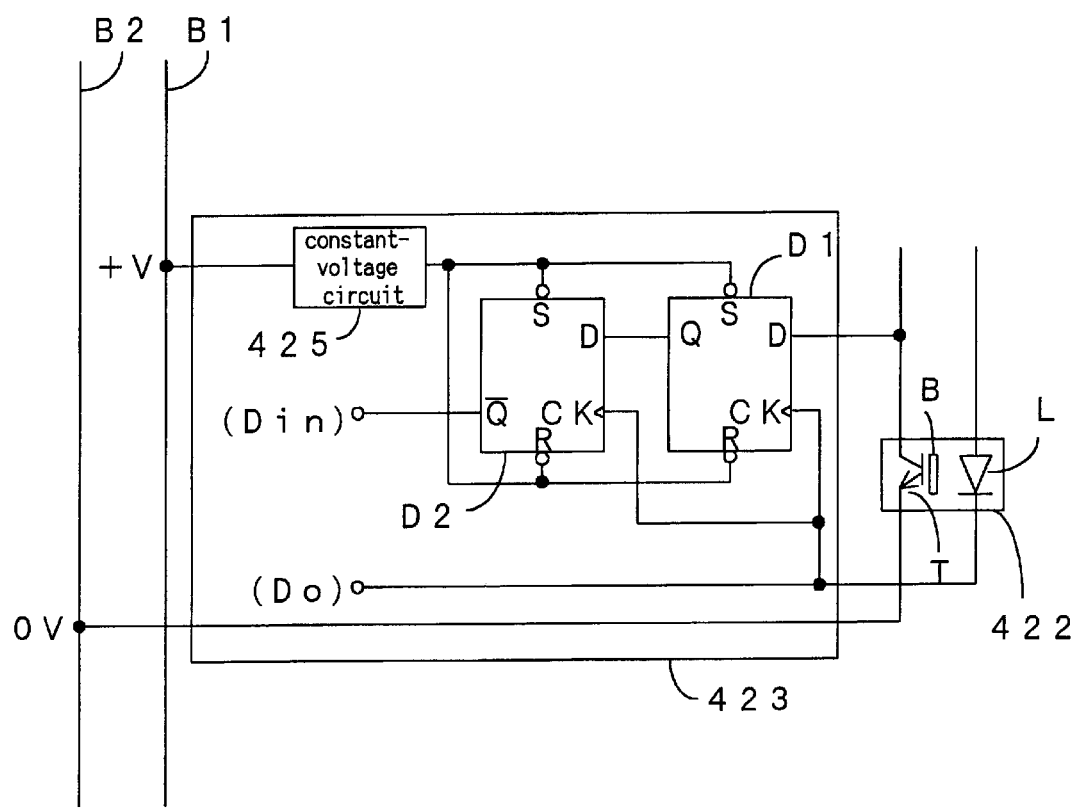
FIG. 48 is a connection diagram of a part of the communications apparatus of the twenty-first embodiment.

A twenty-first embodiment of the present invention will be described with reference to FIGS. 47 to 49. FIG. 47 is a connection block diagram of this embodiment; FIG. 48 a fragmentary connection diagram thereof; and FIG. 49*a* timing chart for explaining an operation thereof. The following description is made with reference to FIG. 45, as well.

As shown in FIG. 47, a communications apparatus 420 of this embodiment is configured to integrate, besides the aforesaid input I/F 405, a communications contact 421 incorporating a pulse-width modulation (PWM) output circuit 407 used for control, an operation section 422 including the photointerruptor and the light-shielding member B similarly to the operation section 411 of FIG. 45, and a retaining circuit 423.

Likewise to the aforementioned twentieth embodiment, the operation section 422 comprises the push button and the push-button body in detachably connected relation, whereas a contact case incorporating the communications contact 421, the retaining circuit unit 423, other circuit components or the like is detachably mounted to the bush-button body. In this manner, the communications contact 421, the operation section 422 and the retaining circuit unit 423 may be integrated.

In FIG. 47, R7 represents a resistance connected between the positive +V bus line B1 and the anode of the light emitting diode L; and R8 represents a resistance connected between the positive +V bus line B1 and the collector of the phototransistor T in the operation section 422. The aforesaid coil 406 is interposed between the positive +V bus line B1 and the positive supply terminal Vin of the communications contact 421, the resistance R7 and the resistance R8.

Similarly to that shown in FIG. 43, the communications contact 421 comprises the integrated communication circuit and has a positive supply terminal Vin thereof connected to the positive +V bus line B1 while having a zero-volt terminal Z and a ground terminal GND thereof connected to the reference 0V bus line B2. On the other hand, two transmission terminals (not shown) of the communications contact 421 are connected to these bus lines B1, B2. Thus, the communications contact 421 communicates communication signals comprised of voltage signals superimposed on the bus lines B1, B2.

The retaining circuit unit 423 comprises, as shown in FIG. 48 for example, a first and a second D-FFs D1, D2 and a constant-voltage circuit 423, an input terminal of which is connected to the positive +V bus line B1. A D-input terminal of the first D-FF D1 is connected to the collector of the phototransistor T. A respective clock terminal CK of both the D-FFs D1, D2 is connected to an output terminal Do of the PWM output circuit 407 in the communications contact 421 whereas a respective set terminals and reset terminal R of both the D-FFs D1, D2 are connected to an output terminal of the constant-voltage circuit 425. A Q(bar)-output terminal of the second D-FF D2 is connected to the input terminal Din of the input I/F 405 in the communications contact 421. The cathode of the light emitting diode L is connected to the output terminal Do of the PWM output circuit 407 whereas the emitter of the phototransistor T is connected to the bus line B2.

Operations of the operation section 422 and the retaining circuit unit 423 are described with reference to a timing chart of FIG. 49.

Figure 49:
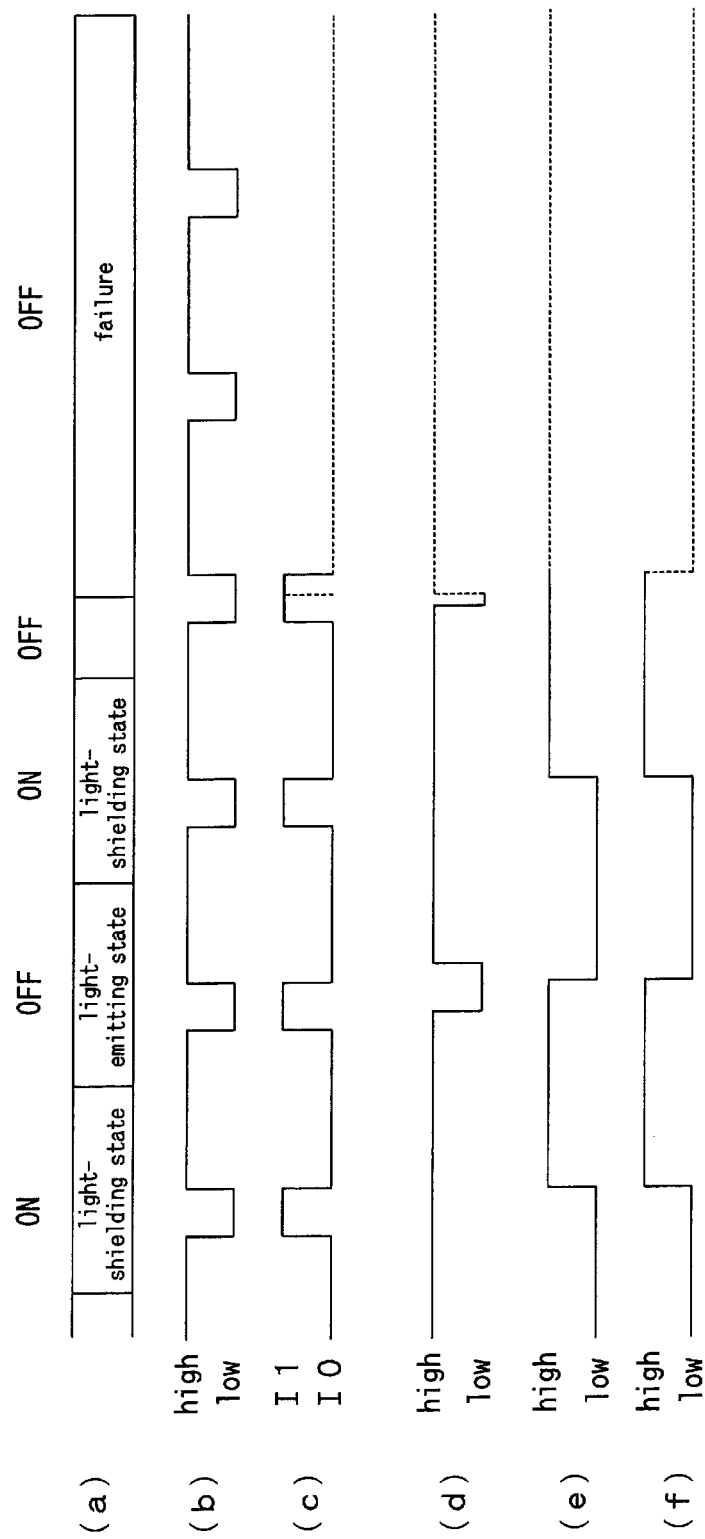
FIG. 49 is a timing chart for explaining an operation of the communications apparatus of the twenty-first embodiment.

As indicated by FIG. 49(*b*), the PWM output circuit 407 of the communications contact 421 outputs a low PWM pulse signal based on a given period whereas, as indicated by FIG. 49(*c*), a current of I1 flows through the light emitting diode L of the operation section 422 in synchronism with the low PWM pulse signal. When the PWM pulse signal is at high level, the current through the light emitting diode L is at I0 (<I1).

When the photointerruptor is in the light-shielding state (ON), the push button is depressed to be returned to its initial state. In response to the photointerruptor switched to the light-emitting state (OFF) as indicated by FIG. 49(*a*), the light-shielding member B moves to allow the light from the light emitting diode L to enter the phototransistor T so that the phototransistor T is turned ON with a little time delay after the light ingress. Thus, the output voltage (from the collector) of the phototransistor T becomes low as indicated by FIG. 49(*d*).

The current flow through the light emitting diode L of the operation section 422 effects a signal to input to the clock terminals CK of both the D-FFs D1, D2 so that the Q-output terminal of the first D-FF D1 and the Q(bar)-output terminal of the second D-FF D2 are each reversed to high level as indicated by FIGS. 49(e) and (f). The high levels are retained until a low level signal is inputted to the D-input terminals of both the D-FFs D1, D2 in response to the phototransistor T switched ON.

When the low level signal is inputted to the D-input terminals of the D-FFs D1, D2, the Q output terminal of the first D-FF D1 and the Q(bar)-output terminal of the second D-FF D2 are both reversed to low level. Particularly in response to the photointerruptor switched to the light-emitting state (OFF), the Q(bar)-output terminal of the second D-FF D2 outputs a low signal to the input terminal Din of the input I/F 405 in the communications contact 421.

In the event of a disconnection failure in the light emitting diode L of the operation section 422, the current through the light emitting diode L stays at 10 as indicated by a broken line of FIG. 49(c). This retains the output voltage (from the collector) of the phototransistor T at high level as indicated by a broken line of FIG. 49(d). Further, as indicated by a broken line of FIG. 49(e), the Q-output terminal of the first D-FF D1 stays at high level whereas the Q(bar)-output terminal of the second D-FF D2 stays at low level as indicated by a broken line of FIG. 49(f).

Accordingly, the twenty-first embodiment offers an equivalent effect to that of the aforesaid twentieth embodiment.

(Twenty-Second Embodiment)

Figure 50:
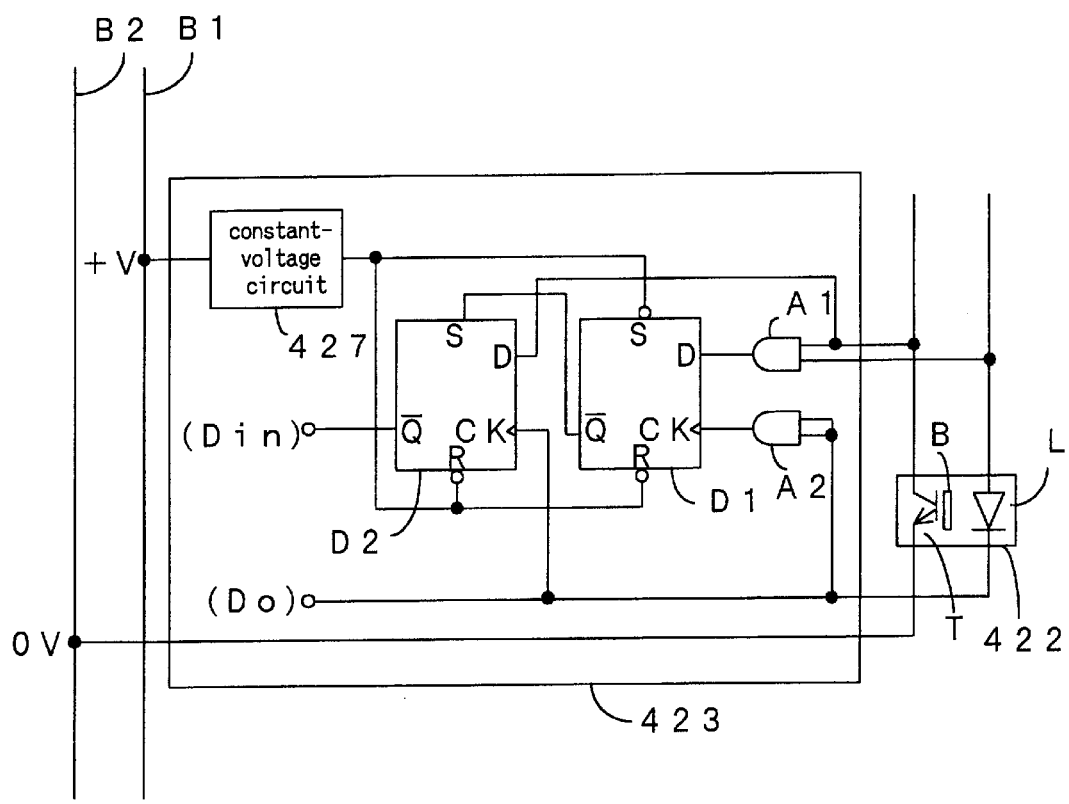
FIG. 50 is a connection diagram of a part of a communications apparatus according to a twenty-second embodiment hereof.
Figure 51:
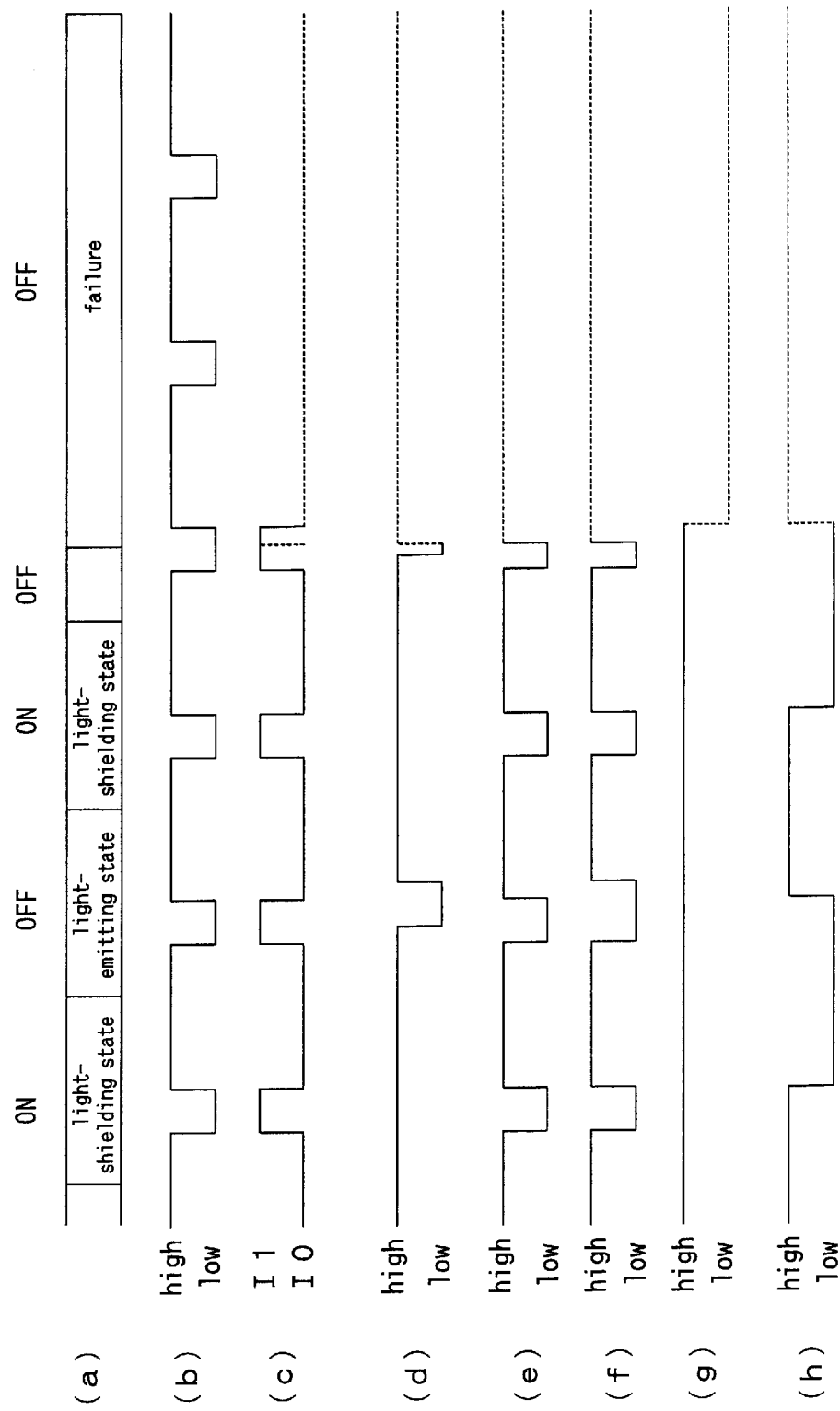
FIG. 51 is a timing chart for explaining an operation of the communications apparatus of the twenty-second embodiment.

A twenty-second embodiment of the present invention will be described with reference to FIGS. 50 and 51. FIG. 50 is a fragmentary connection diagram of this embodiment whereas FIG. 51 is a timing chart for explaining an operation thereof. The following description is made with reference to FIG. 45 as well.

A general arrangement of a communications apparatus of this embodiment is essentially the same as that of the aforesaid twenty-first embodiment (see FIG. 47), except that a retaining circuit unit of this embodiment has a different configuration from the retaining circuit unit 423 of FIG. 47 as follows.

As shown in FIG. 50, the retaining circuit unit 423 of a switch assembly of this embodiment comprises the first and the second D-FFs D1, D2; a first and a second AND gates A1, A2; and a constant-voltage circuit 427, an input terminal of which is connected to the positive +V bus line B1. Two input terminals of the first AND gate A1 are connected to the collector of the phototransistor T and to the anode of the light emitting diode L, respectively. Two input terminals of the second AND gate A2 are both connected to the output terminal Do of the PWM output circuit 407 in the communications contact 421. An output terminal of the first AND gate A1 is connected to the D-input terminal of the first D-FF D1 whereas an output terminal of the second AND gate A2 is connected to the clock terminal CK of the first D-FF D1. The clock terminal CK of the second D-FF D2 is connected to the output terminal Do of the PWM output circuit 407 in the communications contact 421.

The set terminal S and reset terminal R of the first D-FF D1 and the reset terminal R of the second D-FF D2 are connected to the output terminal of the constant-voltage circuit 427. The second D-FF D2 has the set terminal S connected to the Q(bar)-output terminal of the first D-FF D1, and the Q(bar)-output terminal thereof connected to the input terminal Din of the input I/F 405 in the communications contact 421. The cathode of the light emitting diode L is connected to the output terminal Do of the PWM output circuit 407 whereas the emitter of the phototransistor T is connected to the bus line B2.

Next, operations of the operation section 422 and the retaining circuit unit 423 of the twenty-second embodiment are described with reference to the timing chart of FIG. 51.

As indicated by FIG. 51(b), the PWM output circuit 407 (see FIG. 47) of the communications contact 421 outputs a low PWM pulse signal based on a given period. In synchronism with the low PWM pulse signal, the current of I1 flows through the light emitting diode L of the operation section 422, as indicated by FIG. 51(c). When the PWM pulse signal is at high level, the current of I0 (<I1) flows through the light emitting diode L.

When the photointerruptor is in the light-shielding state (ON), the push button is depressed to be returned to its initial state. When the photointerruptor is switched to the light-emitting state (OFF) as indicated by FIG. 51(a), the light-shielding member B moves to allow the light from the light emitting diode L to enter the phototransistor T so that the phototransistor T is switched ON with a little time delay from the light ingress. Thus, as indicated by FIG. 51(d), the level of the output voltage (from the collector) of the phototransistor T becomes low.

The current flow through the light emitting diode L of the operation section 422 changes the voltage at the anode of the light emitting diode L to low level, as indicated by FIG. 51(e). In response to the output voltage from the phototransistor T and the voltage present on the anode of the light emitting diode L which are changed to low level, the output voltage from the first AND gate A1 is changed to low level, as indicated by FIG. 51(f).

At this time, the current of I1 flows through the light emitting diode L so as to input a signal to the clock terminals CK of both the D-FFs D1, D2. Thus, the Q(bar)-output terminal of the first D-FF D1 stays at high level as indicated by FIG. 51(g) whereas the Q(bar)-output terminal of the second D-FF D2 is reversed to high level as indicated by FIG. 51(h).

Subsequently when the light-shielding member B blocks the light from the light emitting diode L in conjunction with the depression of the operation section 422, the photointerruptor is switched to the light-shielding state (ON) so as to change the output from the first AND gate A1 to high level, as indicated by FIG. 51(f). Thus, the Q(bar)-output terminal of the second D-FF D2 is reversed to low level, as indicated by FIG. 51(h).

In the event of a disconnection failure in the light emitting diode L of the operation section 422, the current through the light emitting diode L stays at 10 as indicated by a broken line of FIG. 51(c). This maintains at high level both the output voltage (from the collector) from the phototransistor T and the voltage at the anode of the light emitting diode L, as indicated by broken lines of FIGS. 51(d) and (e). The output voltage from the first AND gate A1 also stays at high level as indicated by FIG. 51(f). Thus, the Q(bar)-output terminal of the first D-FF D1 stays at low level as indicated by a broken line of FIG. 51(g) whereas the Q(bar)-output terminal of the second D-FF D2 stays at high level as indicated by a broken line of FIG. 51(h).

Accordingly, the twenty-second embodiment offers an equivalent effect to that of the aforesaid twenty-first embodiment.

(Twenty-Third Embodiment)

A twenty-third embodiment of the present invention will be described with reference to a connection block diagram of FIG. 52.

Figure 52:
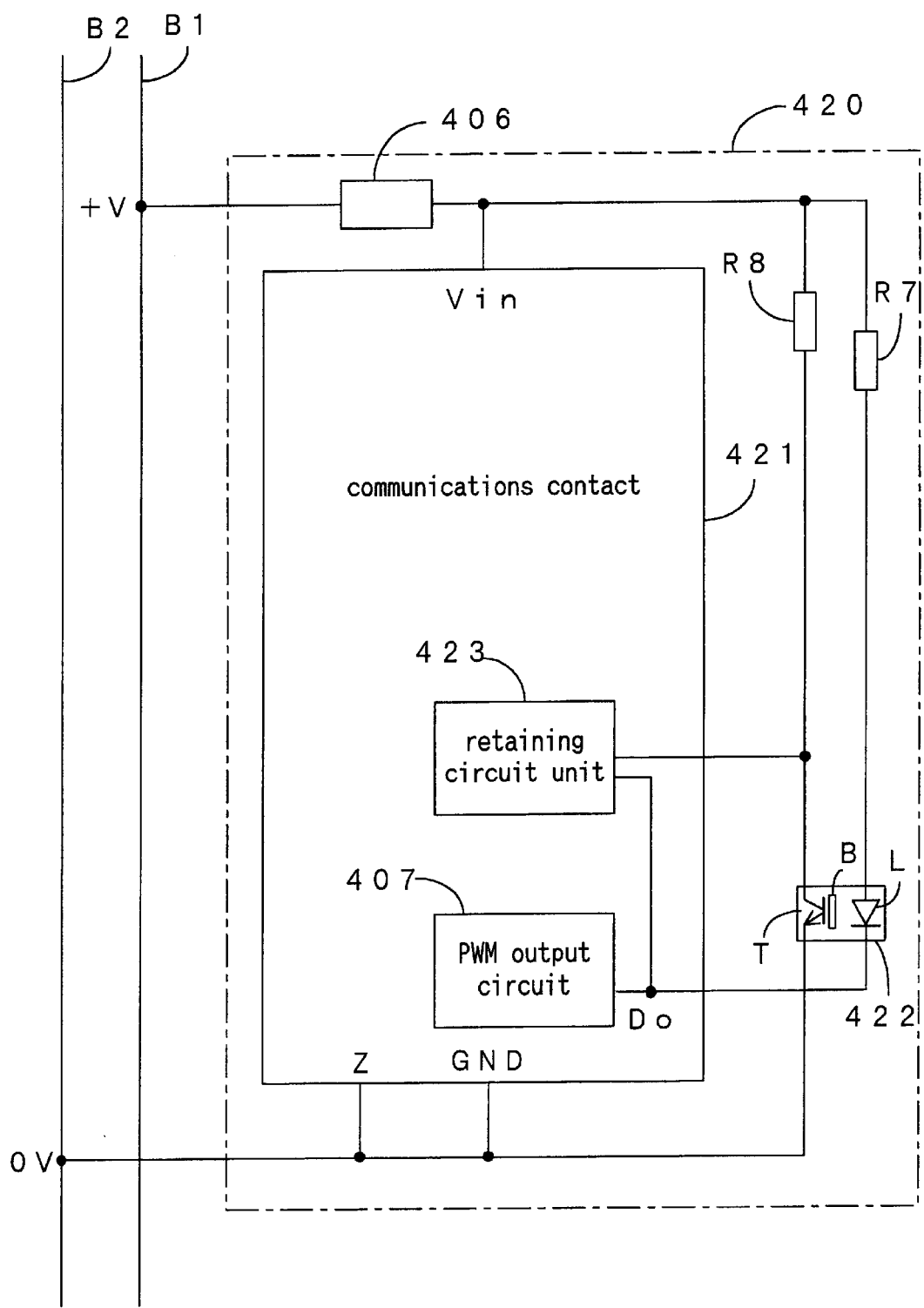
FIG. 52 is a connection block diagram of a communications apparatus according to a twenty-third embodiment hereof.

As shown in FIG. 52, the communications apparatus 420 of this embodiment differs from that of the twenty-first embodiment in that the retaining circuit unit 423 of FIG. 47 is incorporated in the integrated communication circuit constituting the communications contact 421. In this case, the incorporated retaining circuit unit 423 includes the input I/F 405. The aforesaid coil 406 is interposed between the positive +V bus line B1 and the positive supply terminal Vin of the communications contact 421, the resistance R7 and the resistance R8.

Accordingly, the twenty-third embodiment offers an equivalent effect to that of the twenty-first embodiment while accomplishing a more simplified configuration by incorporating the retaining circuit unit 423 into the communications contact 421.

(Twenty-Fourth Embodiment)

Figure 53:
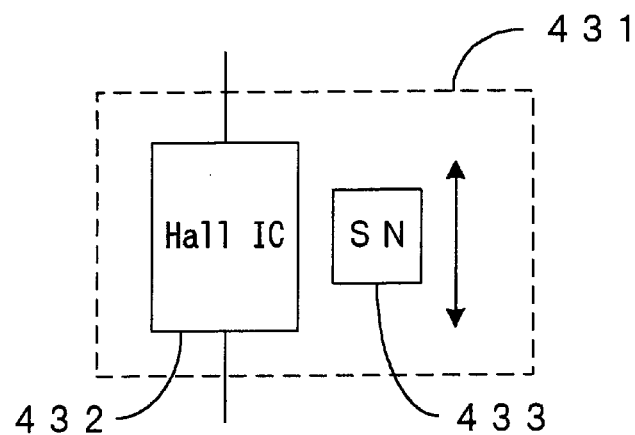
FIG. 53 is a schematic diagram of a configuration of a part of a communications apparatus according to a twenty-fourth embodiment hereof.

A twenty-fourth embodiment of the present invention will be described with reference to FIGS. 53 and 54. FIG. 53 is a schematic diagram showing a part of a configuration of this embodiment, and FIG. 54 is a fragmentary connection block diagram of FIG. 53.

As seen in FIG. 53, an operation section 431 of this embodiment comprises a Hall IC 432 comprising a Hall element, and a magnet 433 having the number of lines of magnetic flux varied in conjunction with the depression of the push button, the lines of magnetic flux intersecting the Hall element. It is noted that the other parts of the communications apparatus may be arranged the same way as in any of the twentieth to twenty-third embodiments.

Figure 54:
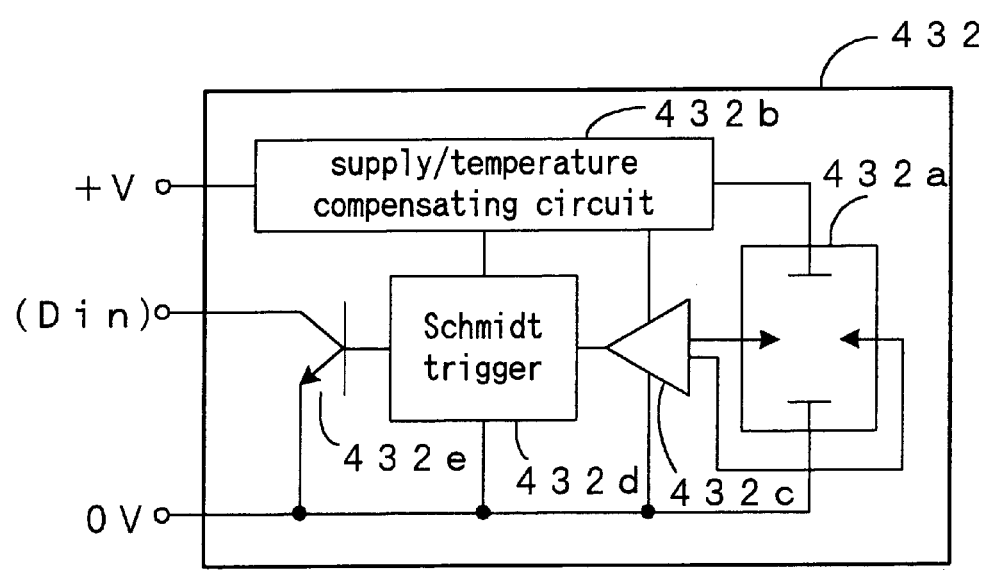
FIG. 54 is a connection block diagram of a part of the communications apparatus of the twenty-fourth embodiment.

As shown in FIG. 54, the Hall IC 432 comprises a Hall element 432a, a supply/temperature compensating circuit 432b, an amplifier 432c for amplifying an output voltage from the Hall element 432a, a Schmidt trigger circuit 432d supplied with an output signal from the amplifier 432c, and an outputting NPN transistor 432e, a collector of which is connected to the input terminal Din of the input I/F 405 (see, for example, FIG. 43).

Similarly to the twentieth embodiment, the twenty-fourth embodiment accomplishes the extended service life and decreased power consumption of the operation section 431 as compared with the conventional contact-making configuration.

(Twenty-Fifth Embodiment)

A twenty-fifth embodiment of the present invention will be described with reference to FIG. 55, which is a a fragmentary schematic diagram showing a configuration thereof.

Figure 55:
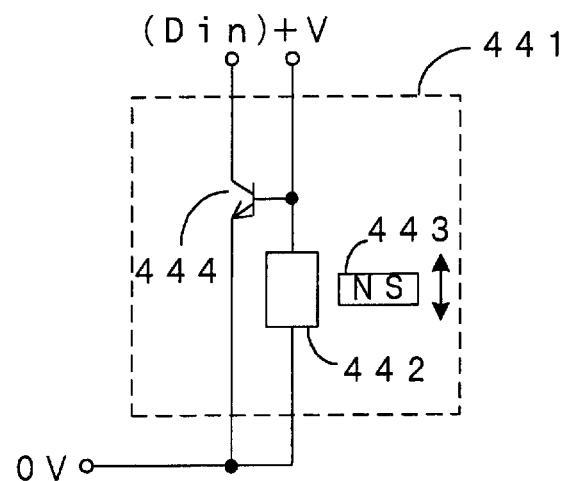
FIG. 55 is a schematic diagram of a configuration of a part of a communications apparatus according to a twenty-fifth embodiment hereof.

As shown in FIG. 55, an operation section 441 of this embodiment comprises a magnetic resistance element 442, a magnet 443 with the number of lines of magnetic flux varied in conjunction with the depression of the push button, the lines of magnetic flux intersecting the magnetic resistance element 442, and an outputting NPN transistor 444, a collector of which is connected to the input terminal Din of the input I/F 405 (see, for example, FIG. 43). It is noted that the other parts of the switch means may be arranged the same way as in any of the twentieth to twenty-third embodiments.

Similarly to the twentieth embodiment, the twenty-fifth embodiment accomplishes the extended service life and decreased power consumption of the operation section 441 as compared with the conventional contact-making configuration.

(Twenty-Sixth Embodiment)

Figure 56:
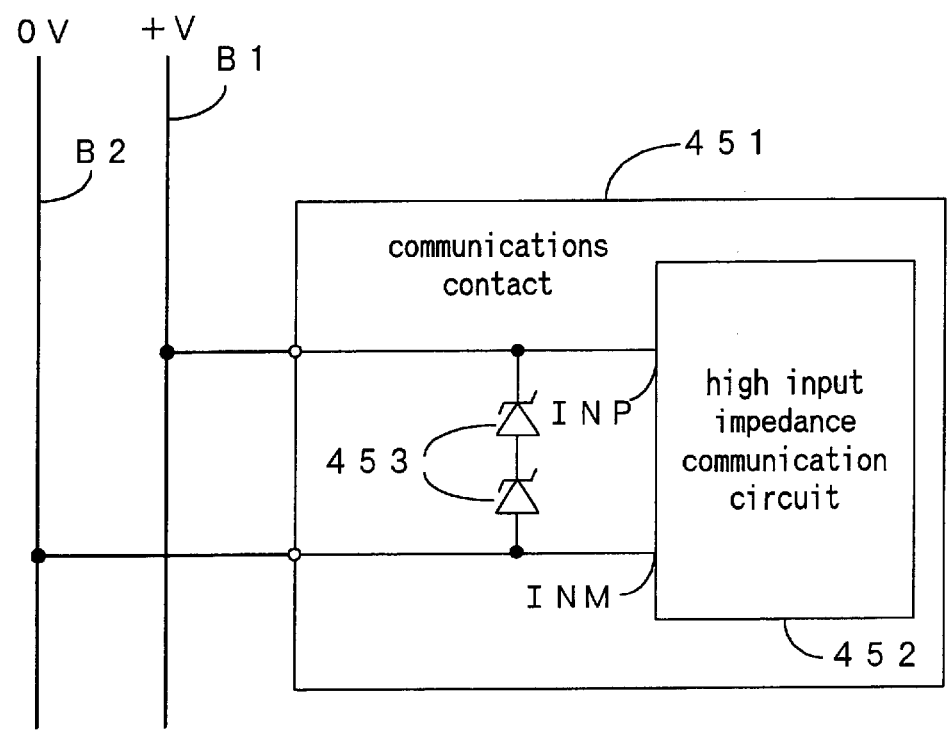
FIG. 56 is a connection diagram of a communications apparatus according to a twenty-sixth embodiment hereof.
Figure 57:
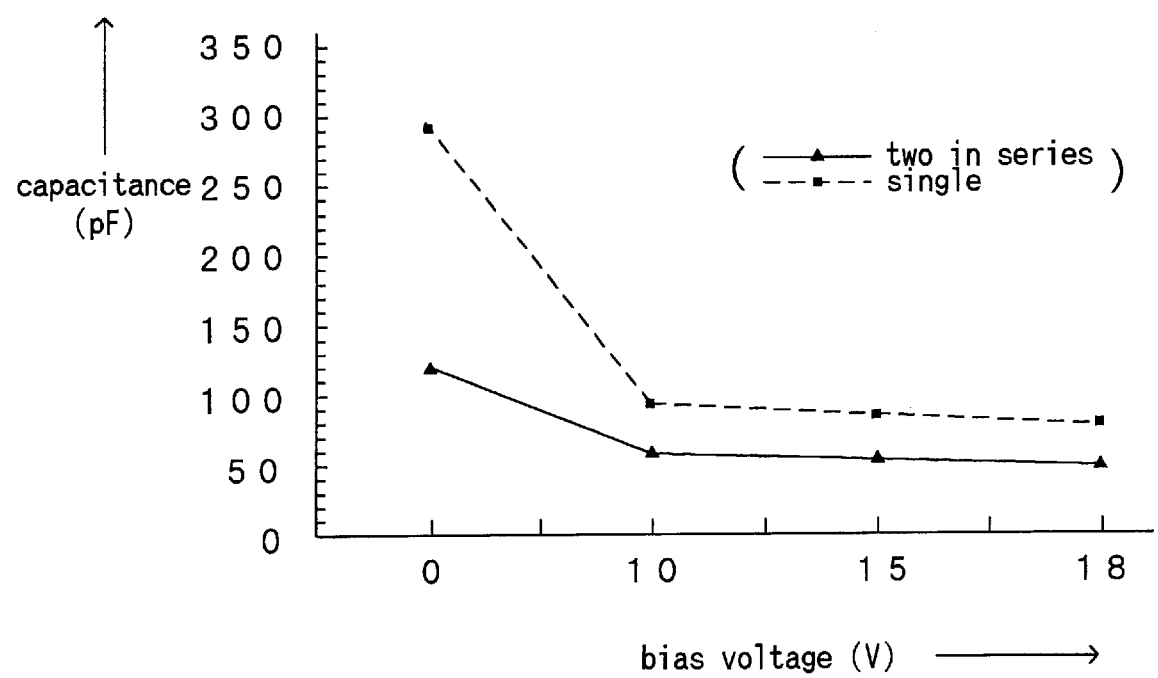
FIG. 57 is an explanatory graph of an operation of the communications apparatus of the twenty-sixth embodiment.

A twenty-sixth embodiment of the present invention will be described with reference to FIGS. 56 and 57. FIG. 56 is a connection diagram and FIG. 57 is a graph representing a relationship between a bias voltage and a capacitance for explaining an operation.

This embodiment employs two Zener diodes 453, 453, as a surge protection circuit adapted to absorb surge noises, which are connected in series between transmission terminals INP, INM of a high input impedance communication circuit 452 incorporated in a communications contact 451 constituting the communications apparatus connected to the positive +V bus line B1 and the reference 0V bus line B2. The communications contact 451 comprises an integrated communication circuit.

Here, the relationship between the inter-terminal capacitance Cz and the bias voltage V of the Zener diode fabricated by the diffusion or epitaxial method is expressed as:

$$Cz \approx ks(a\epsilon/V)^{1/3} \quad (1)$$

where 'a' denotes a impurities concentration gradient of a PN junction; '$\epsilon$' denotes a dielectric constant of silicone in a depletion layer of the PN junction; 's' denotes a junction area of the PN junction; and 'k' denotes a proportionality factor.

A Zener voltage equal to that given by a singly used Zener diode (e.g., 40V) can be obtained by connecting two Zener diodes having ½ of the above voltage (e.g., 20V) in series. Thus, each Zener diode may have a Zener voltage decreased to ½ and hence, the impurities concentration gradient 'a' in the above expression (1) is double increased while the bias voltage is decreased to ½.

Provided that each of the two Zener diodes has a PN junction area equal to that of the Zener diode singly used, the total capacitance Czs of the two Zener diodes connected in series is expressed by the following expression derived from the expression (1):

$$Czs = (½)ks\{(2a)\epsilon/(V/2)\}^{1/3} = (½)ks(4a\epsilon/V)^{1/3} \quad (2)$$

Calculating Czs/Cz using the above expressions (1), (2) gives $$Czs/Cz = 0.7937 \quad (3)$$

As apparent from the above expression (3), the inter-terminal capacitance of the two Zener diodes connected in series can be decreased from the case of the Zener diode singly used. As to the rated power, if a each of the Zener diodes has the same rated power as the Zener diode singly used (e.g., 1W Zener diode of 40V), the total rated power of the two Zener diodes connected in series is double increased (two 1W Zener diodes of 20V: 1W+1W=2W) and therefore, a required surge resistance can be attained.

The same rated power as that of the singly used Zener diode (e.g., 1W) can be obtained by connecting two Zener diodes in series, each of which has a rated power ½ the rated power of the former Zener diode. Therefore, the overall capacitance may be further decreased by employing two ½W Zener diodes, as understood from the above expressions (1) to (3).

Measurement was taken on a Zener diode singly used and two Zener diodes connected in series, each diode having the same characteristics, thereby determining a respective relationship between the bias voltage and the capacitance. The results are shown in FIG. 57, in which a solid line represents the two Zener diodes connected in series and a broken line represents the Zener diode singly used. The smaller the bias voltage, the greater the effect.

According to the twenty-sixth embodiment, the capacitance of the PN junction of the two Zener diodes 453 connected in series is smaller than that of the Zener diode singly used so that the communications apparatus may be decreased in capacitance as maintaining an adequate surge resistance. Hence, the communications apparatus is adapted to provide fast communications of communication signals comprised of voltage signals across the bus-system network. This results in a dramatic increase in the number of communications apparatuses to be connected to the bus-system network as compared with the connection of the conventional apparatuses.

In the twenty-sixth embodiment, the number of Zener diodes 453 connected in series is not limited to 2 but three or more Zener diodes may be connected. The number of diodes connected in series may be decided based on a relation between a surge voltage to be absorbed and a capacitance of the connected diodes in series.

The surge absorbing element used for this purpose is not limited to the aforesaid Zener diode and other elements are usable.

As a matter of course, the communications contact 451 of the twenty-sixth embodiment is not limited to that shown in FIGS. 44 and 45 which comprises the operation section including the photointerruptor and the light-shielding member B.

(Twenty-Seventh Embodiment)

Figure 58:
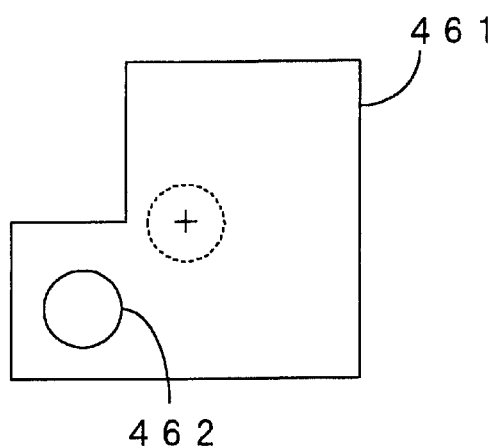
FIG. 58 is a side view of a communications apparatus according to a twenty-seventh embodiment hereof.
Figure 59:
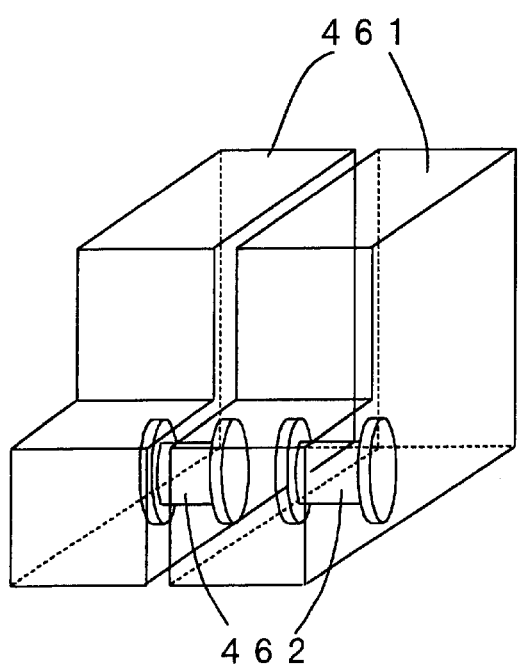
FIG. 59 is an oblique perspective view of the communications apparatus of the twenty-seventh embodiment in one use.
Figure 60:
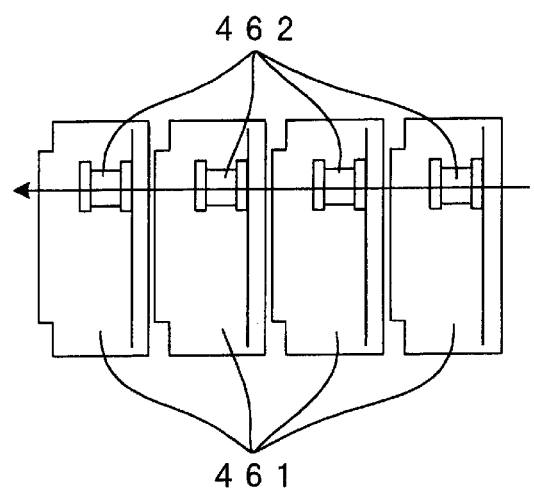
FIG. 60 is a plan view of the communications apparatus of the twenty-seventh embodiment in another use.
Figure 61:
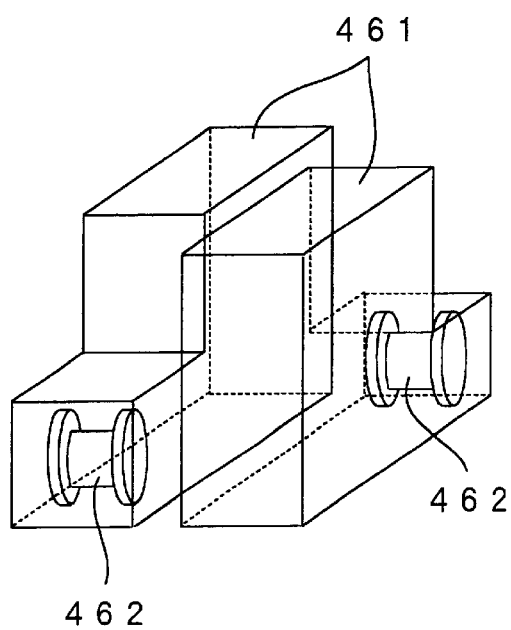
FIG. 61 is an oblique perspective view of the communications apparatus of the twenty-seventh embodiment in yet another use.

A twenty-seventh embodiment of the present invention will be described with reference to FIGS. 58 to 62. FIG. 58 is a side view of the embodiment; FIG. 59 an oblique perspective view of the embodiment in one use; FIG. 60 a plan view of the embodiment in another use; FIG. 61 an oblique perspective view of the embodiment in yet another use; and FIG. 62 a plan view of the embodiment in still another use.

This embodiment has the following arrangement, for example. The operation section is comprised of the push button and the push-button body in detachably combined relation. A contact case 461 (see FIG. 58), as a main body of the communications apparatus, contains therein the communications contact forming the switch assembly jointly with the operation section, as well as other circuit components or the like. The contact case 461 is detachably mounted to the above push-button body. In this case, as shown in FIG. 58, an open magnetic circuit type coil 462 is disposed in the contact case 461 at place shifted from a line through the center (symbol '+' in FIG. 58) thereof.

In this case, all the communications apparatuses are connected in parallel to the bus-system network and hence, all the signals inputted to the individual coils 462 of the communications apparatuses are in phase with one another. Accordingly, if all the coils 462 are uniform in polarity (each having a starting point and an end point of coil turns in alignment), the AC signal or the DC bias current through the respective coils of the communications apparatuses can generate AC magnetic fluxes or DC magnetic fluxes in the same direction and at the same timing.

Figure 62:
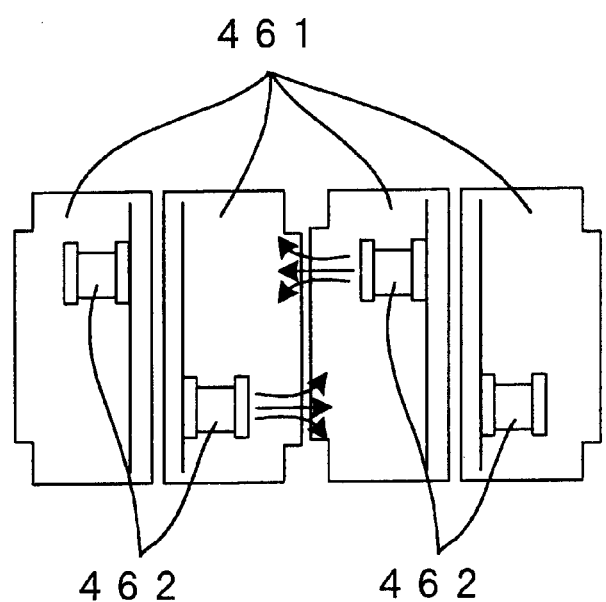
FIG. 62 is a plan view of the communications apparatus of the twenty-seventh embodiment in still another use.
Figure 63:
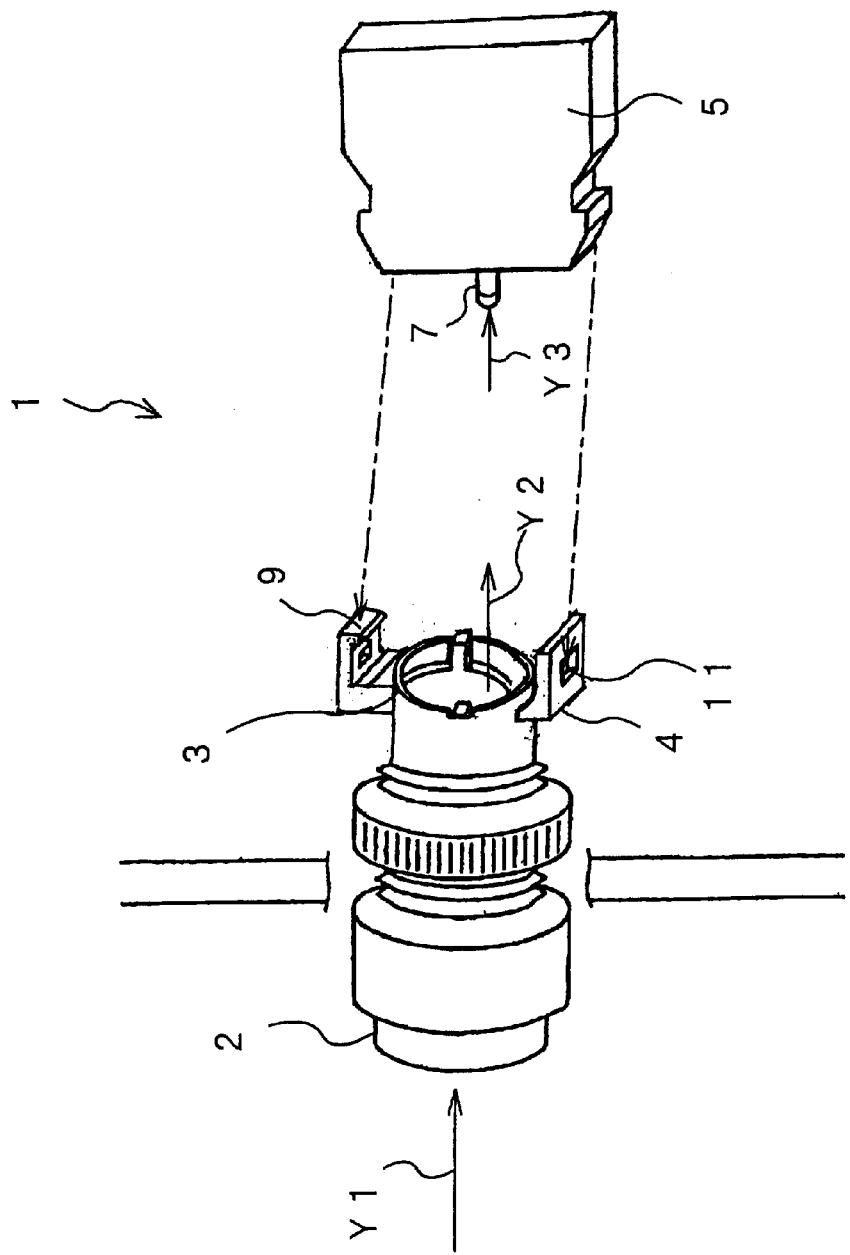
FIG. 63 is a disassembled oblique perspective view of a conventional switch assembly.
Figure 64:
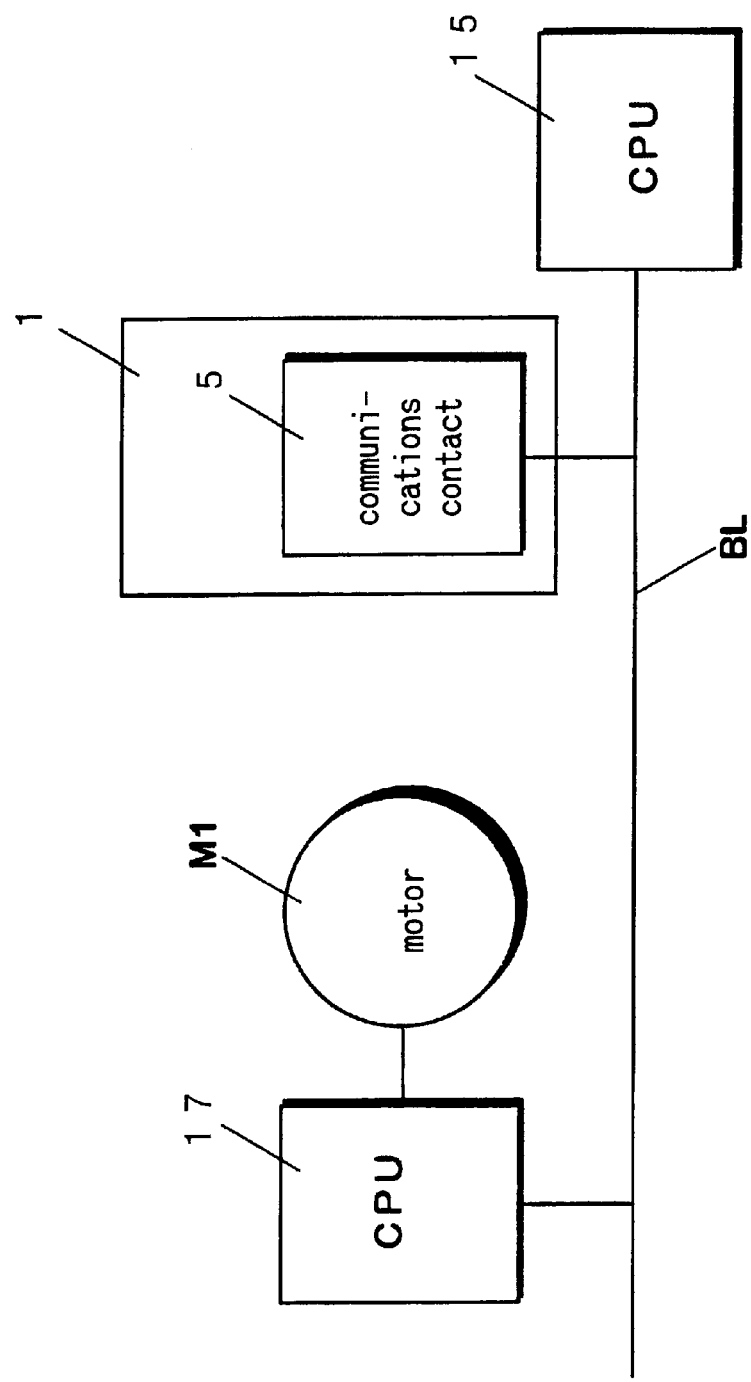
FIG. 64 is a connection block diagram of the conventional switch assembly in use.
Figure 65:
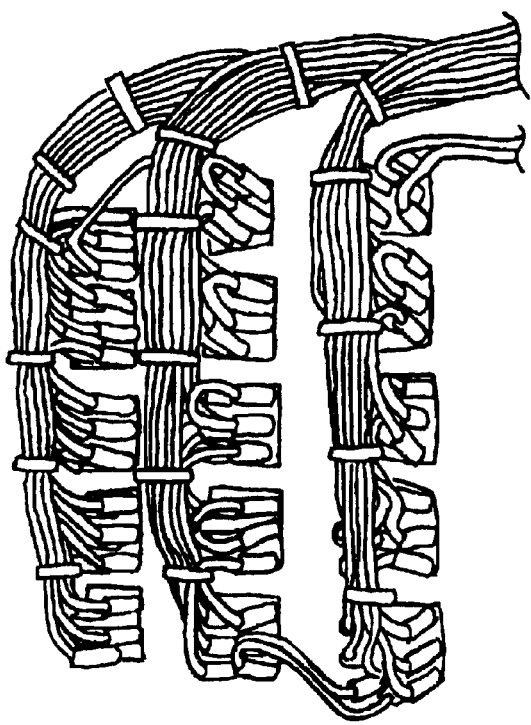
FIG. 65 is an explanatory diagram of the conventional switch assembly in use.

According to this embodiment wherein a plurality of contact cases 461 are collectively disposed, when the respective coils 462 of the contact cases 461 generate the magnetic fluxes in the same direction, the contact cases 461 are arranged in a manner to align the respective coils 462 thereof on the same line, as shown in FIGS. 59 and 60. On the other hand, when the respective coils 462 of adjoining contact cases 461 generate the magnetic fluxes in the opposite directions, the contact cases 461 are arranged in a manner to place the respective coils 462 thereof out of alignment, as shown in FIGS. 61 and 62.

It is preferred to form the contact case 461 in an asymmetrical shape such that the direction of the magnetic flux generated by the coil 462 may be determined from the shape of the contact case 461.

Such a design has the following merit. Where plural communications apparatuses constituting the bus-system network are collectively disposed in a manner to align the respective coils 462 thereof substantially on the same line (see FIGS. 59 and 60), the magnetic fluxes generated by the coils are in the same direction so that the AC or DC magnetic fluxes are in superimposition. Thus, inductance due to the AC component is increased while the DC magnetic fluxes from the DC bias current are also superimposed, resulting in an increased number of lines of DC magnetic flux.

Accordingly, when the coils 462 are disposed in adjoining relation (in a dense cluster), the number of lines of DC magnetic flux from each of the coils is increased than when a single coil is disposed. Therefore, it can be considered that an additional DC bias current α generating ($\phi2-\phi1$) magnetic flux flows through each of the coils 462 as compared with a case of an apparently single coil 462 disposed, provided that $\phi1$ denotes the number of lines of DC magnetic flux from a coil disposed alone, and $\phi2$ denotes the number of lines of DC magnetic flux from each of the coils disposed in a dense cluster.

Where the coils 462 are disposed in adjoining relation (in a dense cluster), it can be considered that more DC bias current flows through each of the coils than in a normal arrangement where a coil is singly disposed. Accordingly, it is thought that current saturation occurs earlier to reduce the inductance due to the DC component than where a coil is singly disposed. Therefore, when the coils 462 are aligned on the same line, it is necessary to select a coil of a good saturation characteristic which is less liable to be decreased in inductance by the DC component even if a DC bias current greater by a factor of (1+α) flows therethrough.

The AC signal has a much smaller value than the DC bias current and hence, AC magnetic flux in superimposition results in a minor increase. Therefore, the coil less liable to be saturated by the DC bias current has no fear of being saturated by the AC component.

On the other hand, where the coils 462 are disposed out of alignment (see FIGS. 61, 62), the magnetic fluxes (AC, DC) from the respective coils 462 are directed to cancel each other. The DC magnetic fluxes directed to cancel each other act to suppress the saturation whereas the AC magnetic fluxes directed to cancel each other act to decrease the inductance. Where the coils are disposed with the magnetic fluxes thereof directed to cancel each other, a causative factor of decreasing the inductance is only interference from the AC magnetic fluxes. However, since the respective coils 462 are disposed out of alignment, as shown in FIGS. 61, 62, the respective coils 462 are spaced from each other so that interference between the generated AC magnetic fluxes may be reduced. Thus, the inductance due to the AC component is prevented from being decreased.

Accordingly, the twenty-seventh embodiment prevents the decrease of impedance of the communications apparatus, thereby permitting the communications apparatus to communicate voltage signals in the correct waveforms, the voltage signals traveling among the plural communications apparatuses on the bus-system network. Thus, the embodiment accomplishes a significant increase in the number of communications apparatuses connectable with the bus-system network, as compared with the conventional approach.

It is noted that the twenty-seventh embodiment does not limit the configuration of the coil 462 and the shape of the contact case 461 to the above.

As a matter of course, the communications contact of the twenty-seventh embodiment is not limited to that of FIGS. 44, 45 which comprises the operation section including the photointerruptor and the light-shielding member.

INDUSTRIAL APPLICABILITY

As mentioned supra, the electrical component according to the present invention is capable of compactly combining a plurality of functioning members of different functions such as the direct functioning member, the information input/output functioning member and the like, thereby contributing to the reduction of installation space. In addition, the inventive electrical component ensures that the plural functioning members of different functions, such as the direct functioning member, the information input/output functioning member and the like, are positively driven by one or more driving units.

The emergency stop system according to the present invention is capable of transmitting an operation given by the operator to a target device even if the controller of the network is inoperative due to failure. Particularly, the inventive system is adapted to shut off the power to the target device in an urgent condition such as emergency stop. Thus, the emergency stop system features an improved safety.

In the communications apparatus according to the present invention, the operation section of the switch means has the contactless switching contact configuration. As compared with the conventional contact-making configuration, the inventive configuration extends the service life of the operation section, negates the need for high current therethrough, and decreases the power consumption.

What is claimed is:

1. An electrical component comprising:
    a combination of a plurality of functioning members of different functions which each perform a predetermined input and/or output operation;
    a single driving member directly connecting with said combination of functioning members, wherein said functioning members are each driven by said driving member, and wherein said functioning members include at least one functioning member connecting to bus lines located outside of said electrical component and receiving power from said bus lines to input and to and/or output from said bus lines with an information signal.

2. The electrical component as claimed in claim 1, wherein said functioning members include at least a direct functioning member providing an output for switching between a conductive state and a nonconductive state, and an information input/output functioning member for inputting and/or outputting an information signal.

3. The electrical component as claimed in claim 1, wherein said driving member includes an operation transmitting member receiving an operation given by an operator and transmitting the received operation, and
    wherein said functioning members are each connected to said operation transmitting member for receiving the operation transmitted from said operation transmitting member.

4. The electrical component as claimed in claim 3, wherein said functioning members include at least:
    a direct functioning member providing an output for switching between a conductive state and a nonconductive state according to the operation transmitted from said operation transmitting member, and
    an information input/output functioning member for inputting and/or outputting an information signal corresponding to the operation transmitted from said operation transmitting member.

5. The electrical component as claimed in claim 3, wherein said functioning members include at least:
    a direct functioning member providing an output for switching between a conductive state and a nonconductive state according to the operation transmitted from said operation transmitting member, and
    an information input/output functioning member for inputting and/or outputting an information signal corresponding to a received input.

6. The electrical component as claimed in claim 4 or 5, wherein said operation transmitting member includes:
    an operation receiving member for receiving the operation given by the operator, and
    an adaptor member including an operation receiving-member dedicated connection portion for connection with said operation receiving member, and a functioning-member dedicated connection portion having a standardized configuration for connecting said functioning member.

7. The electrical component as claimed in claim 4 or 5, wherein said operation transmitting member includes:
    an operation member directly receiving the operation given by the operator, and
    an operation connection member including a functioning-member dedicated connection portion having a standardized configuration for connecting said functioning member, and
    wherein said operation member and said operation connection member are combined by means of an operation-adaptor member.

8. The electrical component as claimed in claim 1, wherein said driving member includes an operation transmitting member receiving an operation given by an operator and transmitting the received operation,
    wherein said operation transmitting member incorporates therein at least either one of a direct functioning member, as said functioning member, providing an output for switching between a conductive state and a non-conductive state according to the operation transmitted from said operation transmitting member, and an information input/output functioning member, as said functioning member, for inputting and/or outputting an information signal corresponding to the operation transmitted from said operation transmitting member,
    wherein at least either one of said information input/output functioning member and said direct functioning member is designed to be connectable, and
    wherein either said direct functioning member or said information input/output functioning member that is incorporated in said operation transmitting member, and either said information input/output functioning member or said direct functioning member that is connected with said operation transmitting member are both designed to function in response to said operation.

9. The electrical component as claimed in claim 8, wherein said operation transmitting member includes:
    an operation receiving member for receiving an operation given by an operator, and
    an adaptor member including an operation receiving-member dedicated connection portion for connection with said operation receiving member, and a functioning-member dedicated connection portion having a standardized configuration for connecting said functioning member, and wherein either said direct functioning member or said information input/output functioning member that is incorporated in said operation transmitting member is incorporated in said adaptor member.

10. The electrical component as claimed in any one of claims 2, 4, 5, 8, and 9, wherein said direct functioning member or said information input/output functioning member includes a lighting component.

11. The electrical component as claimed in any one of claims 3 to 5, 8 and 9, wherein said operation transmitting member or said adaptor member includes a lighting component.

12. The electrical component as claimed in any one of claims 3 to 5, 8 and 9, wherein said operation transmitting member is designed to be connectable with the functioning member including a lighting component performing a lighting operation under control of a control unit.

13. The electrical component as claimed in any one of claims 3 to 5, 8 and 9, wherein said operation transmitting member is designed to be connectable with said functioning member including a lighting component performing a lighting operation under control of a control unit, and wherein said functioning member with said lighting component and said information input/output functioning member are designed to be in direct electrical connection with each other.

14. The electrical component as claimed in claim 10, wherein said lighting component is of a power saving, high luminance type.

15. The electrical component as claimed in any one of claims 3, 4, 5, 8 and 9, wherein said operation transmitting member is connectable with an intermediary member for providing said functioning member with an operation output corresponding to the operation given to the operation transmitting member.

16. The electrical component as claimed in claim 8 or 9, wherein said adaptor member is designed to permit the connection of an intermediary member with said functioning-member dedicated connection portion, the intermediary member providing said functioning member with an operation output corresponding to the operation given to said operation transmitting member.

17. The electrical component as claimed in claim 4, wherein said operation transmitting member includes a plurality of connection portions permitting said direct functioning member and said information input/output functioning member to be concurrently connected therewith.

18. The electrical component as claimed in claim 4 or 5, wherein said direct functioning member to be connected with said operation transmitting member includes an operation-transmitting-member dedicated connection portion for connection with said operation transmitting member, and wherein said information input/output functioning member includes an operation-transmitting-member dedicated connection portion which is compatible with said operation-transmitting-member dedicated connection portion of said direct functioning member.

19. The electrical component as claimed in claim 4 or 5, wherein said information input/output functioning member to be connected with said operation transmitting member includes an operation-transmitting-member dedicated connection portion for connection with said operation transmitting member, and wherein said direct functioning member includes an operation-transmitting-member dedicated connection portion which is compatible with said operation-transmitting-member dedicated connection portion of said information input/output functioning member.

20. The electrical component as claimed in claim 15, wherein said functioning member is designed to receive an operation outputted from said intermediary member.

21. The electrical component as claimed in claim 15, wherein said intermediary member changes an operating direction of the operation received from said operation transmitting member and then outputs the resultant operation to said functioning member.

22. The electrical component as claimed in claim 15, wherein said intermediary member provides said functioning member with the operation received from said operation transmitting member, as maintaining the operating direction thereof as it is.

23. The electrical component as claimed in claim 3, wherein said operation transmitting member and said functioning members are formed in one piece.

24. The electrical component as claimed in claim 4 or 5, wherein said operation transmitting member includes:

an operation receiving member for receiving the operation given by the operator, an adaptor member having an operation receiving-member dedicated connection portion for connection with said operation receiving member, and a functioning member dedicated connection portion for connecting said functioning member, and a functioning member having an adaptor-member dedicated connection portion to be connected with said functioning-member dedicated connection portion of said adaptor member.

25. The electrical component as claimed in claim 24, wherein said adaptor member has a plurality of functioning-member dedicated connection portions, thus designed to permit a part of or the all of said functioning members to be concurrently connected therewith.

26. The electrical component as claimed in claim 4 or 5, wherein said operation transmitting member includes:

an operation receiving member having a plurality of adaptor-member dedicated connection portions and receiving the operation given by the operator, and an adaptor member having a functioning-member-dedicated connection portion for connecting said functioning member and designed to be connectable with a part of or the all of said adaptor-member dedicated connection portions at a time.

27. The electrical component as claimed in claim 24, wherein said functioning member includes a functioning-member dedicated connection portion for connecting any one of the other functioning members.

28. The electrical component as claimed in claim 9, wherein said adaptor member incorporates therein any one of said functioning members except for said functioning member connected therewith.

29. The electrical component as claimed in claim 28, wherein said adaptor member incorporates therein a lighting component.

30. The electrical component as claimed in claim 29, wherein said lighting component is of a power saving, high luminance type.

31. The electrical component as claimed in claim 30, wherein said adaptor member changes an operation stroke and/or an operation position received by said operation receiving member and then provides the resultant operation to said functioning member.

32. The electrical component as claimed in claim 31, wherein said operation-receiving-member dedicated connection portion of said adaptor member includes:

a base member fixed to the operation receiving member, and a fixing member for fixing a main body of the adaptor member to said base member.

33. The electrical component as claimed in claim 16, wherein said adaptor member includes an intermediary-member dedicated connection portion for connecting the intermediary member for providing said functioning member with an operation output corresponding to the operation given to said adaptor member, and wherein said intermediary-member dedicated connection portion has a standardized configuration with respect to said operation-receiving-member dedicated connection portion and said functioning-member dedicated connection portion.

34. The electrical component as claimed in claim 4 or 5, wherein said operation transmitting member includes:

an operation member directly receiving the operation given by the operator, an operation-adaptor member having an operation-member dedicated connection portion for connection with said operation member and an operation-connection-member dedicated connection portion, and an operation connection member having an operation-adaptor-member dedicated connection portion for connecting said operation-adaptor member and a functioning-member dedicated connection portion having a standardized configuration for connecting said functioning member, and being connected with the operation-connection-member dedicated connection portion.

35. The electrical component as claimed in claim 34, wherein said operation-adaptor member changes an operation stroke and/or an operation position received by said operation member and then provides the resultant operation to said functioning member.

36. The electrical component as claimed in claim 2, wherein said functioning member includes a lighting component having a front-member dedicated connection portion for connection with a front member for indication and performing alighting operation via said front member, and wherein said front-member dedicated connection potion has a configuration compatible with that of said direct functioning member or said information input/output functioning member.

37. The electrical component as claimed in claim 23, wherein each of said functioning members is contained in a casing, wherein said operation transmitting member is mounted to said casing as allowed to transmit the operation given by the operator, and wherein said operation transmitting member and each of said functioning members are integrated into a unit block.

38. The electrical component as claimed in claim 23, wherein said functioning members include a direct functioning member-providing an output for switching between a conductive state and a non-conductive state, and an information input/output functioning member for inputting and/or outputting an information signal, wherein said direct functioning member and said information input/output functioning member are respectively contained in two sub-casings in detachably connected relation, wherein said operation transmitting member is mounted to either one of said sub-casings as allowed to transmit the operation given by the operator, and wherein said operation transmitting member and said functioning member are unified.

39. The electrical component as claimed in claim 38, wherein said sub-casings are each designed to take the-form of a connector detachably connected with the other.

40. The electrical component as claimed in claim 38 or 39, wherein a communications contact as said information input/output functioning member has a plurality of output ports for providing control to output devices including the lighting component and the like, and wherein the same output is assigned to two or more of said plural output ports.

41. An emergency stop system employing the electrical component as claimed in any one of claims 2 to 5, the emergency stop system comprising an emergency control unit responding to the information signal from said information input/output functioning member by providing control as to whether a control target is brought into an emergency stop or not, wherein said information input/output functioning member is connected to said emergency control unit whereas said direct functioning member is connected to said control target, and wherein said direct functioning member brings said control target into an emergency stop according to the operation given to said electrical component by the operator whereas said emergency control unit brings said control target into an emergency stop according to the information signal inputted to and/or outputted from said information input/output functioning member.

42. A communications apparatus for use in a bus-system network employing the electrical component as claimed in any one of claims 1 to 5 and communicating a communication signal of voltage signal via two bus lines, the apparatus comprising a communications contact having a communication function, and switch means including an operation section for inputting the signal to the communications contact, wherein said operation section has a contactless switching contact configuration.

43. The communications apparatus as claimed in claim 42, wherein said operation section comprises a photo interrupter including a light emitting device and a photo acceptance unit, and a light-shielding member to block light emitted from said light emitting device to said photo acceptance unit in conjunction with a depressing operation.

44. The communications apparatus as claimed in claim 42, wherein said operation section comprises a Hall element and a magnet having the number of lines of magnetic flux varied in conjunction with the depressing operation, the lines of magnetic flux intersecting said Hall element.

45. The communications apparatus as claimed in claim 42, wherein said operation section comprises a magnetic resistance element and a magnet having the number of lines of magnetic flux varied in conjunction with the depressing operation, the lines of magnetic flux intersecting said magnetic resistance element.

46. The communications apparatus as claimed in claim 43, comprising a current control portion which responds to a movement of said light-shielding member by controlling a carrying current into said light emitting device to a set value for a fixed period of time starting from the time when the light from said light emitting device enters said photo acceptance unit, and a retaining section which responds to a movement of said light-shielding member by retaining a level of the input signal to said communications contact for a period of time between the time when the light from said light emitting device enters said photo acceptance unit and the time when the light from said light emitting device is blocked.

47. The communications apparatus as claimed in claim 42, comprising a plurality of surge absorbing elements arranged in series between two transmission terminals of said communications contact which are connected to said two bus lines.

48. A communications apparatus for use in a bus-system network employing the electrical component as claimed in any one of claims 1 to 5 and communicating a communication signal of voltage signal via two bus lines, the apparatus comprising switch means including a communications contact having a communication function and an operation section for inputting the signal to the communications contact, and a plurality of surge absorbing elements disposed in series between two transmission terminals of said communications contact which are connected with said two bus lines.

49. The communications apparatus as claimed in claim 42, comprising a coil disposed in a main body thereof, wherein in a case where a plural number of said communications apparatus bodies are collectively arranged, said coils are located at places shifted from a line through a substantial center of adjoining surfaces of said communications apparatus bodies.

50. A communications apparatus for use in a bus-system network employing the electrical component as claimed in any one of claims 1 to 5 and communicating a communication signal of voltage signal via two bus lines, the apparatus comprising a coil disposed in a main body thereof, wherein in a case where a plural number of said communications apparatus bodies are collectively arranged, said coils are located at places shifted from a line through a substantial center of adjoining surfaces of said communications apparatus bodies.

51. The communications apparatus as claimed in claim 49, wherein said coils in respective ones of said apparatus bodies are substantially aligned on a line when said plural apparatus bodies are collectively arranged as directing the magnetic fluxes from the respective coils therein in the same direction, whereas said coils are disposed in respective ones of said apparatus bodies in shifted relation with an individual adjoining coil thereto when said plural apparatus bodies are collectively arranged as directing the magnetic fluxes from the respective coils therein in the opposite direction to the magnetic flux from an individual adjoining coil thereto.

52. An electrical component comprising:

a combination of a plurality of functioning members of different functions which each perform a predetermined input and/or output operation;

said functioning members including at least a first functioning member for controlling an on or off state of power and a second functioning member for inputting and outputting an information signal, and said functioning members including at least one functioning member connecting to bus lines and receiving power from said bus lines located outside of said electrical component to input to and/or output from said bus lines with the information signal;

a single driving member for driving each of the functioning members in response to an operation thereof; and said driving member including an operation transmitting member directly receiving the operation from an operator and transmitting the received operation to said functioning members to drive said functioning members to implement their respective functions, and said driving member directly connecting with said combination of functioning members.

53. The electrical component as claimed in claim 52, wherein:

said first functioning member includes contact making contact switches for switching between a conductive state and a nonconductive state according to the operation transmitted from said operation transmitting member, and said second functioning member inputs and outputs the information signal corresponding to the received input.

54. The electrical component as claimed in claim 52, wherein said operation transmitting member includes:

an operation receiving member for receiving the operation given by the operator, and an adaptor member including an operation receiving-member dedicated connection portion for connection with said operation receiving member, and a functioning-member dedicated connection portion having a standardized configuration for connecting to at least one of said functioning members.

55. The electrical component as claimed in claim 52, wherein said operation transmitting member includes:

an operation member directly receiving the operation given by the operator, and an operation connection member including a functioning-member dedicated connection portion having a standardized configuration for connecting at least one of said functioning members, and wherein said operation member and said operation connection member are combined by means of an operation-adaptor member.

56. The electrical component as claimed in claim 52, wherein said operation transmitting member incorporates therein at least one of said functioning members, and at least one of said functioning members is designed to be connectable.

57. The electrical component as claimed in claim 56, wherein said operation transmitting member includes:

an operation receiving member for receiving an operation given by an operator, and an adaptor member including an operation receiving-member dedicated connection portion for connection with said operation receiving member, and a functioning-member dedicated connection portion having a standardized configuration for connecting at least one of said functioning members, and wherein said at least one functioning members that is incorporated in said operation transmitting member is incorporated in said adaptor member.

58. The electrical component as claimed in claim 53, wherein at least one of said first functioning member and said second functioning member includes a lighting component.

59. The electrical component as claimed in claim 57 wherein at least one of said operation transmitting member and said adaptor member includes a lighting component.

60. The electrical component as claimed in claim 53, wherein said operation transmitting member is designed to be connectable with the functioning member including a lighting component performing a lighting operation under control of a control unit.

61. The electrical component as claimed in claim 53, wherein said operation transmitting member is designed to be connectable with said functioning member including a lighting component performing a lighting operation under control of a control unit, and wherein said functioning member with said lighting component and said second functioning member are designed to be in direct electrical connection with each other.

62. The electrical component as claimed in claim 58, wherein said lighting component is of a power saving, high luminance type.

63. The electrical component as claimed in claim 53, wherein said operation transmitting member is connectable with an intermediary member for providing at least one of said functioning members with an operation output corresponding to the operation given to the operation transmitting member.

64. The electrical component as claimed in claim 57, wherein said adaptor member is designed to permit the connection of an intermediary member with said functioning-member dedicated connection portion, the intermediary member providing said functioning member with an operation output corresponding to the operation given to said operation transmitting member.

65. The electrical component as claimed in claim 52, wherein said operation transmitting member includes a plurality of connection portions permitting said first functioning member and said second functioning member to be concurrently connected therewith.

66. The electrical component as claimed in claim 52, wherein said first functioning member to be connected with said operation transmitting member includes an operation-transmitting-member dedicated connection portion for connection with said operation transmitting member, and wherein said second functioning member includes an operation-transmitting-member dedicated connection portion which is compatible with said operation-transmitting-member dedicated connection portion of said first functioning member.

67. The electrical component as claimed in claim 52, wherein said second functioning member to be connected with said operation transmitting member includes an operation-transmitting-member dedicated connection portion for connection with said operation transmitting member, and wherein said first functioning member includes an operation-transmitting-member dedicated connection portion which is compatible with said operation transmitting-member dedicated connection portion of said second functioning member.

68. The electrical component as claimed in claim 63, wherein said at least one functioning member is designed to receive an operation outputted from said intermediary member.

69. The electrical component as claimed in claim 63, wherein said intermediary member changes an operating direction of the operation received from said operation transmitting member and then outputs the resultant operation to said at least one functioning member.

70. The electrical component as claimed in claim 63, wherein said intermediary member provides said at least one functioning member with the operation received from said operation transmitting member, as maintaining the operating direction thereof as it is.

71. The electrical component as claimed in claim 52, wherein said operation transmitting member and said functioning members are formed in one piece.

72. The electrical component as claimed in claim 52, wherein said operation transmitting member includes:

an operation receiving member for receiving the operation given by the operator, an adaptor member having an operation receiving-member dedicated connection portion for connection with said operation receiving member, and a functioning-member dedicated connection portion for connecting at least one of said functioning members, and said at least one functioning member having an adaptor-member dedicated connection portion to be connected with said functioning-member dedicated connection portion of said adaptor member.

73. The electrical component as claimed in claim 72, wherein said adaptor member has a plurality of functioning-member dedicated connection portions, thus designed to permit a part of or the all of said functioning members to be concurrently connected therewith.

74. The electrical component as claimed in claim 52, wherein said operation transmitting member includes:

an operation receiving member having a plurality of adaptor-member dedicated connection portions and receiving the operation given by the operator, and an adaptor member having a functioning-member-dedicated connection portion for connecting at least one of said functioning members and designed to be connectable with a part of or the all of said adaptor-member dedicated connection portions at a time.

75. The electrical component as claimed in claim 72, wherein said at least one functioning member includes a functioning-member dedicated connection portion for connecting any one of the other functioning members.

76. The electrical component as claimed in claim 57, wherein said adaptor member incorporates therein any one of said functioning members except for said functioning member connected therewith.

77. The electrical component as claimed in claim 76, wherein said adaptor member incorporates therein a lighting component.

78. The electrical component as claimed in claim 77, wherein said lighting component is of a power saving, high luminance type.

79. The electrical component as claimed in claim 78, wherein said adaptor member changes an operation stroke and/or an operation position received by said operation receiving member and then provides the resultant operation to said at least one functioning member.

80. The electrical component as claimed in claim 79, wherein said operation-receiving-member dedicated connection portion of said adaptor member includes:

a base member fixed to the operation receiving member, and a fixing member for fixing a main body of the adaptor member to said base member.

81. The electrical component as claimed in claim 64, wherein said adaptor member includes an intermediary-member dedicated connection portion for connecting the intermediary member for providing said functioning member with an operation output corresponding to the operation given to said adaptor member, and wherein said intermediary-member dedicated connection portion has a standardized configuration with respect to said operation-receiving-member dedicated connection portion and said functioning-member dedicated connection portion.

82. The electrical component as claimed in claim 52, wherein said operation transmitting member includes:
an operation member directly receiving the operation given by the operator,
an operation-adaptor member having an operation-member dedicated connection portion for connection with said operation member and an operation-connection-member dedicated connection portion, and
an operation connection member having an operation-adaptor-member dedicated connection portion for connecting said operation-adaptor member and a functioning-member dedicated connection portion having a standardized configuration for connecting at least one of said functioning members, and being connected with the operation-connection-member dedicated connection portion.

83. The electrical component as claimed in claim 82, wherein said operation-adaptor member changes an operation stroke and/or an operation position received by said operation member and then provides the resultant operation to said at least one functioning member.

84. The electrical component as claimed in claim 52, wherein said plurality of functioning members include a lighting component having a front-member dedicated connection portion for connection with a front member for indication and performing alighting operation via said front member, and
wherein said front-member dedicated connection potion has a configuration compatible with that of said first functioning member or said second functioning member.

85. The electrical component as claimed in claim 71, wherein each of said functioning members is contained in a casing,
wherein said operation transmitting member is mounted to said casing as allowed to transmit the operation given by the operator, and
wherein said operation transmitting member and each of said functioning members are integrated into a unit block.

86. The electrical component as claimed in claim 71,
wherein said first functioning member and said second functioning member are respectively contained in two sub-casings in detachably connected relation,
wherein said operation transmitting member is mounted to either one of said sub-casings as allowed to transmit the operation given by the operator, and
wherein said operation transmitting member and said functioning member are unified.

87. The electrical component as claimed in claim 86, wherein said sub-casings are each designed to take the-form of a connector detachably connected with the other.

88. The electrical component as claimed in claim 86, wherein a communications contact as said second functioning member has a plurality of output ports for providing control to output devices including a lighting component, and wherein the same output is assigned to two or more of said plural output ports.

89. An emergency stop system employing the electrical component as claimed in claim 52,
the emergency stop system comprising an emergency control unit responding to the information signal from said second functioning member by providing control as to whether a control target is brought into an emergency stop or not,
wherein said second functioning member is connected to said emergency control unit whereas said first functioning member is connected to said control target, and
wherein said first functioning member brings said control target into an emergency stop according to the operation given to said electrical component by the operator whereas said emergency control unit brings said control target into an emergency stop according to the information signal inputted to and outputted from said second functioning member.

90. A communications apparatus for use in a bus-system network employing the electrical component as claimed in claim 52 and communicating a communication signal of voltage signal via two bus lines,
the apparatus comprising a communications contact having a communication function, and switch means including an operation section for inputting the signal to the communications contact,
wherein said operation section has a contactless switching contact configuration.

91. The communications apparatus as claimed in claim 90, wherein said operation section comprises a photo interrupter including a light emitting device and a photo acceptance unit, and a light-shielding member to block light emitted from said light emitting device to said photo acceptance unit in conjunction with a depressing operation.

92. The communications apparatus as claimed in claim 90, wherein said operation section comprises a Hall element and a magnet having the number of lines of magnetic flux varied in conjunction with the depressing operation, the lines of magnetic flux intersecting said Hall element.

93. The communications apparatus as claimed in claim 90, wherein said operation section comprises a magnetic resistance element and a magnet having the number of lines of magnetic flux varied in conjunction with the depressing operation, the lines of magnetic flux intersecting said magnetic resistance element.

94. The communications apparatus as claimed in claim 91, comprising a current control portion which responds to a movement of said light-shielding member by controlling a carrying current into said light emitting device to a set value for a fixed period of time starting from the time when the light from said light emitting device enters said photo acceptance unit, and a retaining section which responds to a movement of said light-shielding member by retaining a level of the input signal to said communications contact for a period of time between the time when the light from said light emitting device enters said photo acceptance unit and the time when the light from said light emitting device is blocked.

95. The communications apparatus as claimed in claim 90, comprising a plurality of surge absorbing elements arranged in series between two transmission terminals of said communications contact which are connected to said two bus lines.

96. A communications apparatus for use in a bus-system network employing the electrical component as claimed in claim 52 and communicating a communication signal of voltage signal via two bus lines,
the apparatus comprising switch means including a communications contact having a communication function and an operation section for inputting the signal to the communications contact, and
a plurality of surge absorbing elements disposed in series between two transmission terminals of said communications contact which are connected with said two bus lines.

97. The communications apparatus as claimed in claim 90, comprising a coil disposed in a main body thereof, wherein in a case where a plural number of said communications apparatus bodies are collectively arranged, said coils are located at places shifted from a line through a substantial center of adjoining surfaces of said communications apparatus bodies.

98. A communications apparatus for use in a bus-system network employing the electrical component as claimed in claim 52 and communicating a communication signal of voltage signal via two bus lines, the apparatus comprising a coil disposed in a main body thereof, wherein in a case where a plural number of said communications apparatus bodies are collectively arranged, said coils are located at places shifted from a line through a substantial center of adjoining surfaces of said communications apparatus bodies.

99. The communications apparatus as claimed in claim 97, wherein said coils in respective ones of said apparatus bodies are substantially aligned on a line when said plural apparatus bodies are collectively arranged as directing the magnetic fluxes from the respective coils therein in the same direction, whereas said coils are disposed in respective ones of said apparatus bodies in shifted relation with an individual adjoining coil thereto when said plural apparatus bodies are collectively arranged as directing the magnetic fluxes from the respective coils therein in the opposite direction to the magnetic flux from an individual adjoining coil thereto.

100. The communications apparatus as claimed in claim 90, further comprising said communications contact including a pulse width modulation circuit for controlling said operation section.

101. The communications apparatus as claimed in claim 90, further comprising said apparatus including a retaining circuit responding to the operation section.

102. The communications apparatus as claimed in claim 90, further comprising said retaining circuit including at lest two flip flop circuits.

103. The communications apparatus as claimed in claim 90, further comprising said apparatus including at least two Zener diodes for surge protection.

104. Electromechanical switch assembly comprising:

a push-button section, comprising:

a casing;

a push-button, capable of alternatively moving forwards from a first position to a second position and backwards from said second position to said first position, in a direction normal to a pressing surface of said push-button, upon application of a pressing force thereto and release of said pressing force, respectively, said push-button having a spring internal thereto for restoring said push-button to said first position upon release of said pressing force; and an operating shaft, having a cylindrical shape, with a plurality of longitudinal projections spaced around an outer periphery of one end thereof and having a recess with a hollow interior at said end thereof;

a push-button body, having an aperture therein for receiving said push-button section, in detachable attachment therewith, and having three contact-dedicated connectors thereon;

a light-emitting diode (LED) box, connected to said push-button body, said LED box comprising:

an LED capable of engaging with said recess on said operating shaft, to transmit to said LED box said operation administered to said push-button, and a circuit for receiving a control signal from a bus line;

a communications contact, connected to said push-button body, for outputting an information signal in response to said operation given to said push-button, said communications contact comprising:

a switch section, comprising:

a switching projection, for receiving said operation given to said push-button section by contactingly receiving and being actuated by a corresponding one of said projections on said operating shaft, when said operating shaft is longitudinally moved into engagement therewith, thereby outputting a mechanical signal; and a bipositional switch, capable of being actuated and having its state changed by said mechanical signal, thereby changing a state of said communications contact;

an interface section, connected to said switch section, for accepting said mechanical signal from said switch section, converting said mechanical signal to a digital signal, and for outputting said digital signal;

a communication section, for receiving said digital signal from said interface section, for generating a communication signal conforming to a predetermined communications protocol, and for transmitting said communication signal to a network via a communications cable; and a contact-making contact, connected to said push-button body, for providing an electrical output for switching between a conductive state and a non-conductive state in response to said operation given to said push button, said contact-making contact comprising:

a switching projection, for receiving said operation given to said push-button section by contactingly receiving and being actuated by a corresponding one of said projections on said operating shaft, when said operating shaft is longitudinally moved into engagements therewith; and a bipositional switch, capable of being actuated and having its state changed by said mechanical signal, thereby changing a state of said contact making contact.

\* \* \* \* \*